US011305174B2

(12) United States Patent
Spivak et al.

(10) Patent No.: US 11,305,174 B2
(45) **Date of Patent: *Apr. 19, 2022**

(54) AUTOMATED OR ASSISTED UMPIRING OF BASEBALL GAME USING COMPUTER VISION

(71) Applicant: SportsMEDIA Technology Corporation, Durham, NC (US)

(72) Inventors: Josh D. Spivak, San Francisco, CA (US); Graham W. Goldbeck, Oakland, CA (US); Ryan A. Zander, Burlingame, CA (US); Ted C. Chen, Valencia, CA (US); Robert C. Amyx, San Jose, CA (US); James G. Painter, Palo Alto, CA (US)

(73) Assignee: SPORTSMEDIA TECHNOLOGY CORPORATION, Durham, NC (US)

( * ) Notice: Subject to any disclaimer, the term of this patent is extended or adjusted under 35 U.S.C. 154(b) by 96 days.

This patent is subject to a terminal disclaimer.

(21) Appl. No.: 16/857,983

(22) Filed: Apr. 24, 2020

(65) Prior Publication Data

US 2020/0246675 A1 Aug. 6, 2020

Related U.S. Application Data

(63) Continuation of application No. 16/124,861, filed on Sep. 7, 2018, now Pat. No. 10,632,359, which is a (Continued)

(51) Int. Cl.

*A63B 69/00* (2006.01)
*A63B 71/06* (2006.01)
(Continued)

(52) U.S. Cl.

CPC ...... *A63B 71/0605* (2013.01); *G06K 9/00342* (2013.01); *G06K 9/00724* (2013.01); (Continued)

(58) Field of Classification Search

CPC ............ A63B 69/0002; A63B 2102/18; A63B 2102/182; A63B 71/0605; A63B 71/0616; (Continued)

(56) References Cited

U.S. PATENT DOCUMENTS 4,545,576 A * 10/1985 Harris .................... A63B 69/00 340/323 R
4,577,863 A 3/1986 Ito et al.
(Continued)

OTHER PUBLICATIONS

"Robust Golf Club Tracking," Computer Vision Laboratory CVLAB, downloaded from http://cvlab.epfl.ch/research/completed/golf on Mar. 7, 2016, 3 pages.
(Continued)

*Primary Examiner* — Lawrence S Galka
(74) *Attorney, Agent, or Firm* — Neo IP

(57) ABSTRACT

Methods and systems for use in automating or assisting umpiring of a baseball or softball game are described herein. A location of a strike zone is determined based on video images of a batter standing next to home plate captured by a camera. Locations of a ball traveling towards the batter, and locations of the bat being held by the batter, are autonomously tracked using computer vision based on video images captured by at least two cameras having different positions. Additionally, there are autonomous determinations of whether a location of the ball intersects with the strike zone, and whether the batter made a genuine attempt to swing the bat at the ball, and based one at least one of these determinations, there is an autonomous determination of whether a "strike" or a "ball" occurred. Additionally, an indication of whether a "strike" or a "ball" occurred is autonomously output.

20 Claims, 25 Drawing Sheets

Related U.S. Application Data continuation of application No. 15/157,222, filed on May 17, 2016, now Pat. No. 10,076,698.

(51) Int. Cl.

| | |
|---|---|
| ***G06K 9/00*** | (2022.01) |
| ***G06T 7/246*** | (2017.01) |
| ***G06T 7/254*** | (2017.01) |

(52) U.S. Cl.

CPC .............. *G06T 7/246* (2017.01); *G06T 7/254* (2017.01); *A63B 2220/806* (2013.01); *G06T 2207/30224* (2013.01); *G06T 2207/30241* (2013.01)

(58) Field of Classification Search

CPC ........ A63B 71/0669; A63B 2069/0006; A63B 2069/0008; A63B 24/0003; A63B 2220/805; A61B 5/112; G01P 13/00

See application file for complete search history.

(56) References Cited

U.S. PATENT DOCUMENTS

| | | | |
|---|---|---|---|
| 4,941,662 A | 7/1990 | DePerna | |
| 5,868,578 A | 2/1999 | Baum | |
| 5,912,700 A * | 6/1999 | Honey | H04N 7/088 348/157 |
| 6,335,345 B1 | 1/2002 | Fukami et al. | |
| 6,640,200 B1 | 10/2003 | Baum | |
| 7,575,526 B2 | 8/2009 | Husband | |
| 7,946,960 B2 | 5/2011 | Vitolo et al. | |
| 8,884,741 B2 | 11/2014 | Cavallaro et al. | |
| 9,814,935 B2 | 11/2017 | Bentley et al. | |
| 2002/0169038 A1 | 11/2002 | Daniel | |
| 2014/0100006 A1 | 4/2014 | Jennings | |
| 2017/0151481 A1* | 6/2017 | Divine | G06T 19/006 |
| 2019/0038952 A1 | 2/2019 | Spivak et al. | |

OTHER PUBLICATIONS

Chugh, Ravi et al., “Golf Club Head Tracking,” [http://cseweb.ucsd.edu/~rchugh/swingimp/], Slides, Mar. 12, 2008, 16 pages.

Chugh, Ravi, “Converting 2D golf swing sequences into 3D models,” Swingimp, [http://swingimp.blogspot.com/], Mar. 12, 2008, 6 pages.

Chugh, Ravi, “Golf Club Tracking,” [http://cseweb.ucsd.edu/~rchugh/swingimp/], Mar. 12, 2008, 1 page.

Chugh, Ravi, et al., “CSE 190a Project Report: Golf Club Head Tracking,” Mar. 16, 2008, 7 pages.

Gehrig, Nicolas, et al., “Visual Golf Club Tracking for Enhanced Swing Analysis,” Computer Vision Laboratory, Jul. 10, 2003, 10 pages.

Lepetit, Vincent, et al., “Robust Data Association,” Computer Vision Laboratory, Jan. 2003, 8 pages.

Lepetit, Vincent, et al., “Robust Visual Golf Club Tracking,” CVIab—Ecole Polytechnique Federale De Lausanne, downloaded from http://cvlab.epfl.ch on Feb. 25, 2016, 26 pages.

* cited by examiner

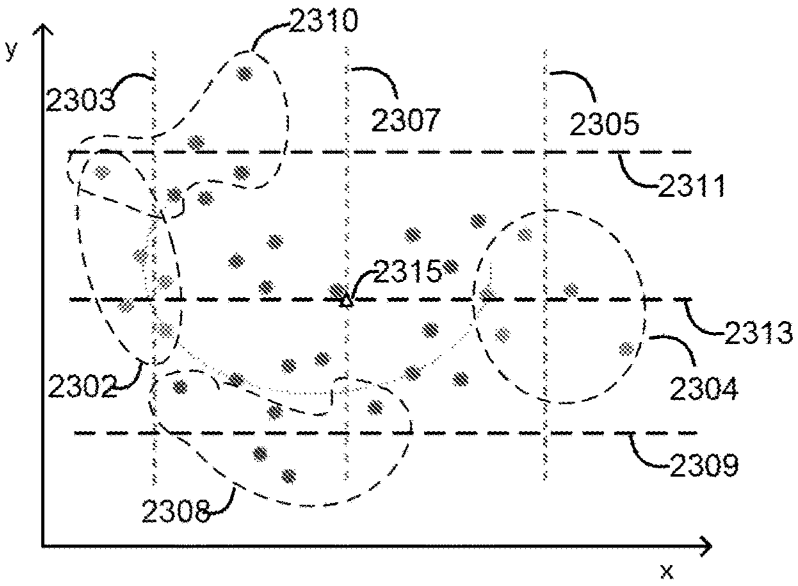

2402 Determine average of specified number of smallest x-positions

2404 Determine average of specified number of largest x-positions

2406 Determine average of average values determined at steps 702 and 704

2408 Determine average of specified number of smallest y-positions

2410 Determine average of specified number of largest y-positions

2412 Determine average of average values determined at steps 2408 and 2410

2414 Determine approximate center of elliptical arc motion as position corresponding to average of largest and smallest x-positions (determined at step 2406) and average of largest and smallest x-positions (determined at step 2412)

Fig. 24

AUTOMATED OR ASSISTED UMPIRING OF BASEBALL GAME USING COMPUTER VISION

CROSS REFERENCES TO RELATED APPLICATIONS

This application is related to and claims priority from the following US patents and patent applications. This application is a continuation of U.S. application Ser. No. 16/124,861, filed Sep. 7, 2018, which is a continuation of U.S. application Ser. No. 15/157,222, filed May 17, 2016, now U.S. Pat. No. 10,076,698, each of which is incorporated herein by reference in its entirety.

BACKGROUND OF THE INVENTION

1. Field of the Invention

The present invention relates to recording and tracking actions of a baseball and a batter during a baseball game, and more specifically to automated or assisted umpiring of baseball games using computer vision.

2. Description of the Prior Art

It is generally known in the prior art to provide systems for recording and tracking projectiles at sport events.

Prior art patent documents include the following:

U.S. Pat. No. 4,545,576 for Baseball-strike indicator and trajectory analyzer and method of using same by inventor Harris, filed Aug. 13, 1983 and issued Oct. 8, 1985, is directed to an apparatus and method to compute the trajectory of a moving object by remote, non-interfering sensors. The particular application computes the trajectory of a pitched baseball throughout its flight, including the ball's trajectory as it passes in the vicinity of a three-dimensional strike zone. The apparatus includes two pairs of video cameras, an alignment mechanism, video-storage means, a digitizer, a computer, output devices, and an operator's console. This apparatus is required to identify the ball, compute its position in three dimensions as a function of time, compute ball speed trajectory, and present the output via computer graphics to present the viewer with essentially any desired view of the pitch.

SUMMARY OF THE INVENTION

Embodiments described herein can be used in automating or assisting umpiring of a baseball game, or a softball game. A method according to an embodiment of the present technology includes receiving video images, captured using at least one camera, of a batter standing next to home plate, and determining a location of a strike zone based on the video images of the batter standing next to home plate. The method also includes receiving video images, captured using at least two different cameras having different positions, of a ball traveling towards the batter for which the strike zone was determined. Further, the method includes receiving video images, captured using at least two different cameras having different positions, of a bat being held by the batter as the ball travels towards the batter, wherein at least some of the video images of the bat being held by the batter may or may not be the same as at least some of the video images of the ball traveling towards the batter. The method also includes autonomously tracking locations of the ball traveling towards the batter, using computer vision, based on the video images of the ball traveling towards the batter; and autonomously tracking locations of the bat being held by the batter as the ball travels towards the batter, using computer vision, based on the video images of the bat being held by the batter as the ball travels towards the batter. Additionally, the method includes autonomously determining whether at least one location of the ball traveling towards the batter intersects with the strike zone, based on the determined location of the strike zone and the tracked locations of the ball traveling towards the batter. Further, the method includes autonomously determining whether the batter made a genuine attempt to swing the bat at the ball, based on the tracked locations of the bat being held by the batter as the ball travels towards the batter. The method also includes autonomously determining whether a "strike" or a "ball" occurred, based on the determination of whether at least one location of the ball intersected with the strike zone, and/or the determination of whether the batter made a genuine attempt to swing at the ball. Further, the method includes autonomously outputting and indication of whether a "strike" or a "ball" occurred. Such an indication can be output using an output device that includes a visual display and/or an audio speaker.

The video images of the ball traveling towards the batter, and of the bat being held by the batter as the ball travels towards the batter, which are captured by cameras, are in two-dimensional (2D) space. In accordance with certain embodiments, transformations (e.g., transformation matrices) associated with the cameras used to capture the video images of the ball traveling towards the batter are used to determine locations of the ball traveling towards the batter in three-dimensional (3D) space. Similarly, transformations (e.g., transformation matrices) associated cameras used to capture the video images of the bat being held by the batter are used to determine locations of the bat in 3D space. In accordance with certain embodiments, the method includes autonomously determining whether a location of the bat in 3D space is the same as a location of the ball in 3D space at a same point in time. In such embodiments, there can be an autonomous determination that the bat made contact with the ball if there was an autonomous determination that a location of the bat in 3D space was the same as a location of the ball in 3D space at a same point in time. Conversely, there can be an autonomous determination that the bat did not make contact with the ball if there was an autonomous determination that a location of the bat in 3D space was not the same as a location of the ball in 3D space at a same point in time.

In accordance with certain embodiments, autonomously determining whether a "strike" or a "ball" occurred, includes determining that a "strike" occurred if there was an autonomous determination that the bat did not make contact with the ball, and there was also an autonomous determination that the batter made a genuine attempt to swing the bat at the ball. Further, there can be an autonomous determination that a "ball" occurred if there was an autonomous determination that at least one location of the ball traveling towards the batter did not intersect with the strike zone, and there was an autonomous determination that the batter did not make a genuine attempt to swing the bat at the ball.

In accordance with certain embodiments, in order to assist with determining whether the batter made a genuine attempt to swing a bat, the method further includes determining a vertical plane in 3D space that is aligned with a front of home plate. Additionally, there is an autonomous determination of whether a location of the bat in 3D space intersects with the vertical plane in 3D space that is aligned with the front of home plate as the ball travels towards the batter. There is an autonomous determination that the batter made a genuine attempt to swing the bat at the ball if a location of the bat in 3D space intersected with the plane in 3D space that corresponds to the front of home plate. Conversely, there is an autonomous determination that the batter did not make a genuine attempt to swing the bat at the ball if a location of the bat in 3D space did not intersect with the plane in 3D space that corresponds to the front of home plate. Alternatively, or additionally, there can be an autonomous determination of a rotation angle of the bat as the ball travels towards the batter, which is compared to a threshold angle, and an autonomous determination of whether the batter made a genuine attempt to swing the bat at the ball can be based on whether the rotation angle of the bat exceeded the threshold angle.

In accordance with certain embodiments, the method further includes autonomously determining a trajectory of the ball in 3D space as the ball travels towards the batter, autonomously determining whether a location of the bat in 3D space is within a specified vicinity of a location of the ball in 3D space at a same point in time, and autonomously determining whether the trajectory of the ball in 3D space changed beyond a specified threshold while a location of the bat in 3D space was within the specified vicinity of a location of the ball in 3D space at a same point in time. In such embodiments, there can be an autonomous determination of whether a bat made contact with a ball, based on the determination of whether the trajectory of the ball in 3D space changed beyond the specified threshold while a location of the bat in 3D space was within the specified vicinity of a location of the ball in 3D space at a same point in time. Additionally, or alternatively, audio associated with the batter holding the bat as the ball travels towards the batter can be obtained and used to autonomously determine whether a bat made contact with a ball, which determinations can be used to determine whether a foul tip occurred. The method can also include autonomously outputting an indication of whether the bat made contact with the ball and/or whether a foul tip occurred. In accordance with certain embodiments, there can also be autonomous determinations of whether a ball was hit fair or foul, and an indication thereof can be autonomously output.

In the above described embodiments, various different cameras at different positions can be used to capture the aforementioned video images. One or more processors, in communication with the cameras (e.g., via one or more interfaces), can be used to perform the aforementioned steps that are performed autonomously, which as the term is used herein, means without requiring input from a human.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter

BRIEF DESCRIPTION OF THE DRAWINGS

FIG. 23 includes dots that represent candidate heads of a bat determined from a plurality of video images captured using a same camera while a batter held and potentially swung the bat.

FIG. 24 is a flow diagram that is used, together with FIG. 23 to describe additional details of how to identify an approximate center of elliptical arc motion of a swung bat at step 2204 initially discussed with reference to FIG. 22.

DETAILED DESCRIPTION

Figure 1A:
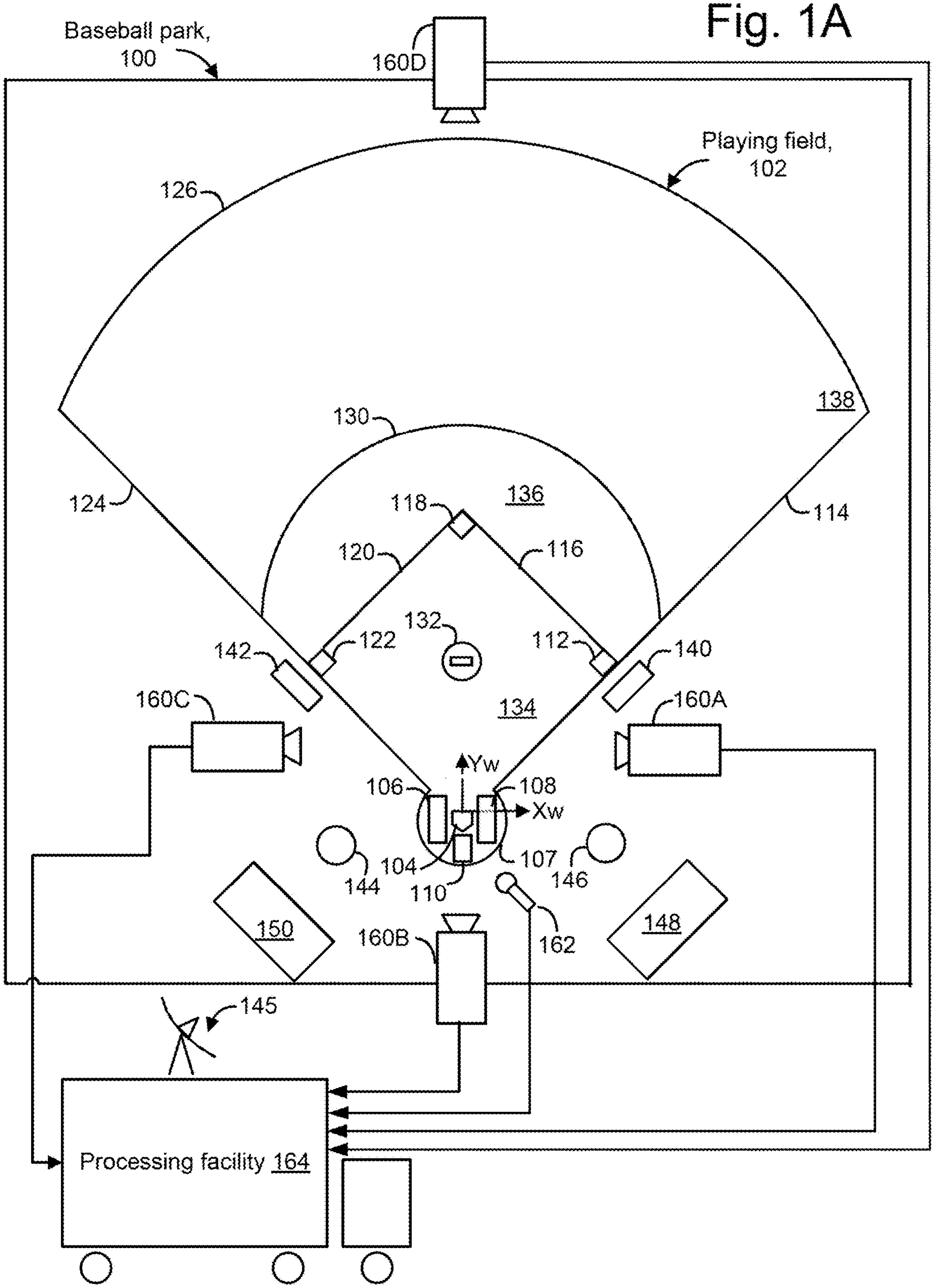
FIG. 1A depicts a baseball park and equipment for obtaining video images.

Embodiments described herein relate to systems and methods for providing semi-automated and/or fully-automated umpiring of baseball games using, inter alia, computer vision. Such embodiments can be used in place of, or to assist, one or more human umpires that is/are responsible for making accurate calls during the course of a baseball game. As noted above, a home plate umpire's main responsibilities, which includes calling strikes, balls, check swings and foul tips, are extremely difficult to fulfill with near-perfect accuracy. Embodiments of the present technology, described herein, can be used to automate and/or assist with making such calls. Before providing details of such embodiments, it is first useful to set forth some rules/definitions for certain terms, so that when such terms are used herein they are understood. More complete lists of rules are readily available on-line and/or in rule books. Such rules may vary depending upon the league in which a game is being played. The rules recited below are Major League Baseball (MLB) rules. Embodiments described herein can also be used for providing semi-automated and/or fully-automated umpiring of softball games, which have similar rules to baseball rules.

A "strike" is a legal pitch when so called by the umpire (a human, or an automated umpire), which: (a) Is struck at by the batter and is missed; (b) Is not struck at, if any part of the ball passes through any part of the strike zone; (c) Is fouled by the batter when he has less than two strikes; (d) Is bunted foul; (e) Touches the batter as he strikes at it; (f) Touches the batter in flight in the strike zone; or (g) Becomes a foul tip. A batter can be said to have struck at a pitched ball if the batter made a genuine attempt to swing a bat at a ball.

The "strike zone" is that area over home plate the upper limit of which is a horizontal line at the midpoint between the top of the shoulders and the top of the uniform pants, and the lower level is a line at the hallow beneath the knee cap. The rules state that the strike zone shall be determined from the batter's stance as the batter is prepared to swing at a pitched ball.

A "ball" is a pitch which does not enter the strike zone in flight and is not struck at by the batter. If the pitch touches the ground and bounces through the strike zone it is a "ball." If such a pitch touches the batter, he shall be awarded first base. If the batter swings at such a pitch after two strikes, the ball cannot be caught. If the batter hits such a pitch, the ensuing action shall be the same as if he hit the ball in flight.

A "foul tip" is a batted ball that goes sharp and direct from the bat to the catcher's hands and is legally caught. It is not a foul tip unless caught and any foul tip that is caught is a strike, and the ball is in play. It is not a catch if it is a rebound, unless the ball has first touched the catcher's glove or hand. The rules treat a foul tip as equivalent in every respect to a pitch at which the batter swings and misses. Accordingly, a foul tip is always a strike, regardless of the existing ball-and-strike count. This means that if a foul tip occurs when a player has two strikes against him, then the player is automatically struck out and cannot attempt to reach first base. This also means that if a foul tip occurs when a player has fewer than two strikes against him then the player is not out. In contrast, a foul ball is not considered a strike where the batter already has two strikes against him.

A "foul ball" is a batted ball that settles on foul territory between home and first base, or between home and third base, or that bounds past first or third base on or over foul territory, or that first falls on foul territory beyond first or third base, or that, while on or over foul territory, touches the person of an umpire or player, or any object foreign to the natural ground. A foul fly shall be judged according to the relative position of the ball and the foul line, including the foul pole, and not as to whether the infielder is on foul or fair territory at the time he touches the ball. A batted ball not touched by a fielder, which hits the pitcher's rubber and rebounds into foul territory, between home and first, or between home and third base is a foul ball. "Foul territory" is that part of the playing field outside the first and third base lines extended to the fence and perpendicularly upwards.

A "checked swing" occurs when a batter starts to swing his bat at the ball, but stops the swing in order to allow the ball to pass without hitting it. If the swing was indeed checked, so that there was actually no swing, then if the bat did not touch the ball and if the ball did not go through the strike zone, the pitch counts as a ball; but in that circumstance if the swing was not checked, so that a swing actually occurred, then the pitch counts as a strike. The MLB rulebook does not contain an official definition for a "checked swing," merely stating that a swing either does or does not occur. Accordingly, it has conventionally been the decision of the umpire as to whether a swing was checked or not. Generally, factors such as whether the bat passes the front of the plate or the batter pulls his wrists back are considered in the ruling. For the purpose of this disclosure, unless stated otherwise, it will be assumed that a "checked swing" occurs if the batter starts to swing his bat at the ball and then stops the swing, without hitting the ball, before the barrel of the bat passes the front of home plate.

Figure 1B:
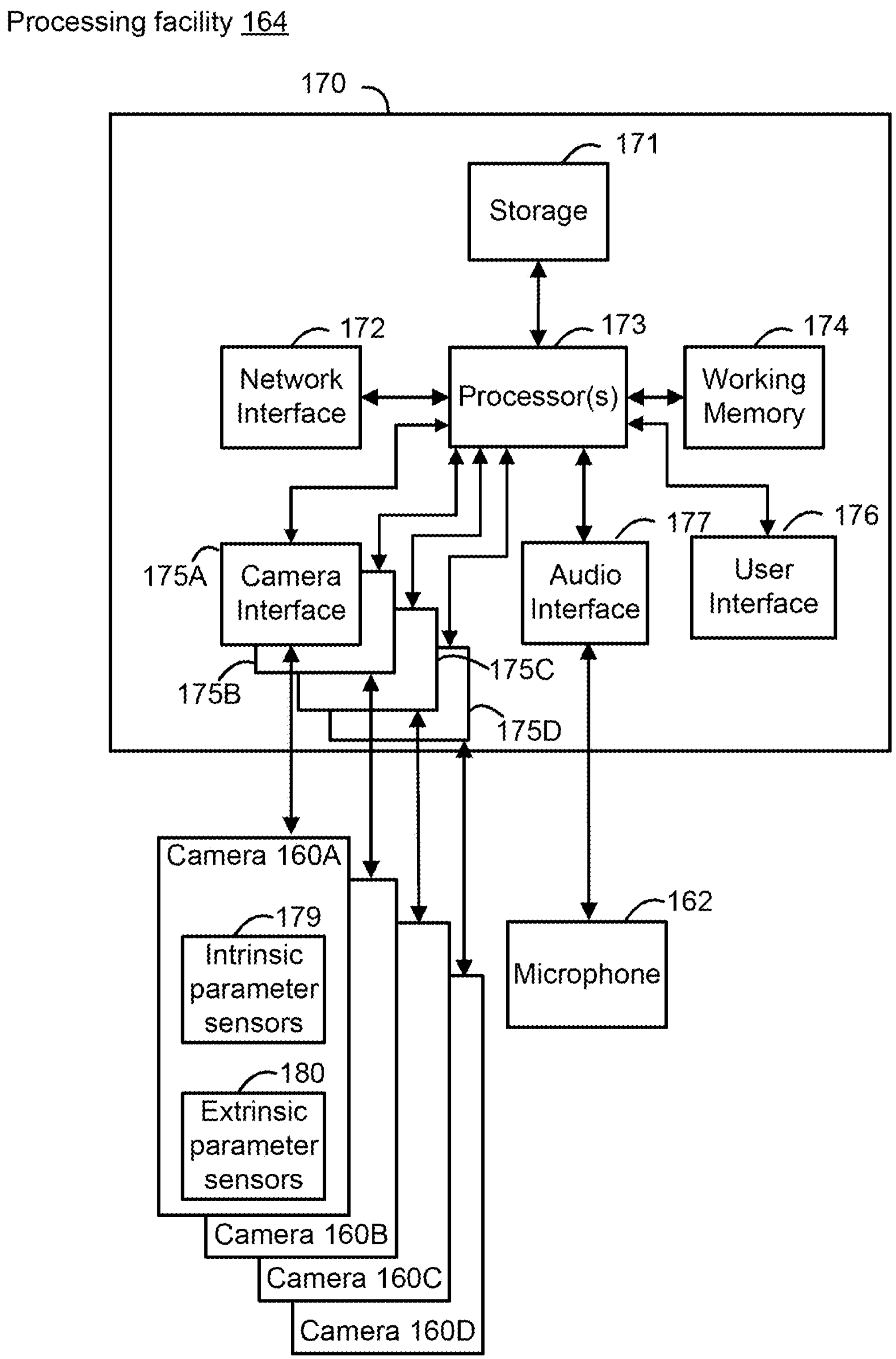
FIG. 1B depicts further details of the processing facility and cameras of FIG. 1A.
Figure 1C:
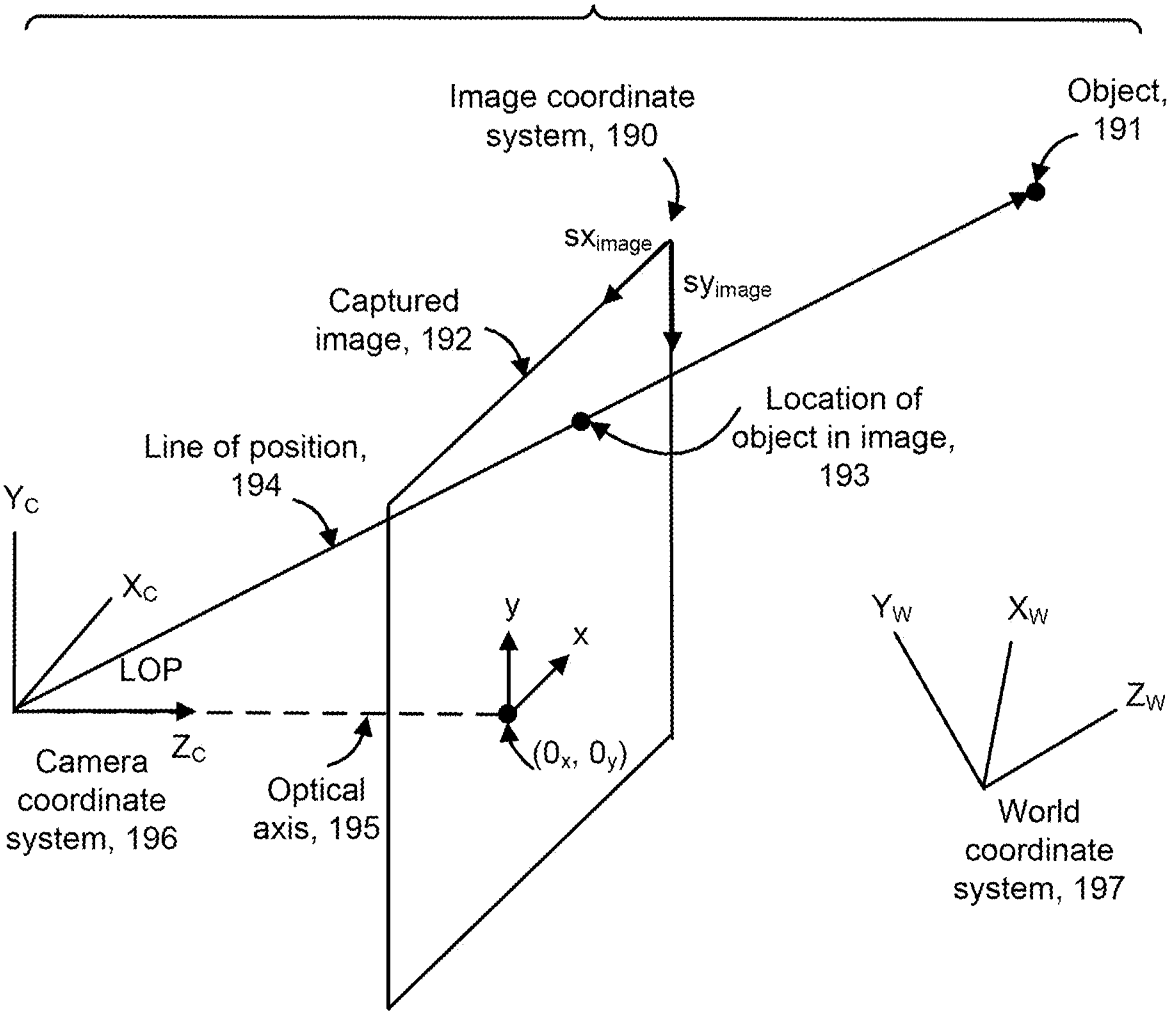
FIG. 1C depicts a relationship between camera, image and world coordinate systems, for use by the processing facility of FIG. 1B in detecting objects in the baseball park.

Now that a few of the rules/definitions relevant to this disclosure have been provided, FIG. 1A-1C will initially be used to describe equipment that can be used to implement the embodiments described herein. FIG. 1A depicts a baseball park 100 and equipment for obtaining video images, which can also be referred to herein as frames of video, video frames, or simply as frames or images. The baseball park 100 can be a baseball stadium or a smaller facility, and includes a playing field 102, which can also be referred to as a baseball field 102 or a baseball diamond 102. The playing field 102 can be arranged according to standard rules of baseball, e.g., as described in the "Official Baseball Rules" of Major League Baseball (MLB). A baseball game can be a game which is played according to these rules or similar rules. The fair territory boundaries of the playing field are the foul lines 114 and 124, the outfield boundary 126 which may be a fence or wall, and the semicircle 107 around home plate 104. Line 130 is the boundary between the outfield 138 and the infield. The infield includes a square/diamond region (including two sides 120 and 116) between the four bases 104, 112, 118 and 122. The infield also includes a curved region 136 which is between the regions 134 and 138. Also provided are: a left-side batter's box 106, a right-side batter's box 108, a catcher's box 110, a first base coach's box 140, a third base coach's box 142, a pitcher's mound 132, on-deck circles 144 and 146, and dugouts 150 and 148. A softball field is similar to a baseball field (albeit typically smaller), and thus, will have similar boundaries, regions, bases, and boxes, and the like.

A number of video cameras obtain video images of the game as it transpires in the baseball park 100. The video cameras can be, e.g., cameras dedicated for use in tracking, or television video cameras that are also used to televise and/or record a game, or a combination thereof. Any one of the cameras can have a fixed location or can be movable, and any one of the cameras can have a fixed or variable pan-tilt-zoom (PTZ). For example, in FIG. 1A three cameras 160A, 160B and 160C are depicted outside the fair territory of the playing field 102 (and thus, in foul territory), with the camera 160A generally facing the base path between home plate 104 and first base 112, the camera 160B behind and generally facing home plate 104, and the camera 160C generally facing the base path between home plate 104 and third base 122. A further camera 160D is shown as being located in or behind center field. The video images captured by each of the cameras 160A, 160B and 160C preferably include the full stance or pose of a baseball player and the cameras collectively preferably capture the full range of swinging motion, but that need not be the case. Where each of the cameras 160A, 160B and 160C is located at a different position than one another, the images captured by the different cameras will differ from one another, despite including common objects within their images. The video images captured by of each of the cameras 160A, 160B and 160C preferably also include the pitcher's mound 132, so that the cameras are capable of being used to capture video images of a baseball as it travels from the pitcher's mound 132 to home plate 104. More generally, the video images captured by each of the cameras 160A, 160B and 160C preferably include the baseball as it traveling towards home plate, and the baseball bat that is selectively swung at the baseball by a player. In accordance with certain embodiments, the camera 160D is used to track the height of the strike zone. The cameras 160A, 160B, 160C and 160D can be referred to collectively as cameras 160, or individual as a camera 160. In certain embodiments, one or more of the cameras 160 may be located at a different height than one or more of the other camera(s) 160. One or more of the cameras 160 may have different lenses, zoom, etc., than the other cameras. Further, various different types of cameras 160 may be used in various different combinations. While four cameras 160 are depicted, more or fewer than four cameras 160 can alternatively be used, so long as there are at least two cameras 160. In one approach, two to six cameras 160, capturing color or monochrome images, can be used. A processing facility 164 receives and processes frames of video images from the cameras 160. In one approach, the processing facility 164 is a mobile facility such as a truck which is parked outside the baseball park. The processing facility 164 can subsequently transmit the captured images and other information via an antenna 145, to another location such as a television broadcast facility. In another approach, the processing facility can be remote from the baseball park 100. Or, the processing facility can be a permanent facility, neither mobile nor remote, such as one which is inside the baseball park. The cameras 160 can provide captured images or frames to the processing facility via wired or wireless communication links, or a combination thereof, which may or may not include the Internet.

In accordance with certain embodiments, the cameras 160 are all synchronized so that each of the cameras 160 obtains video images of a batter swinging a baseball bat, with at least two of the cameras 160 being at different positions, at common points in time (e.g., at common instants that a baseball is travelling from the pitcher's mound to home plate, and/or that a baseball bat is being swung). This way triangulation and/or other techniques can be used to determine the location of the ball, and to determine locations of the head, the knob and/or the shaft (and/or other identifiable portions) of the baseball bat in three-dimensional (3D) space from the two-dimensional (2D) images of the baseball and/or the bat captured at the same times by the different cameras 160, as will be appreciated from the description below. In alternative embodiments, the various cameras 160 may be unsynchronized relative to one another. It is also possible that two or more of the cameras 160 are synchronized relative to one another, while one or more of the other cameras 160 are unsynchronized relative to one or more other cameras 160.

Additional cameras 160 can be used as well to increase the accuracy and/or robustness of the tracking. The cameras can be, e.g., special purpose machine vision cameras. Alternatively, or additionally, television broadcast cameras can be used. Such broadcast cameras typically capture thirty frames or sixty fields per second, but may capture frames and/or fields at other rates as well (for example progressive cameras typically capture sixty frames per second, and super slow motion cameras capture much higher frame rates). Other cameras that capture multiple frames of video images per second can alternatively be used. The locations of objects in the baseball park, including participants, a baseball bat, and a baseball, can be described in terms of a world coordinate system, also known as a free space coordinate system, which is fixed relative to the earth or other environment of interest, in one approach. The world coordinate system includes orthogonal directions represented by a Yw axis, an Xw axis, and a Zw axis (not shown) which extends out of the page in FIG. 1A. An origin of the world coordinate system is chosen to be at the tip of the triangular rear of home plate 104, as an example. World coordinate space is an exemplary type of 3D space.

Each camera 160 can be provided with sensors which detect intrinsic and extrinsic parameters of the camera when these parameters are variable. Intrinsic parameters, such as focal length, lens distortion and zoom setting represent characteristics of the camera design and settings, and do not depend on the position and orientation of the camera in space. Extrinsic parameters, such as tilt or pan, depend on the position and orientation of the camera in space. Such sensors can be provided using techniques known to those skilled in the art. For example, pan and tilt sensors can be attached to a tripod head on which the camera is mounted. See, e.g. U.S. Pat. No. 5,912,700, issued Jun. 15, 1999, and incorporated herein by reference. The sensors can be used to determine where the camera is pointing and what it can see. The sensors can be used to determine where the camera is pointing and what it can see. Or, the cameras can be stationary and fixed so that they do not pan, tilt or zoom dynamically, in which case mathematical methods can be used to detect the extrinsic and intrinsic camera parameters. In certain embodiments, broadcast cameras with a pan-tilt-zoom (PTZ) capability could be used for all of the tracking, part of the tracking, or in conjunction with stationary and fixed cameras to assist with the tracking.

It is possible to determine camera extrinsic and intrinsic parameters without sensors, e.g., as described in Tsai's method. See, e.g., Tsai, Roger Y. (1986) "An Efficient and Accurate Camera Calibration Technique for 3D Machine Vision," Proc. of IEEE Conf. on Computer Vision and Pattern Recognition, Miami Beach, Fla., 1986, pp. 364-374. For example, one approach to determine the intrinsic and extrinsic parameters of a camera involves placing physical markers, known as fiducials, in various measured or known locations in the event facility such that the fiducials can be seen clearly enough to be identified from the camera images, and at least one fiducial will always be visible to the camera while the camera is pointed at the event facility. A computer using optical recognition technology can find the fiducial in the video frame and, based on the mark's size, shape, color and/or position in the video frame, determine the camera parameters. Another approach to determining intrinsic and extrinsic parameters of a camera involves placing fiducials in various measured or known locations in the event facility such that each fiducial looks different, but the fiducials may be removed after camera parameters have been determined. A computer implementing a camera parameter estimation algorithm based on manual user interaction rather than, or in addition to, image recognition can determine camera parameters.

FIG. 1A also shows a microphone 162 located near home plate 104. As will be described in additional detail below, in accordance with certain embodiments, sound picked up by the microphone 162 can be used to detect or assist with detecting foul tips, and/or to detect or assist with detecting whether a baseball was caught in a catcher's mitt, but is not limited thereto. For example, sounds picked up by the microphone 162 can be provided to processing facility 164 and used, in combination with images captured by one or more of the cameras 160, to determine whether a foul tip occurred, or whether a baseball was caught in a catcher's mitt. Such determinations can be made by saving sound signatures associated with a ball making contact with a bat, foul tips and/or a ball being caught in a catcher's mitt, and comparing later captured sounds with the saved sound signatures. In one alternative, instead of locating one or more microphone 162 near home plate 104, the microphone 162 can be designed to be located elsewhere but to pick up sounds from near home plate 104. Currently, most television broadcasters will bring many microphones to the game in order to pick up sounds from the playing field. It is customary for a broadcaster to locate one microphone near home plate 104. If the broadcaster is already locating a microphone near home plate 104, an additional microphone may not be necessary. That is, the system of an embodiment of the present technology can use a microphone already used by a broadcaster at a game. Even if a broadcaster has a microphone at the game, the system can still use a separate microphone. A broadcaster's microphone will typically be in communication with production audio, which is the production equipment used by the broadcaster at the game to produce the audio portion of a broadcast. The output of production audio, which is a signal received from a microphone with some modifications (e.g. amplification, filtering, etc.) can be sent to an audio detector, which is an electronic device that can detect one or more predetermined sounds, such as the sound of a bat hitting a baseball. Other sounds can also be detected. When an audio detector detects the sound of the bat hitting the ball, it can send a signal indicating that detection to a computer. It is possible, in some embodiments, to bypass production audio. That is, a microphone can communicate directly to an audio detector, which could include any necessary amplification and filtering circuits.

FIG. 1B further details of the processing facility 164 and cameras 160 of FIG. 1A. The computer system 170 is a simplified representation of a system which might be used at the processing facility 164 (FIG. 1A), for example. The computer system 170 includes a storage device 171 such as a hard disk or portable media, a network interface 172 for communicating with other computer systems, one or more processors 173 for executing software instructions, a working memory 174 such as RAM for storing the software instructions after they are loaded from the storage device 171, for example, camera interfaces 175A, 175B, 175C and 175D, and a user interface 176. The camera interfaces 175A, 175B, 175C and 175D can be referred to collectively as camera interfaces 175, or individually as a camera interface 175. The storage device 171 may be considered to be a processor readable storage device having processor readable code embodied thereon for programming the processor(s) 173 to perform methods for providing the functionality discussed herein. The user interface 176 can provide information to a human operator based on the data received from the cameras 160 via the camera interfaces 175. The user interface 176 can include a display and can use any known display scheme, whether graphical, tabular or the like. In addition to an on-screen display, an output such as a hard copy from a printer can be provided to report results. Additionally, or alternatively, the user interface 176 can include a speaker so that audio outputs can be provided to a user, e.g., an umpire or other person. In a specific embodiment, the user interface 176 includes a both a display and a speaker or headphones, so that outputs can be audio-visual. Results can also be reported by storing data at the storage device 171 or other memory, e.g., for later use. Results could also be sent via the network interface 172 and the Internet or other wide area network, to another, computer and/or central storage location. In certain embodiments, the results can include a digital record of a baseball game or portions thereof. The computer system 170 is also shown as including an audio interface 177 that receives audio captured by the microphone 162 and converts the captured audio into audio data that can be processed by the processor(s) 173. In accordance with certain embodiments, one or more of the processor(s) 173 are used to perform steps that are described below, e.g., with reference to FIG. 4, as being autonomously performed. More generally, one or more of the processor(s) 173 can be used to perform the various steps described below with, or without, reference to the flow diagrams in the FIGS.

The user interface 176 is one example of an output device that can be used to provide autonomous indications of whether a "strike" or a "ball" occurred, a ball was hit fair or foul, whether a foul tip occurred, and/or the like. In FIG. 1B, the user interface 176 is shown as being within the processing facility. Alternatively, or additionally, a user interface 176 can be located external to the processing facility, so that an umpire or other person located within or close to the ball park 100 can observe or listen to the user interface 176. For example, in certain embodiments the user interface 176 includes a visual display that provides visual indications of whether a "strike" or a "ball" occurred, a ball was hit fair or foul, whether a foul tip occurred, and/or the like. Such visual indication can be textual, graphical, or combinations thereof. The user interface 176 can alternatively, or additionally, include an audio transducer that provides auditory indications of whether a "strike" or a "ball" occurred, a ball was hit fair or foul, whether a foul tip occurred, and/or the like. The audio transducer can be a speaker or headphones, but are not limited thereto. The user interface 176 can also display and/or provide audio related to other information, such as the a "ball" and "strike" count, the number of outs, the current inning, and/or the like.

An example camera 160A includes intrinsic parameter sensors 179 and extrinsic parameter sensors 180. The intrinsic parameter sensors 179 can identify a zoom setting, whether an extender is used and so forth. The extrinsic parameter sensors 180 can identify an orientation of the camera 160A, such as a pan and tilt of the camera. Note that sensors are not needed when the parameter of concern is not changing. The camera 160A communicates image data, whether analog or digital, in addition to data from the intrinsic parameter sensors 179 and the extrinsic parameter sensors 180 to the computer system 170 via the camera interface 175. The image data can include video images captured by the camera 160A. Similarly, the other cameras 160B, 160C and 160D, which can each include intrinsic parameter sensors and extrinsic parameter sensors, can communicate image data to the camera interfaces 175B, 175C and 175D. Data from more or fewer than four cameras 160 can be received as well.

While not specifically shown in FIG. 1A or 1B, a Vertical Interval Time Code (VITC) inserter can be associated with one or more of the cameras 160. Such VITC inserter(s) can be used to add time codes, time stamps, camera IDs, and/or the like, to video captured by the one or more of the camera 160. Each VITC inserter can be implemented as part of a camera 160, part of a camera interface 175, or as a distinct component. Additional details of the VITC inserter are described below with reference to FIGS. 3, 7 and 8.

Further, the functionality described herein may be implemented using one or more processor readable storage devices (e.g., 171 and 174) having processor readable code embodied thereon for programming one or more processors to perform the processes described herein. The processor readable storage devices can include non-transitory, tangible computer readable media such as volatile and nonvolatile media, removable and non-removable media. Computer readable media includes volatile and nonvolatile, removable and non-removable media implemented in any method or technology for storage of information such as computer readable instructions, data structures, program modules or other data. Computer readable media includes RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other non-transitory, tangible medium which can be used to store the desired information and which can be accessed by a computer.

FIG. 1C depicts a relationship between camera, image and world coordinate systems, for use by the processing facility of FIG. 1C for tracking a ball that travels towards a batter, and a bat that is held and potentially swung by that batter. A camera coordinate system 196, which includes orthogonal axes Xc, Yc and Zc in three dimensions, is fixed relative to the camera. The origin of the coordinate system may be at the center of projection of the lens, in one possible approach, modeling the camera as a pinhole camera. An image coordinate system 190, also referred to as pixel space or image space, includes orthogonal axes X and Y in two-dimensions, and is fixed relative to a captured image 192. A world coordinate system 197, also referred to as world space, which includes orthogonal axes $X_W$, $Y_W$ and $Z_W$, is fixed relative to, e.g., the earth, a baseball park or other event site, or other reference point or location. Image space is an example of a 2D space, whereas world space is an example of a 3D space. Generally, it is desirable to describe the position and/or path of the tracked object 191 (e.g., a tracked baseball) in the world coordinate system 197, which is a 3D coordinate system, as this is typically the coordinate system in which its motion of objects (e.g., a ball and/or a bat) is most relevant, and allows easier integration of the information from several cameras. The line of position 194 is an imaginary line which extends from the origin of the camera coordinate system 196, which as noted above can be the center of projection of the lens, through a pixel in the image 192, intersecting the pixel at a point 193, and through the tracked object 191. Each pixel in the image 192 corresponds to a different line of position (LOP). Point 193 in the captured image 192 represents the location of an object 191 (e.g., a head of a baseball bat) in the image. The location of the object in the image 192 can be represented by coordinates (sx, sy) in a coordinate system which has its origin at a corner of the image, in one approach. The coordinates may identify the center of an object, such as a ball. When the object that is a tracked is a bat held by a batter (which is a human participant), or the object that is tracked is a human participant, characteristics such as the outline of the object can be detected.

Further, the line of position (LOP) can be represented by a 3D vector that has unity magnitude, in one approach. The vector can be defined by two points along the LOP. Alternatively, the vector can be defined by one point along the LOP, if the center of projection of the lens is known. The vector can be represented in the world coordinate system 197 using an appropriate transformation from the image coordinate system. The Zc axis of the camera coordinate system, which is the optical axis 195 of the camera, intersects the captured image at a point represented by coordinates $(0_x, 0_y)$. A two-dimensional coordinate system extending from $(0_x, 0_y)$ can also be defined.

The camera registration process involves obtaining one or more transformation matrices which provide a conversion between the image coordinate system 190 and the world coordinate system 197. Further information can be found in E. Trucco and A. Verri, "Introductory techniques for 3-D computer vision," chapter 6, Prentice Hall, 1998, U.S. Pat. No. 5,912,700, issued Jun. 15, 1999, and U.S. Pat. No. 6,133,946, issued Oct. 17, 2000, each of which is incorporated herein by reference.

A 3D coordinate system described herein can also be used for determining whether a baseball that was hit is "fair" or "foul" by comparing autonomously determined locations of a ball to locations of the foul lines after the ball is hit by a bat. As noted above, a "foul ball" is a batted ball that settles on foul territory between home and first base, or between home and third base, or that bounds past first or third base on or over foul territory, or that first falls on foul territory beyond first or third base, or that, while on or over foul territory, touches the person of an umpire or player, or any object foreign to the natural ground. As also noted above, a foul fly shall be judged according to the relative position of the ball and the foul line, including the foul pole, and not as to whether the infielder is on foul or fair territory at the time he touches the ball, wherein "foul territory" is that part of the playing field outside the first and third base lines extended to the fence and perpendicularly upwards. By determining the locations of the foul lines and/or foul territory, and determining where/if a ball contacts the playing field, a system can autonomously determine whether a ball that was hit by a bat should be called "fair" or "foul," and an indication of the autonomous determination can be autonomously output, m accordance with certain embodiments of the present technology. Details of how to autonomously determine the locations of a ball are described below. Additionally technology, e.g., similar to those used in tennis to determine whether a tennis ball landed in bounds or out of bounds, can additionally or alternatively be used to autonomously determine whether a ball was hit fair or foul, especially where the ball lands on or close to a foul line. Other variations are also possible. The terms "autonomous" and "autonomously," as used herein, mean without requiring input from a human.

As noted above, the "strike zone" is that area over home plate the upper limit of which is a horizontal line at the midpoint between the top of the shoulders and the top of the uniform pants, and the lower level is a line at the hallow beneath the knee cap. The rules state that the strike zone shall be determined from the batter's stance as the batter is prepared to swing at a pitched ball. In accordance with certain embodiments of the present technology, a location of a strike zone associated with home plate 104 is determined automatically or semi-automatically using computer vision. Further, in accordance with certain embodiments of the present technology, a graphical image of the strike zone, which can also be referred to as a virtual strike zone, is added to video of a baseball game. In specific embodiments, the virtual strike zone graphic appears as either a two-dimensional (2D) or three-dimensional (3D) box, an example of which is shown in FIG. 2.

Figure 2:
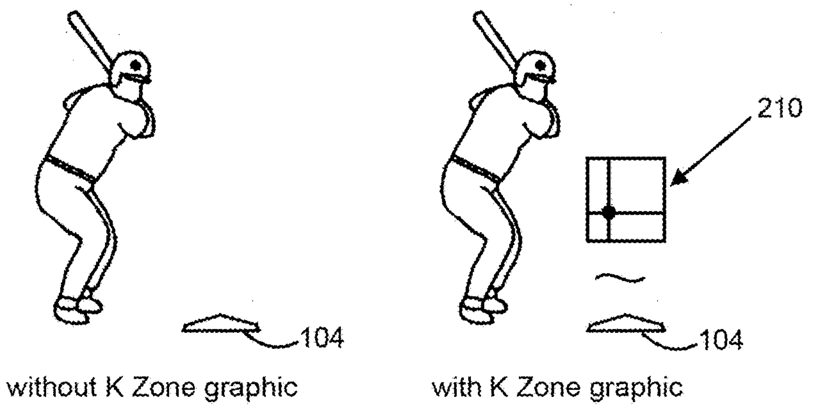
FIG. 2 illustrates an exemplary graphic effect of a strike zone that can be added in accordance with certain embodiments described herein.

As can be seen from FIG. 2, the left image shows a batter at home plate 104. The image on the right shows a batter at home plate 104 with a strike zone graphic 210 added by a system. In some (but not all) instances, the graphic will include cross hairs and a solid circle to indicate the location where the baseball intersected the front plane of the strike zone. In accordance with certain embodiments, as different cameras are used and/or panned/tilted, the 3D strike zone can be seen from different perspectives. The system, however, may not take measures to account for occlusions, in certain embodiments.

A system according to an embodiment of the present technology includes two subsystems: a tracking system and an enhancement system. The tracking system can be used to track the 3D positions a pitched baseball, a bat and/or a strike zone. The enhancement system can be used to add desired graphical effects to video of a baseball game. For example, the enhancement system can add a strike zone graphic to video. The enhancement system can also add an indication (e.g., a solid circle) indicative of the location of a pitched ball relative to the strike zone. The enhancement system may also provide a graphical representation of the path of a swung baseball bat. In certain embodiments, the enhancement system can indicate whether a pitched baseball traveled through the strike zone. The enhancement system can additionally display the number of strikes, balls, and/or the like, associated with an at bat. The enhancement system may also indicate whether or not a foul tip occurred. Other variations are also possible.

Figure 3:
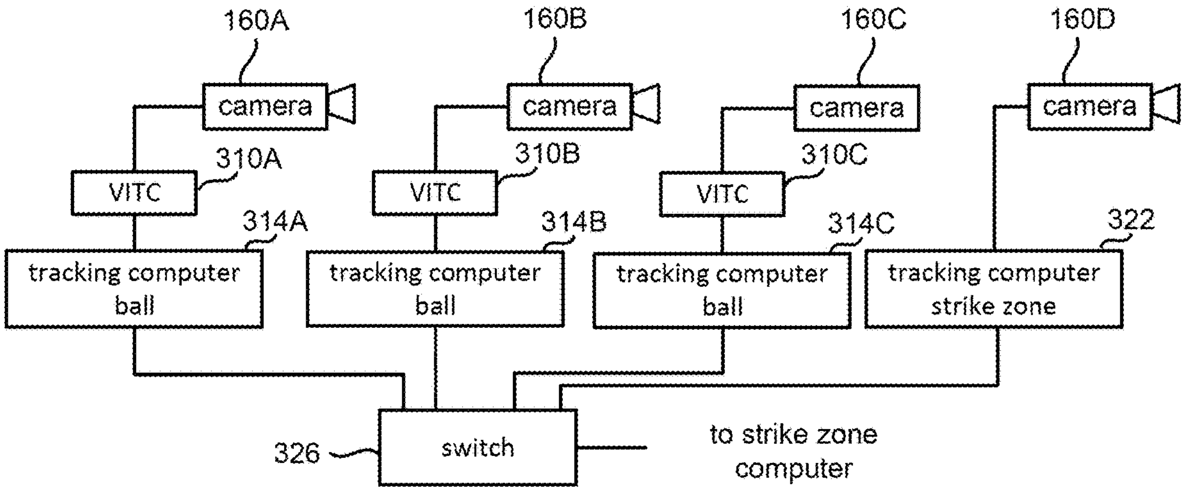
FIG. 3 is a block diagram of exemplary components of a tracking system that can be used to track a baseball on its path from a pitcher to a batter, according to an embodiment.

FIG. 3 is a block diagram of the components of the tracking system, according to an embodiment. Referring to FIG. 3, the tracking system includes two or more cameras 160A, 160B and 160C for tracking a baseball and a camera 160D for tracking the height of the strike zone. In accordance with an embodiment, video images captured by the camera(s) 160A and/or 160C include at least the last half of the pitch, and preferably includes an entire pitch; the camera 160B is near and behind home plate; and the camera 160D, which is used for tracking the height of the strike zone, is positioned to have a good view of home plate 104. For example, the camera 160D can be located in center field. In certain embodiments, the cameras 160 do not provide video for broadcast, they are only used for tracking the strike zone, the ball and/or the bat. In other embodiments, one or more of the cameras 160 provide video for broadcast or at least for recording video of the game for viewing and/or analyzing at a later time.

The cameras 160A, 160B and 160C used for tracking the ball and/or the bat can communicate video to Vertical Interval Time Code (VITC) inserters 3 10A, 3 10B and 3 10C, which can be individually referred to as a VITC inserter 310, or collectively as VITC inserters 310. The video from each VITC inserter 310 is sent to a respective tracking computer 314A, 314B and 314C, which can be individually referred to as a tracking computer 314, or collectively as tracking computers 314. The tracking computers 314 are connected to each other and to the Strike Zone computer 322 (described below) via a switch 126 (e.g., using Ethernet). The tracking computer 322 connected to the camera 160D for tracking the strike zone has a graphical user interface (GUI) which is used to set the height of the strike zone. The tracking computers 314 and/or 322 can be located within the processing facility 164, in which case the tracking computers 314 and/or 322 can be implemented using one or more processor(s) 173, or other processor(s). The tracking computers 314 and/or 322 can alternatively be located remote from the processing facility 164.

Figure 4:
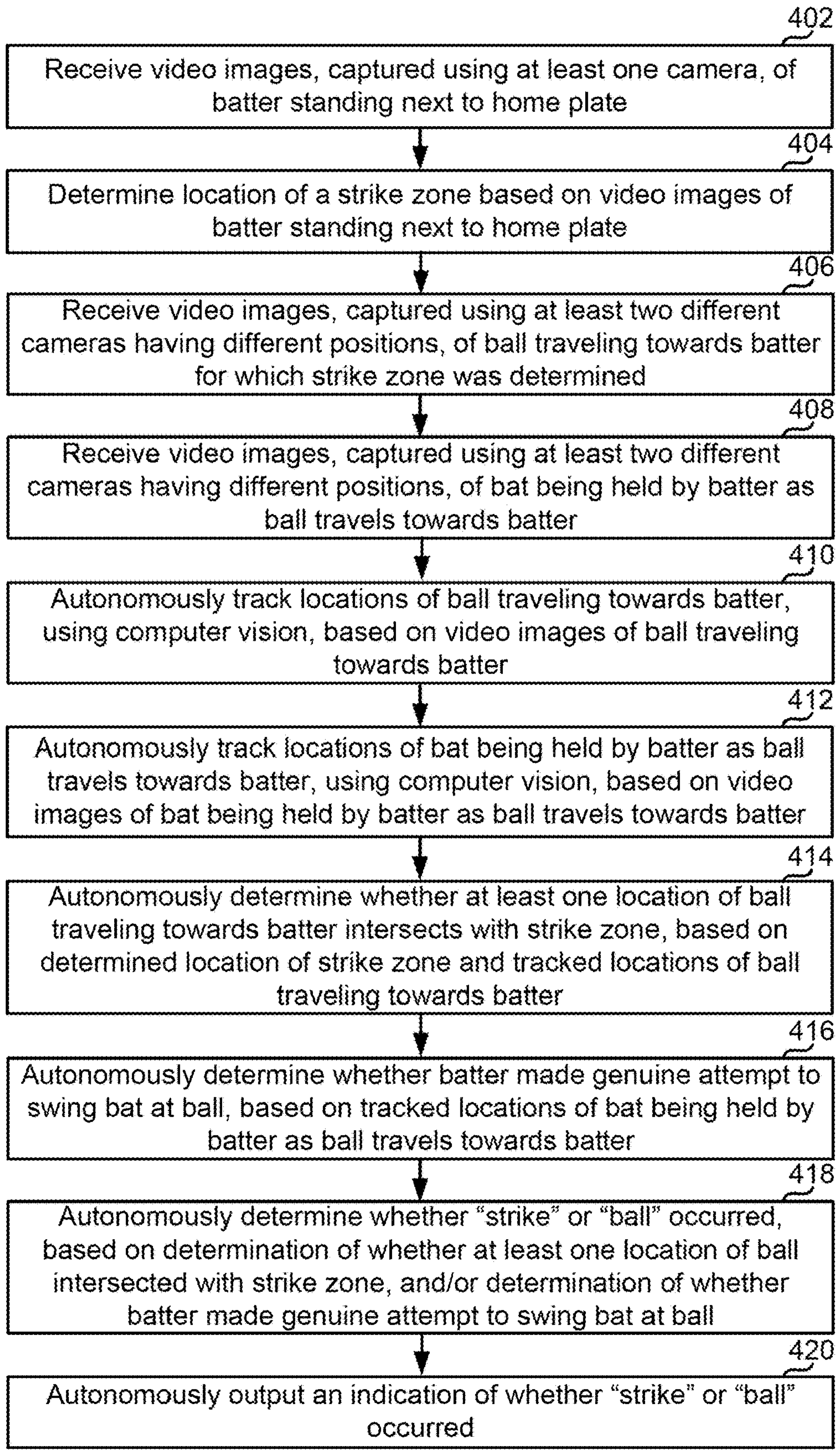
FIG. 4 is a flow diagram that is used to describe methods for use in automating or assisting umpiring of a baseball game, according to certain embodiments of the present technology.

The flow diagram of FIG. 4 will now be used to describe a method for use in automating or assisting umpiring of a baseball game, according to certain embodiments of the present technology. Referring to FIG. 4, step 402 involves receiving video images, captured using at least one camera (e.g., 160D), of a batter standing next to home plate (e.g., 104). Step 404 involves determining, based on the video images of the batter standing next to home plate, a location of a strike zone. Additional details of steps 402 and 404, according to specific embodiments of the present technology, are described below with reference to FIG. 5. Step 406 involves receiving video images, captured using at least two different cameras having different positions, of a ball traveling towards the batter for which the strike zone was determined. Step 408 involves receiving video images, captured using at least two different cameras having different positions, of a bat being held by the batter as the ball travels towards the batter. The video images received at step 406 can be captured, e.g., using at least two of the cameras 160A, 160B and 160C. Similarly, the video images received at step 408 can be captured, e.g., using at least two of the cameras 160A, 160B and 160C. At least some of the video images of the bat being held by the batter, which images are received at step 408, may (or may not) be the same as at least some of the video images of the ball traveling towards the batter, which images are received at step 406. The cameras 160 that captured the video images received at step 408 can be the same or different than the cameras 160 that captured the video images received at step 406.

Still referring to FIG. 4, step 410 involves autonomously tracking locations of the ball traveling towards the batter, using computer vision, based on the video images of the ball traveling towards the batter. Additional details of steps 406 and 410, according to specific embodiments of the present technology, are described below with reference to 6-9. Additional details of steps 406 and 410, according to alternative embodiments of the present technology, are described below with reference to 10A, 10B and 11-18. Still referring to FIG. 4, step 412 involves autonomously tracking locations of the bat being held by the batter as the ball travels towards the batter, using computer vision, based on the video images of the bat being held by the batter as the ball travels towards the batter. Step 414 involves autonomously determining whether at least one location of the ball traveling towards the batter intersects with the strike zone, based on the determined location of the strike zone and the tracked locations of the ball traveling towards the batter. Step 416 involves autonomously determining whether the batter made a genuine attempt to swing the bat at the ball, based on the tracked locations of the bat being held by the batter as the ball travels towards the batter. Step 418 involves autonomously determining whether a "strike" or a "ball" occurred, based on the determination of whether at least one location of the ball intersected with the strike zone, and/or the determination of whether the batter made a genuine attempt to swing at the ball. Step 420 involves autonomously outputting an indication of whether a "strike" or a "ball" occurred. For example, at step 420 an output device (e.g., the user interface 176) that includes a visual display can provide visual indications of whether a "strike" or a "ball" occurred, wherein the visual indication can be textual, graphical, or combinations thereof. The output device can alternatively, or additionally, include an audio transducer that provides auditory indications of whether a "strike" or a "ball" occurred.

In discussion of FIG. 4, and other FIGS. Herein, the terms "position" and "location," when referring to a ball or a bat, are used interchangeable. In other words, the position of a ball and the location of a ball mean the same thing, and the position of a bat and the location of a bat meant the same thing.

Determining Location of Strike Zone

Steps 402 and 404, which were introduced above with reference to FIG. 4, are performed in order to determine a location of a strike zone. Additional details of steps 402 and 404, according to specific embodiments of the present technology, will now be described with reference to the flow diagram of FIG. 5. More specifically, FIG. 5 is a flow diagram describing a process for setting boundaries of a strike zone.

Figure 5:
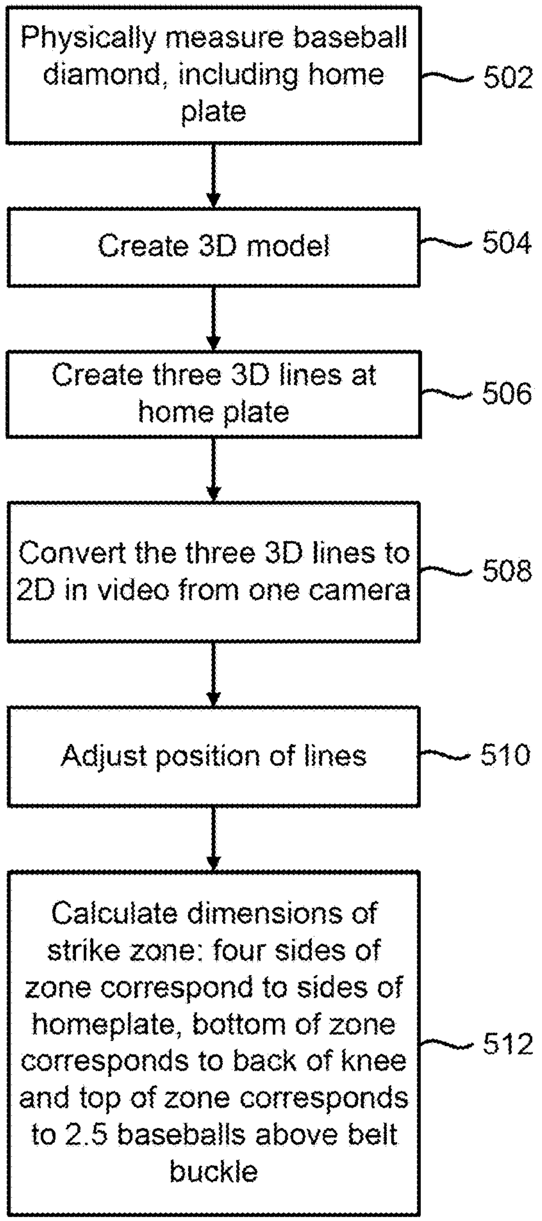
FIG. 5 is a flow diagram that is used to describe how a location of a strike zone can be determined, in accordance with certain embodiments of the present technology.

Referring to FIG. 5, prior to a baseball game, the physical dimensions of the baseball diamond (e.g., 102) including home plate are measured, as indicated at step 502. A 3D coordinate system can be defined with the origin of the coordinate system at the tip of the triangular rear of home plate (e.g., 104). This 3D coordinate system can be used for tracking the baseball, the bat, the strike zone and various edges (discussed below). The measurements for the baseball diamond can be made in this coordinate system. The system creates three parallel lines in the 3D coordinate system, as indicated at step 506. Each of the three lines is at a different height. The 3D coordinates of the three lines are converted to 2D positions in the video from the camera 160D using a transformation matrix, as indicated at step 504, based on the orientation and location of the camera 160D in center field, as indicated at step 508. The converted lines are then projected on the video from the camera 160D. Sliders on a GUI from the tracking computer can be moved to adjust the positions of the lines, as indicated at step 510. There can be one slider for each line. In accordance with an embodiment, an operator moves the sliders so that the bottom line is at the bottom of the batter's feet, the middle line passes through the hollow of the back of the batter's knee and the top line passes through the batter's belt buckle. As the batter moves, the operator can move the three sliders. An operator can also move a joystick to adjust the top line, also referred to as the belt buckle line. In accordance with an embodiment, when the belt buckle line moves in response to the joystick, the knee line also moves to maintain the ratio of spacing between the lines. The system can also operate with separate joysticks for the belt buckle line and the knee line. When a line is moved, the tracking computer changes the 3D location of the appropriate line(s). Once a 3D position of a line is changed, the new 3D position is transformed to a new 2D position in the video and the line is moved in the video accordingly.

At step 512, the system calculates the dimensions of the strike zone. In accordance with an embodiment, step 512 is accomplished as follows. The four sides of the 3D box representing the strike zone are defined by the dimensions of home plate. The bottom of the strike zone is set to at the back of the hollow of the batter's knee. This corresponds to the middle line of the three lines. In accordance with an embodiment, the top of the strike zone corresponds to a position 2½ diameters of a baseball above the batter's belt buckle (the top line), or more generally, the top of the strike zone corresponds to predetermined distance (e.g., ~7¼ inches, or 18½ centimeters) above the batter's belt buckle. Alternative techniques for determining the location of the strike zone are also possible and can be used with the embodiments described herein.

It would also be possible to automate the steps described above as being performed by an operator, thereby eliminating the need for an operator. It would also be possible to use an operator to help define a strike zone for each plurality of batters the first time the batters are at bat, save information about each player's strike zone, and then reuse the saved information the next time a batter has had their strike zone defined is at bat.

Autonomously Tracking Locations of Ball Traveling Towards Batter

Step 406, as mentioned above in the discussion of FIG. 4, involves receiving video images, captured using at least two different cameras having different positions, of a ball traveling towards the batter for which the strike zone was determined. The video images received at step 406 can be captured, e.g., using at least two of the cameras 160A, 160B and 160C. Step 410 involves autonomously tracking locations of the ball traveling towards the batter, using computer vision, based on the video images of the ball traveling towards the batter. Additional details of steps 406 and 410, according to certain embodiments of the present technology are described below with reference to the flow diagram of FIG. 6. The steps described with reference to FIG. 6 can be performed, for example, by the tracking system of FIG. 3, discussed above, or more generally, by the processing facility 164, and even more generally, by one or more processors.

Figure 6:
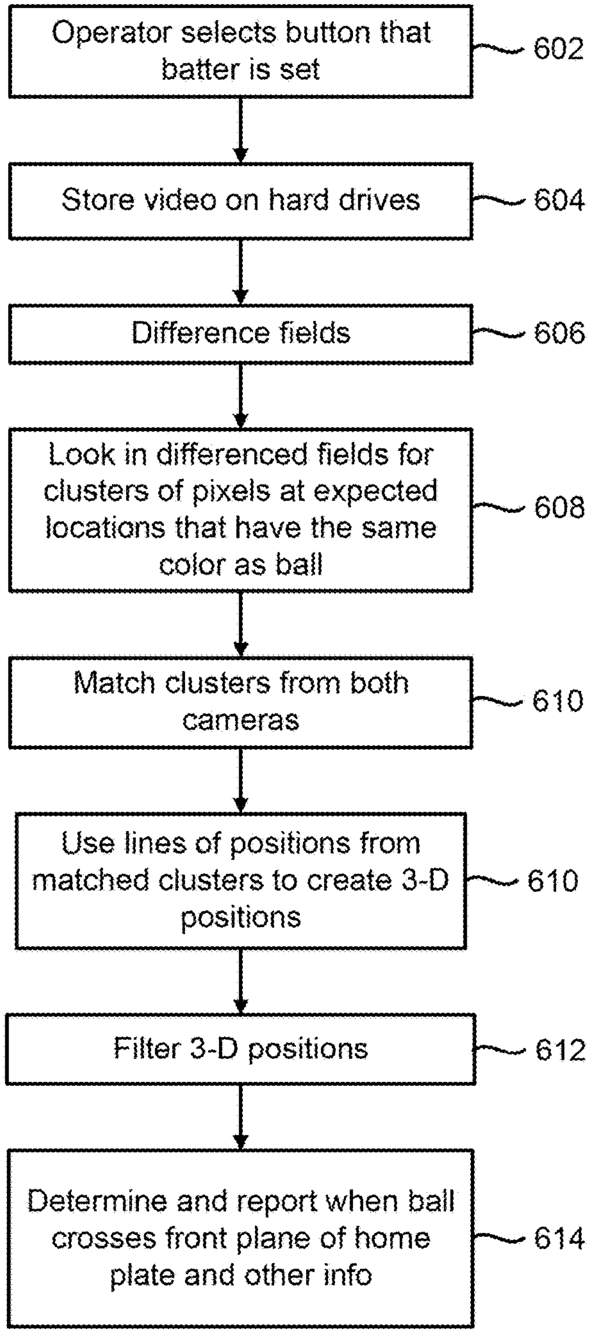
FIG. 6 is a flow diagram that is used to describe how a baseball can be tracked, in accordance with certain embodiments of the present technology, as the baseball travels from a pitcher towards home plate.

Referring to FIG. 6, at step 602, the operator of the GUI for the master tracking computer will push a button on the GUI or keyboard to indicate that the batter is set. A batter is set when the batter's front foot is planted. The set button can indicate to the system to stop accepting data about the height of the strike zone, and can also be used as a trigger the system to save the last second (or other predetermined amount of time) of video and the next second (or other predetermined amount of time) of video to a hard disk, as indicated at step 604. The video saved at step 604 is an example of the video images of the ball traveling towards the batter that is received at step 406 in FIG. 4. At step 606, the fields of stored video are then differenced against adjoining-in-time fields (e.g., even fields are differenced against previous even fields and odd fields are differenced against previous odd fields).

Each tracking computer looks at the differenced fields from its associated camera 160, at step 608. Prior to the game, an operator can indicate where in the video the ball is expected to be during a pitch. The tracking computer can look in those areas for a cluster of pixels that are in the YUV color space of the ball's color. Pre-set variables can define the minimum and maximum sizes of a cluster in numbers of pixels, as well as acceptable shapes for the cluster's bounding box. A number of clusters can thus be identified in each field. After a few consecutive fields are processed, the system selects at most one cluster based on relative position: the cluster must be identifiable in subsequent fields, with different positions obtained by a regular translation. The translation parameters (direction, amplitude) are pre-set variables. All such variables can be interactively modified during the operation of the system.

If clusters were selected for two or more of the cameras 160, they are matched, at step 610. For each pair of matched clusters, a 3D position is determined by creating symbolic lines of position from each camera to the potential ball location based on the cluster, as indicated at step 610. An adjoining line is determined at the closest point of intersection between the two lines of position. The 3D position determined is based on the x coordinate of the position where the determined adjoining line crosses the line of position from the camera 160B. The y and z coordinates are based on the y and z coordinates of the position where the determined adjoining line crosses the line of position from the camera 160A. The resulting set of 3D locations are operated on by a Kalman filter, or other filter, which filters the data and creates a set of 3D locations representing the path of the ball, as indicated at step 612.

By knowing the 3D positions and the 3D positions of the strike zone, the system can determine when and where the ball intersected (or would have intersected) the plane at the front surface of the strike zone, as indicated at step 614. The tracking computer reports to the Strike Zone computer a time code indicating when the ball crossed the plane, the 3D location where it crossed the plane, whether it was a strike or a ball, and a 3D location for where the ball would have hit the catcher's glove. The height information for the strike zone is also communicated a various times during the game. The 3D location for where the ball would have hit the catcher's glove is estimated by determining the trajectory of the ball and predicting where it will be one frame after it crosses the front surface of the strike zone. Step 614 is an example of what can be used to provide the determination at step 418 in FIG. 4.

The enhancement subsystem of the system may include, e.g., four cameras, associated hardware, and a production center. The cameras 160 shown in and discussed above with reference to FIGS. 1A, 1B and 3 are examples of such cameras, but alternative cameras and locations for such cameras can be used. In accordance with an embodiment, the four cameras include a camera (e.g., 160B) located at a high location on the stadium behind home plate (high home), a camera (e.g., 160A) located at a low position near the first baseline (low first), a camera (e.g., 160C) located a low position near the third baseline (low third), and a camera (e.g., 160D) in center field (center field). The positions vary based on the production requirements and/or the stadium. In accordance with an embodiment, the high home camera (e.g., 160B) and the center field camera (e.g., 160D) do not pan, tilt or zoom, and the low first and low third cameras (e.g., 160A and 160B) can pan, tilt and zoom.

Figure 7:
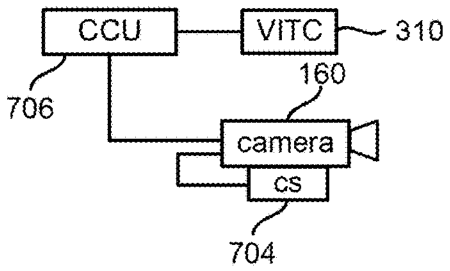
FIG. 7 is a block diagram used to describe exemplary equipment of certain cameras (e.g., low first and low third cameras) that can be used to implement certain embodiments of the present technology.

FIG. 7 is an exemplary block diagram of the equipment for the low first and low third cameras (e.g., 160A and 160C), according to an embodiment. The low first and low third cameras (e.g., 160A and 160C) are each associated with a set of camera sensors (CS) 704. These camera sensors 704 can include, e.g., an optical shaft encoder to measure pan, an optical shaft encoder to measure tilt, a set of inclinometers that measure attitude of the camera head and electronics for sensing the positions of the camera's zoom lens and extender. In an embodiment, the information from the camera sensors 704 is encoded on an audio signal and sent down one of the microphone channels from the camera 160 to a camera control unit (CCU) 706. The CCU 706 can transmit the video to a VITC inserter 310 which adds a time code. The output of the VITC inserter 310 can be sent, e.g., to the processing facility 164, which can be a mobile facility such as a truck which is parked outside the baseball park, which can include one of the edge tracking computers (discussed below). The audio signal from CCU 706 can be sent to an audio demodulator (e.g., 802, discussed below with reference to FIG. 8).

Figure 8:
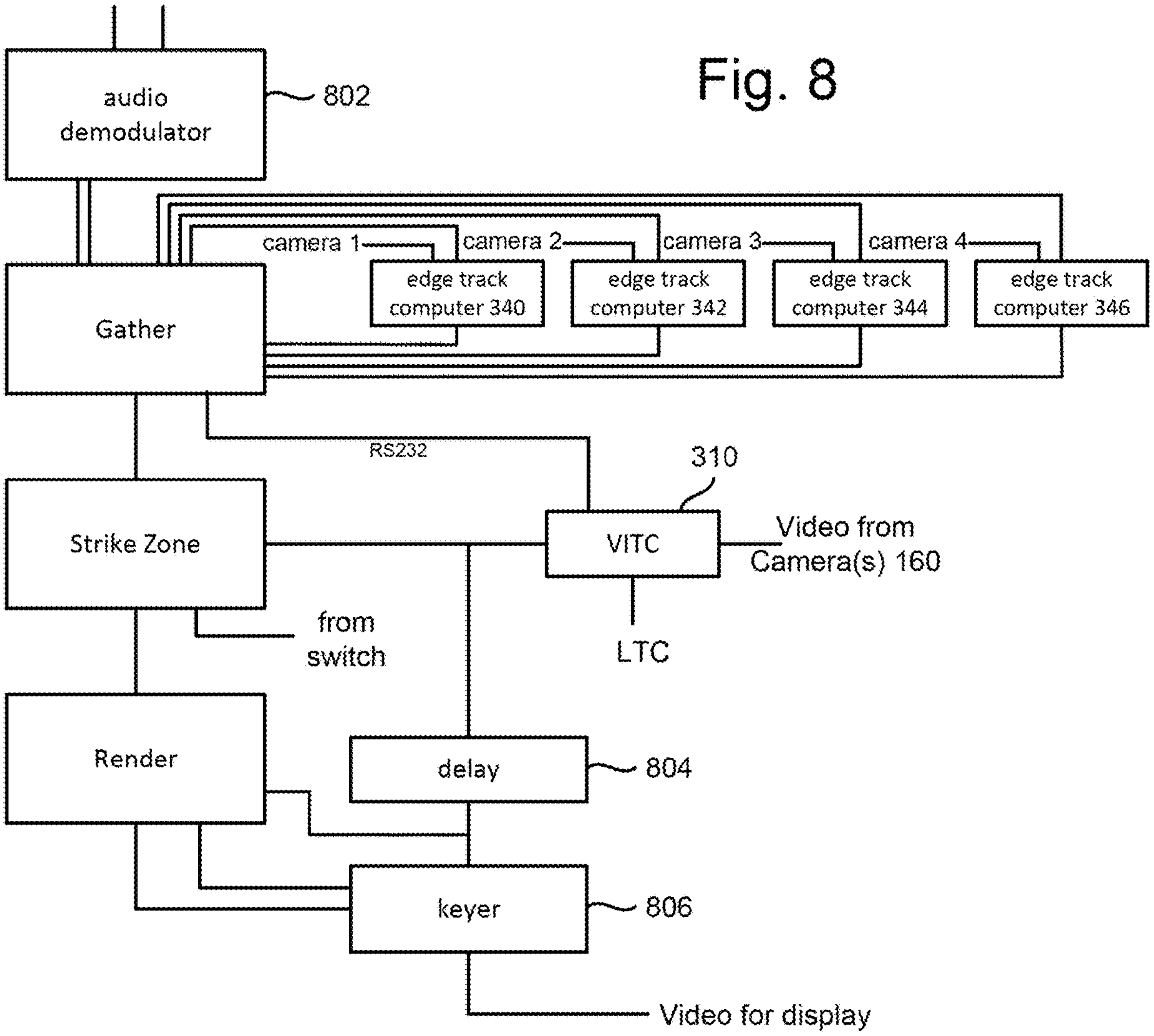
FIG. 8 is a block diagram of an exemplary enhancement subsystem that can be used to enhance video images with a virtual strike zone and/or other graphic effects, in accordance with certain embodiments of the present technology.

In accordance with certain embodiments of the present technology, an enhancement subsystem within a processing facility (e.g. 164) is used to enhance video images with a virtual strike zone and/or other graphic effects. FIG. 8 is a block diagram an example of such an enhancement subsystem. As noted above, the processing facility 164 can be housed in a truck parked outside the baseball park, but is not limited thereto. Referring to FIG. 8, the audio signals from the appropriate cameras 160 are received by an audio demodulator 802 which extracts the camera sensor data and provides that camera sensor data to a computer, labeled as Gather. The camera sensor data is packaged and forwarded to another computer, labeled as the Strike Zone computer. One or more of the just mentioned computers can be implemented using one or more of the processors 173 discussed with reference to FIG. 1B. In accordance with an embodiment, video chosen to be enhanced can first be sent to a VITC inserter 310, which is synced with the other VITC inserters mentioned above. The VITC inserters 310 associated with the cameras 160 can add a camera ID and a time stamp to lines (e.g., lines 21 and 22, or lines 16-18) of a vertical blanking interval. The video from the VITC inserter 310 can be sent to the Strike Zone computer and a video delay 804. Time code data can be sent from the VITC inserter 310 to the Gather computer via an RS232 line, but is not limited thereto. Video from the video delay is transmitted to a keyer 806 and a render computer.

In accordance with an embodiment, the Strike Zone computer receives the camera sensor data from the Gather computer, receives the video from VITC inserter 310, and receives the ball positions and strike zone positions from a master tracking computer. The Strike Zone computer determines if and where to add the graphics to the video. This information is sent to the Render computer, which renders the graphical enhancement and sends that information to the keyer 806. The keyer 806 adds the virtual strike zone, cross hairs and solid circle graphics from the Render computer to the delayed video. From the keyer 806, the video can be communicated to a broadcaster or other entity that displays and/or records the video.

Figure 9:
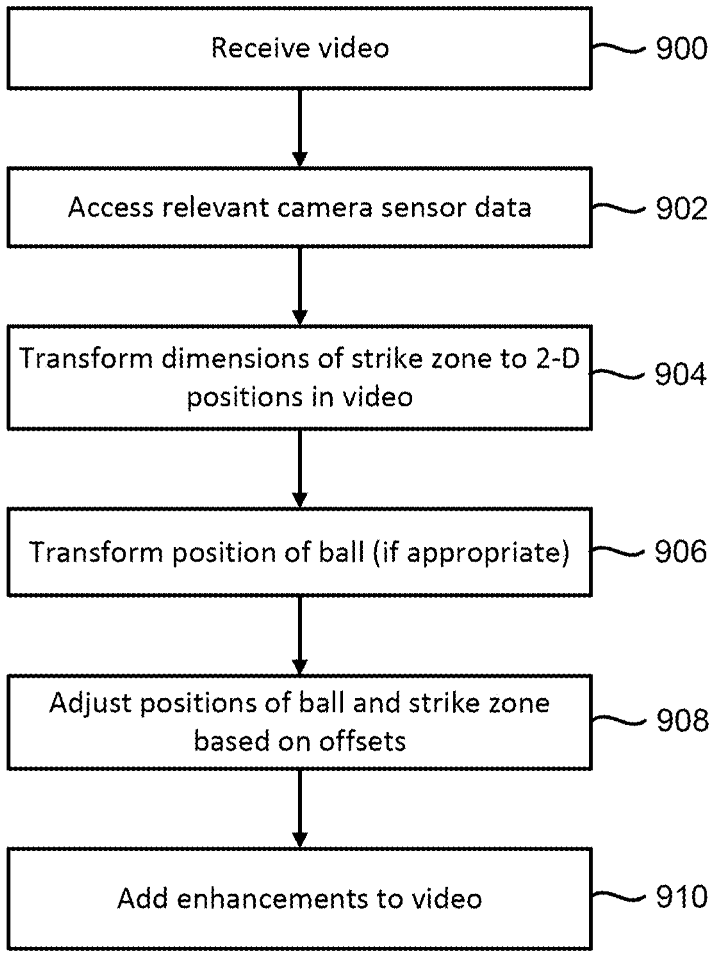
FIG. 9 is a flow diagram that is used to describe an exemplary process performed by the enhancement subsystem of FIG. 8.

FIG. 9 is a flow diagram that is used to describe an exemplary process performed by the enhancement subsystem of FIG. 8. As discussed above, the Strike Zone computer receives video from one or more cameras 160, as indicated at step 900. That video can include a camera identifier in the vertical blanking interval. Based on that camera identifier, the Strike Zone computer accesses the appropriate camera sensor data (at step 902) and transforms the locations of the strike zone (as indicated at step 904) and the ball (at step 906), if the ball is to be depicted in the video, to 2D positions in the video. The Strike Zone computer uses a transformation matrix based on the camera sensor data to perform the transformation. The positions of the strike zone and the ball are then adjusted based on offsets (at step 908). These offsets can include an X offset and a Y offset, which are in units of pixels. If the X offset is three pixels, then each of the positions determined for the strike zone and the ball are shifted in the X direction by three pixels. The offsets are a measure of the error in the camera sensor data. Such offsets can be determined, e.g., in the manner described in commonly assigned U.S. Pat. No. 7,341,530, which is incorporated herein by reference. After the positions of the strike zone and the ball are determined in the video, the virtual images of the strike zone, ball position and/or crosshairs are rendered by the Render computer. These images are then added to the video using the keyer 806 (at step 910).

The strike zone can be added to every frame of video that passes through the keyer 806. The crosshairs, however, need not always added to the video. In accordance with an embodiment, if the pitch is within the strike zone, a seven frame (or other number of frames) animation is created. In the first frame of the animation, the cross hairs are added with the center of the cross hairs being at the center of the strike zone. In the last (e.g., seventh) frame of the animation, the cross hairs are centered at the position that the ball intersects the front surface of the strike zone. The intervening frames can show the center of the cross hairs at intervening locations moving from the center of the strike zone to the position of the ball when it intersects the strike zone. Note that the last (e.g., seventh) frame depicts the game at the time the ball intersects the front surface of the strike zone.

In certain embodiments, if the pitch was outside the strike zone, the cross hairs are not added to the video. Instead, a circle is added to the video, indicating the position of the ball when it intersected the plane corresponding to the front surface of the strike zone. If a ball trail is used (if the camera angle is a side view and the pitch was within the strike zone) then a trail animates from the front plane of the strike zone to the estimated position of the ball where it contacted the catcher's glove. In an embodiment, this ball trail graphic does not use data from any positions prior to the ball intersecting the strike zone.

As discussed above, the transformed positions of the ball and strike zone can be adjusted based on an X offset and a Y offset. These offsets can be determined by the four edge track computers depicted in FIG. 8, where there is one edge track computer for each camera 160. In an embodiment, each edge track computer receives camera sensor data from the Gather computer and video for its associated camera 160. The edge track computer determines an X offset and a Y offset for the associated broadcast camera based on edges in the video. These offsets are reported to the Gather computer. The Gather computer transmits the offsets to the Strike Zone computer, which uses the appropriate offsets based on which camera supplied the video chosen by the broadcaster. Exemplary details of how edges can be selected for use by the edge computers is described in commonly assigned U.S. Pat. No. 7,341,530, which has been incorporated herein by reference, and thus, are not repeated herein.

FIGS. 3-9, discussed above, were used to describe certain techniques for tracking a baseball as it travels from a pitcher's mound towards home plate, for identifying a strike zone for a batter, and for determining whether or not the baseball passes through the strike zone. FIGS. 10A, 10B and 11-18, discussed below, are used to describe alternative techniques for tracking a baseball as it travels towards a batter using computer vision. Such alternative techniques for tracking a baseball as it travels from a pitcher's mound towards a batter can be used with the above described techniques for identifying a strike zone for a batter, and for determining whether or not the baseball passes through the strike zone.

Figure 10A:
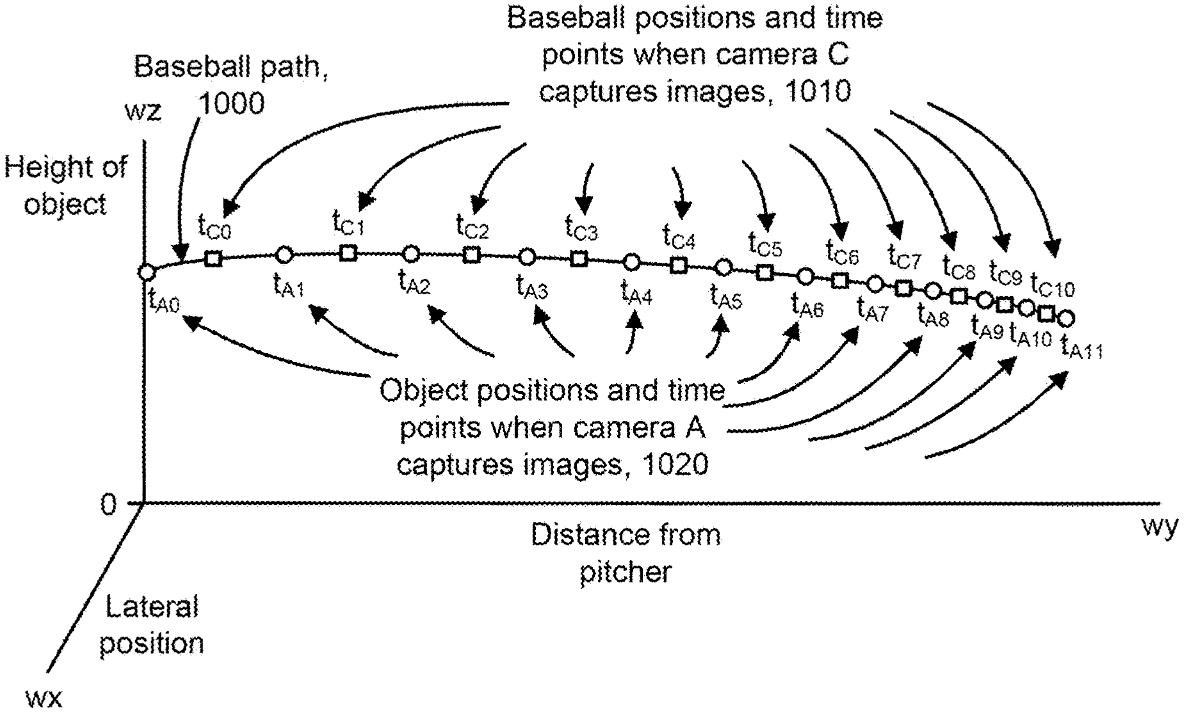
FIG. 10A depicts a baseball path from a first perspective in which a height of the baseball is depicted.

FIG. 10A depicts a baseball path 1000 from a first perspective in which a height of the baseball is depicted. The baseball path 1000 is depicted in a world coordinate system, which in this example is a Cartesian coordinate system having an axis wy which extends from home plate 104 to the pitcher's mound 132 and therefore represents a distance from home plate, an axis wz which represents a height of the baseball above the ground, and an axis wx which represents a lateral position of the baseball. Additional details of the world coordinate system were described above with reference to FIG. 1C. Other coordinate systems can also be used such as polar, spherical or other non-orthogonal coordinate systems. In accordance with certain embodiments, the cameras 160 are free running and use their internal clocks for determining an image capture rate. Thus, in such embodiments, the cameras capture images of the baseball in the path 1000 asynchronously, at different points in time, during a time interval in which the object is moving. For example, the camera 160A can capture images at time points represented by circles at $t_{A0}$, $t_{A1}$, $t_{A2}$, $t_{A3}$, $t_{A4}$, $t_{A5}$, $t_{A6}$, $t_{A7}$, $t_{A8}$, $t_{A9}$, $t_{A10}$ and $t_{A11}$, while the camera 160C captures images at time points represented by squares at $t_{C0}$, $t_{C1}$, $t_{C2}$, $t_{C3}$, $t_{C4}$, $t_{C5}$, $t_{C6}$, $t_{C7}$, $t_{C8}$, $t_{C9}$ and $t_{C10}$. Note that it is not necessary for each camera 160 to capture images at a fixed rate, or for the different cameras to capture images at the same rate. The example shown is meant to depict a fixed image capture rate by both cameras, where the object slows down as it nears the end of the path 1010. In other embodiments, the cameras are synchronized with one another.

Figure 10B:
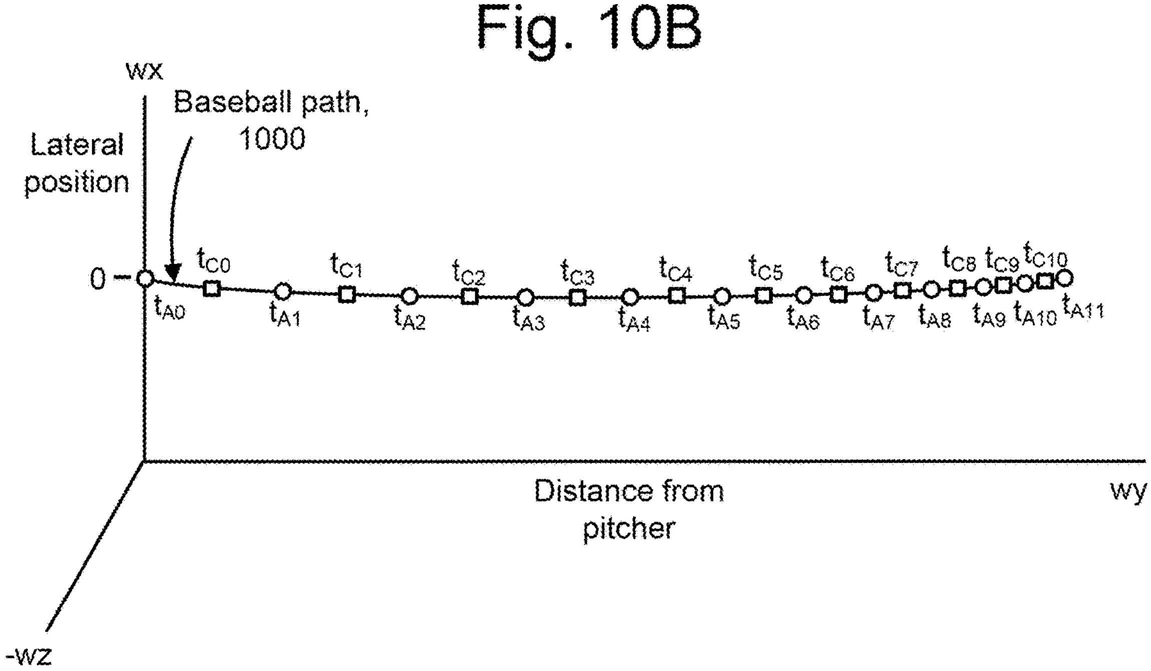
FIG. 10B depicts a baseball path from a second perspective in which a lateral position of the baseball is depicted.

FIG. 10B depicts the object path 1000 from a second perspective in which a lateral position of the object is depicted. The vertical axis is wx while the out-of-page axis is wz. Here, the lateral, e.g., sideways, movement of the baseball along the path 1000 is apparent. For instance, when the path of the baseball is tracked, the lateral movement may represent a curving of a pitch. While three-dimensional or higher-dimensional tracking is possible, in some cases it may be sufficient to track the object's position and/or path in a 2D plane or even along a one dimensional path.

Figure 11:
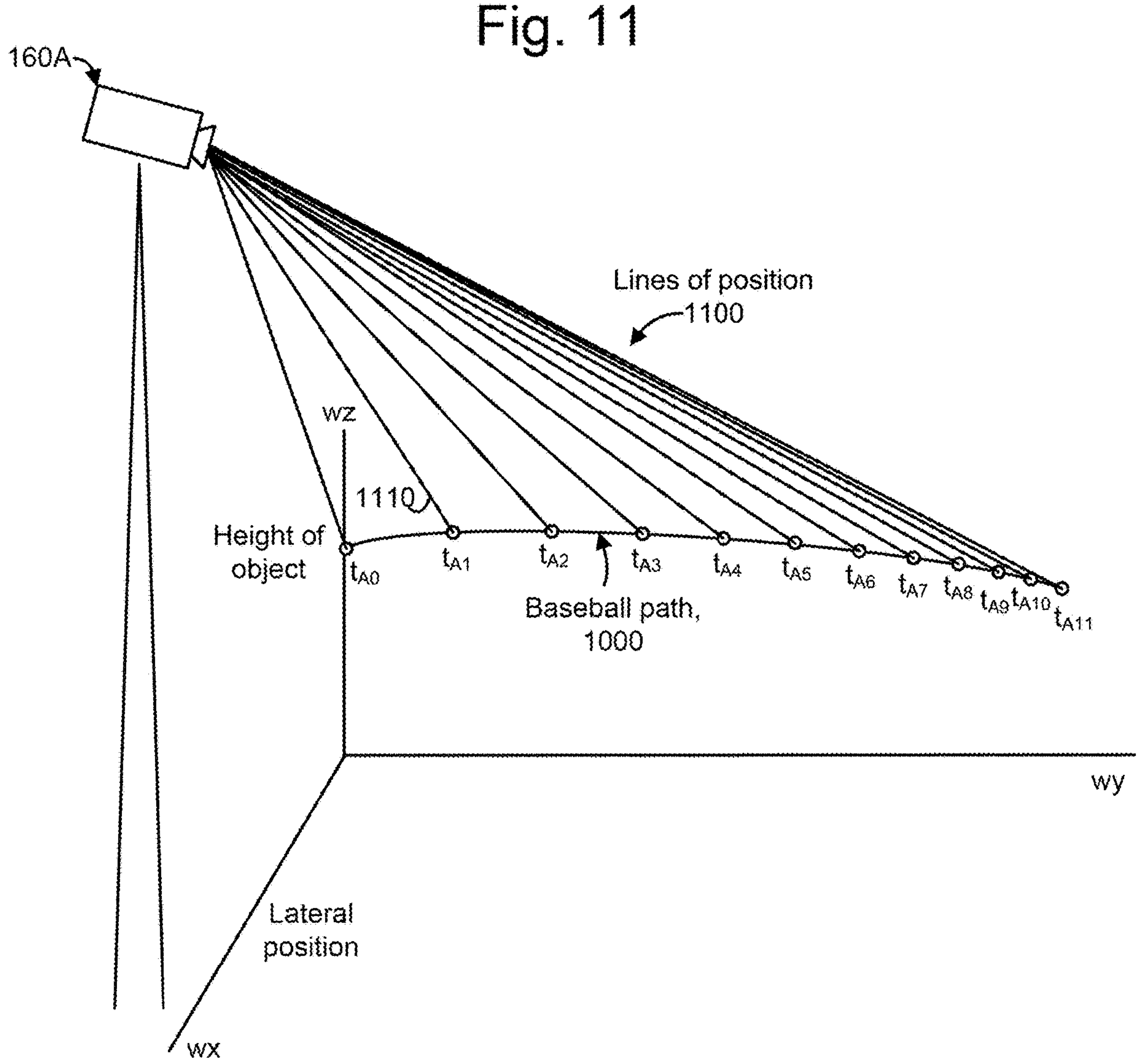
FIG. 11 depicts lines of position from a first camera to different locations of a baseball along a path.

FIG. 11 depicts lines of position from a first camera (e.g., 160A) to different locations of a baseball along a path. A line of position (LOP) represents an imaginary straight line that extends from a camera to the tracked object (e.g., a baseball) at a given point in time, and identifies a locus of points at which the object (e.g., baseball) could be located based on the camera's observation. Thus, for the camera 160A, lines of position 1100 extend from the camera, e.g., from the midpoint of the lens, to the different positions of the baseball at the different times the images of the baseball are captured by camera 160A. An example line of position 1110 represents a line which extends through a midpoint of the baseball at $t_{A1}$. In an example implementation, a baseball pitch might take 0.5 sec to go from the pitcher to home plate, in which case thirty lines of position, fifteen each from two cameras, might be captured if the capture rate of each camera is 30 frames per second.

Figure 12:
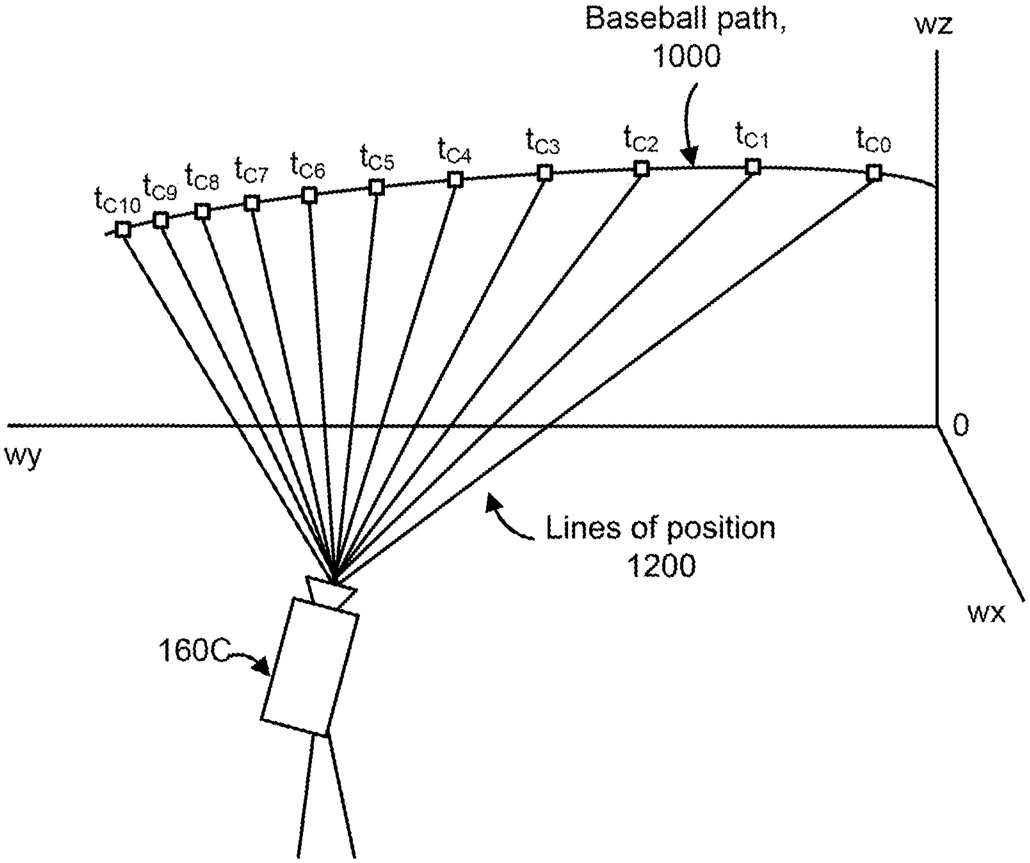
FIG. 12 depicts lines of position from a second camera to different locations of a baseball along a path.

FIG. 12 depicts lines of position from a second camera (e.g., 160C) to different locations of a baseball along a path. The perspective is opposite to that shown in FIG. 11, as values along the wy axis increase to the right instead of to the left. For camera 160C, lines of position 1200 extend from the camera, e.g., from the midpoint of the lens, to the different positions of the baseball at the different times the images of the baseball are captured by the camera 160C. Generally, it is desirable for the cameras to be positioned to capture images of the baseball from different viewpoints. In this example, the camera 160C is located at a lower height than the camera 160A and on an opposite side of the baseball's path than the camera 160A. The specific camera locations which are most advantageous depend on the expected path of the baseball, lighting, the ability to identify the baseball in the captured image based on contrast of the tracked baseball relative to a background scene, and other factors. It is also possible to use additional cameras beyond two. For example, the camera 160B can also be used.

It is possible but not required for the tracked baseball to be specially configured to make it easier to detect. For example, the baseball can be configured with passive or active tracking aids. A passive tracking aid could include, e.g., retro reflectors that make the baseball easier to see, while an active tracking aid could include, e.g., an infrared or other electromagnetic transmitter carried by the baseball.

Figure 13:
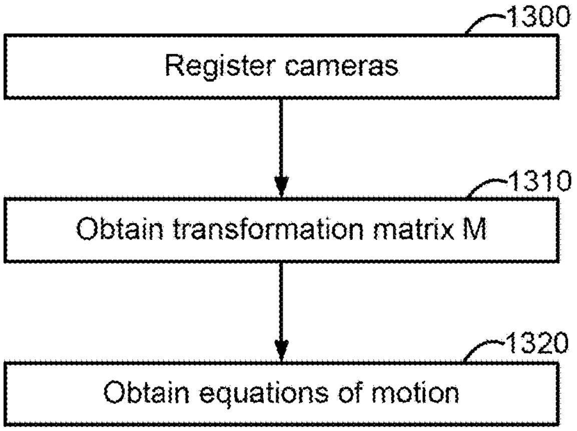
FIG. 13 is a flow diagram that depicts a process for obtaining information for determining the path of a baseball.

FIG. 13 depicts a process for obtaining information for determining the path of a baseball, according to certain embodiments. The steps indicated can be performed prior to tracking a baseball's position or at least prior to processing image data to track a baseball's position. Step 1300 refers to registering the camera. Registration, also referred to calibration, can involve aiming the camera at different reference marks in an event facility, capturing images of the marks, and recording intrinsic and extrinsic parameters of the camera at each mark, as well as the location of the object in the captured image. For example, home plate may be a reference mark. Intrinsic parameters, such as focal length, lens distortion and zoom setting represent characteristics of the camera design and settings, and do not depend on the position and orientation of the camera in space. Extrinsic parameters, such as tilt or pan, depend on the position and orientation of the camera in space. At step 1310, a transformation matrix M, discussed further below, is defined based on the registration as $$M = \begin{pmatrix} m00 & m01 & m02 & m03 \\ m10 & m11 & m12 & m13 \\ m20 & m21 & m22 & 1 \end{pmatrix}. \tag{1}$$

M relates the image coordinate system to the world coordinate system.

At step 1320, equations of motion of the tracked object (e.g., baseball) are obtained. Equations of motion express the 3D location of the object as a function of time. The equations of motion should be sufficiently accurate over the course of the measured trajectory. Approximate equations of motion and piecewise equations of motion that apply to portions of the trajectory are acceptable provided the estimated position of the object for any given relevant time is within required measurement accuracy. Further, the equations used should be suitable for the type of object tracked and the desired degree of tracking accuracy. For example, the equations of motion for a baseball under constant acceleration in the 3D world coordinate system are:

$$wx(t)=x0+vx0*t+(½)ax*t^2 \tag{2}$$

$$wy(t)=y0+vy0*t+(½)ay*t^2 \tag{3}$$

$$wz(t)=z0+vz0*t+(½)(az+g)*t^2 \tag{4}$$

The nine parameters x0, y0, z0, vx0, vy0, vz0, ax, ay and az, are coefficients of the equations of motion. Coefficients x0, y0, z0 denote the coefficients vx0, vy0, vz0 denote the velocity of the object in the three orthogonal directions at time t=0, and coefficients ax, ay, az denote the acceleration of the object in three orthogonal directions at time t. The acceleration can indicate, e.g., how much force is on the ball, denoting how much it is curving. For convenience, g denotes gravitational acceleration at −9.8 m/sec$^2$. While the above equations of motion are linear, one or more non-linear equations can be used as well. For example, a velocity squared term may be used when it is desired to account for atmospheric drag on an object in flight.

Figure 14:
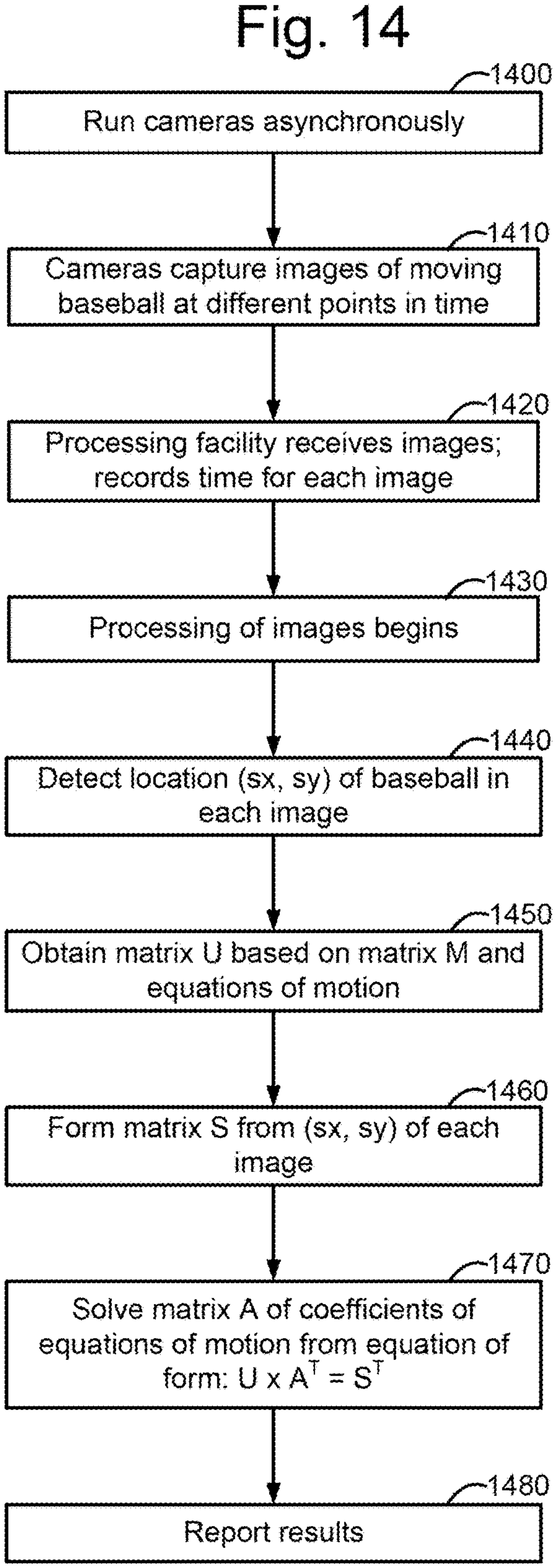
FIG. 14 is a flow diagram that depicts a process for determining the path of a baseball.

FIG. 14 depicts a process for determining the path of a baseball. Step 1400 includes running the cameras asynchronously. That is, the cameras run freely, using internal unsynchronized clocks for determining video capture rate. This technique avoids the need to genlock or otherwise synchronize the cameras so that they capture images at the same time. At a minimum there are two cameras. At step 1410, the cameras capturing images of the moving baseball at different points in time. At step 1420, the processing facility receiving the images and records a time at which each image is received. Accurate time stamping of the video received from the cameras can occur at the processing facility. If multiple clocks are used for time stamping, they are synchronized. Or, a single clock can be used. As discussed below, the accurate time stamp is used together with equations of motion for the baseball to solve for the position at any time, not just the time points at which the images are captured. At step 1430, processing of the captured images begins. This can include detecting the location of the baseball in the images as well as enhancing the images, as described below.

Step 1440 includes detecting a location of the baseball in each image. In each captured image, a position of the baseball can be detected in the coordinate system/pixel space (e.g., 190) of the captured image. For example, as discussed above in connection with FIG. 1C, in a captured image, a location of the detected baseball or other object (e.g., 193 in FIG. 1C) in the image is identified by the pixel coordinates (sx, sy), where sx denotes a horizontal position in the image and sy denotes a vertical position in the image. The baseball can be detected in the image in different ways. In one approach, the pixel or subpixel data of the image is processed to detect areas of contrast which correspond to the baseball. For example, a white baseball may contrast against the green grass of the playing field. The expected size of the baseball in pixels can be used to avoid false detections. For example, a contrasting area in the image which is significantly smaller or larger than the expected size of the baseball can be ruled out as representing the baseball. Moreover, once the position of the baseball in a given image is identified, its position m subsequent images can be predicted based on the position in the previous image.

Other various techniques for analyzing images to detect baseballs which will be apparent to those skilled in the art may be used. For example, various pattern recognition techniques can be used. Radar, infra-red and other technologies can also be used as discussed in U.S. Pat. No. 5,912,700, issued Jun. 15, 1999, and U.S. Pat. No. 6,133,946, issued Oct. 17, 2000, both of which are incorporated herein by reference.

When tracking the trajectory of a baseball in flight, the technique includes measuring the position of the ball in multiple video frames from multiple cameras. The ball is seen from two or more cameras, and a measurement is made of the pixel coordinates of the center of the ball in each frame (or field) of video.

Step 1450 includes obtaining a matrix U based on the transformation matrix M (see step 1310 of FIG. 13) and the equations of motion (see step 1320 of FIG. 13). For example, matrix and equations may be read from memory. Step 1360 includes forming a matrix S from the pixel coordinates (sx, sy) of each image. As mentioned, the cameras have been registered (see step 1300 of FIG. 13) to obtain a matrix M which provides a transformation from world coordinates to pixel coordinates, and vice-versa, for each image, such as a frame or field of video. Ignoring camera lens distortion, for the moment, a transformation which converts a position in world coordinates (wx, wy, wz) into a screen pixel (sx, sy) in homogeneous coordinates is:

$$k\begin{pmatrix} sx \\ sy \\ 1 \end{pmatrix} = M\begin{pmatrix} wx \\ wy \\ wz \\ 1 \end{pmatrix} = \begin{pmatrix} m00 & m01 & m02 & m03 \\ m10 & m11 & m12 & m13 \\ m20 & m21 & m22 & 1 \end{pmatrix}\begin{pmatrix} wx \\ wy \\ wz \\ 1 \end{pmatrix} \tag{5}$$

where $$S = \begin{pmatrix} sx \\ sy \\ 1 \end{pmatrix} \text{ and } W = \begin{pmatrix} wx \\ wy \\ wz \\ 1 \end{pmatrix} \tag{6}$$

Generally, a point (x, y, z) can be represented in homogeneous coordinates by adding a 1 in the fourth column: (x, y, z,)→(x, y, z, 1). Similarly, an arbitrary point (x, y, z, a) in homogenous coordinates can be mapped back to a 3D point by dividing the first three terms by the fourth (a) term: (x, y, z, a)→(x/a, y/a, z/a).

In equation (5), k is an unknown scale factor which is eliminated in the solution below. The matrix M is a projective transformation whose scale is arbitrary, so we set the coordinate m33=1. The matrix S identifies the image point in the screen coordinates, and the matrix W identifies the object as a source point in world coordinates. Written out, the above matrix equation (5) is three equations:

$$m00wx+m01wy+m02wz+m03=k*sx \tag{7}$$

$$m10wx+m11wy+m12wz+m13=k*sy \tag{8}$$

$$m20wx+m21wy+m22wz+1=k \tag{9}$$

Eliminating k from the three linear equations, we get two linear equations in eight unknowns, namely m00, m01, . . . m22:

$$m00wx+m01wy+m02wz+m03-m20wx\ sx-m21wy\ sx-m22wz\ sx=sx \tag{10}$$

$$m10wx+m11wy+m12wz+m13-m20wx\ sy-m21wysy-m22wz\ sy=sy \tag{11}$$

A ball flying along its trajectory is at (wx, wy, wz) at time t and its location in captured image is (sx, sy). The equations of motion for a ball under constant acceleration were provided above by equations (2)-(4).

Observations from multiple cameras are used to generate two simultaneous linear equations per observation. To solve for all nine parameters, at least five observations are needed from the two or more cameras, e.g., two observations from a first camera and three from a second, four observations from one camera and one from a second, and so forth. The more measurements, the higher the accuracy of the solution for the coefficients. Typically, the problem is over determined, so a least square error estimate can be obtained for the solution. Furthermore, sufficient observations from different viewpoints should be obtained to have linear independence.

Note also that coefficients (vx0, vy0, vz0) represent the velocity at time t==0. Although the actual time at which t==0 is arbitrary, it will be numerically better to have the values for t at observation times be small. So, it can be arranged for t==0 when the first sample (image) is taken.

Substituting equations (2)-(4) for wx, wy, wz in equations (10) and (11) results in the following equation in matrix form:

$$U_0\cdot(x0\ vx0\ ax\ y0\ vy0\ ay\ z0\ vz0\ az)^T=(sx0\ sy0)^T$$

or $U_0\times A^T=S_0^T$, where "T" denotes the transpose, "A" denotes the coefficient matrix: (x0 vx0 ax y0 vy0 ay z0 vz0 az)$^T$, "$S_0$" denotes the pixel coordinates (sx0, sy0) and "$U_0$" is a 2×9 matrix whose elements are:

$$u00=(m00-m20*sx)u01=(m00-m20*sx)t\ u02=(½)(m00-m20*sx)*t^2$$

$$u03=(m01-m21*sx)u04=(m01-m21*sx)t\ u05=(½)(m01-m21*sx)*t^2$$

$$u06=(m02-m22*sx)u07=(m02-m22*sx)t\ u08=(½)(m02-m22*sx)*t^2$$

$$u10=(m01-m20*sy)u11=(m01-m20*sy)t\ u12=(½)(m10-m20*sy)*t^2$$

$$u13=(m11-m21*sy)u14=(m11-m21*sy)t\ u15=(1/2)(m11-m21*sy)*t^2$$

$$u16=(m12-m22*sy)u17=(m12-m22*sy)t\ u18=(1/2)(m12-m22*sy)*t^2$$

Thus, the matrix $U_0$ represents a single observation from a single camera, which yields two equations, one for x and one for y. N observations yield 2*N equations as follows:

$$\begin{pmatrix} U_0 \\ U_1 \\ \ldots \\ U_N \end{pmatrix} \circ (\,x0 \;\; vx0 \;\; ax \;\; y0 \;\; vy0 \;\; ay \;\; z0 \;\; vz0 \;\; az\,)^T = \begin{pmatrix} (\,sx0 \;\; sy0\,)^T \\ (\,sx1 \;\; sy1\,)^T \\ (\ldots)^T \\ (\,sxN \;\; syN\,)^T \end{pmatrix} \tag{14}$$

Where each of the matrices $U_0$, $U_1$, . . . $U_N$ represents a different observation or captured image from a camera.

Step 1470 includes solving for the matrix A of coefficients of the equations of motion from equation (14), which is of the form $U \times A^T = S^T$. The equations are solved simultaneously for all observations. Thus, the solving involves solving for the matrix A, which includes the coefficients of the equations of motion, based on matrices $S_0$ . . . $S_N$ which include the determined object positions in the images and matrices $U_0$ . . . $U_N$ which include transform coefficients, where the transform coefficients associate the one or more coordinate systems of the images with a coordinate system in which the path is described.

In one possible approach, the set of 2*N equations at (14) can be solved using Singular Value Decomposition (SVD). SVD is a technique for solving linear equations which produces a least squares estimate. Each ith observation has known values for the time ti, the associated perspective transformation matrix, Mi, and the associated pixel coordinates (sxi, syi). From these known values, two rows are added to the U matrix and the right hand side. A solution can be attempted when there are five or more observations. A solution is obtained only if the observations are sufficiently independent, which requires observations from multiple cameras.

If non-linearities are to be accounted for (distortion can already be accounted for by first undistorting the screen points, using an iterative method, and then proceeding with the linear method, depicted above), such as when the equations of motion are non-linear (for example, accounting for atmospheric drag as a function of the square of velocity), one can start with the above linear estimate and complete the computation using, e.g., the Levenberg-Marquardt method with the linear estimate as the starting point.

Note that the solution above expresses the object's position in a Cartesian coordinate system. However, other coordinate systems can be used, such as polar, spherical or other non-orthogonal coordinate systems.

Step 1480 includes reporting results from solving for the coefficients of the equations of motion. As mentioned, this can include displaying a graphic which depicts the position and/or path, providing statistical information regarding the object, as illustrated in connection with FIG. 15 and/or storing the results, such as the solved coefficients, e.g., for later use.

There may be an error between a line of position and an object (e.g., a baseball) position determined from equations of motion. In step 1470 of FIG. 14, the coefficients of the equations of motion (2)-(4) are solved during a time interval of interest, such as when a ball is thrown from the pitcher's mound to home plate. The equations of motion with the solved coefficients therefore provide a 3D position of the object at any time during the monitored time interval by substituting the time of interest into equations (2)-(4), for instance. Further, by substituting in the times at which the images were captured into the equations of motion, we should get back the coordinates of the object that are on the measured lines of position. However, since there are always uncertainties in measurements, there will be some differences in the camera measurements and the path predicted based on the equations of motion. When more than the necessary number of measurements are obtained, the coefficients can be solved for in a way that minimizes the sum of the squares of the errors (a least squares estimate) or other error criteria. This is an automatic result of solving the equations using linear algebra.

In particular, for each captured image, e.g., for each time point at which an image is captured by the different cameras, there can be an error between a line of position which is determined from the captured image and a 3D position (wx(t), wy(t), wz(t)) which is calculated from the equations of motion (2)-(4) with the solved coefficients. As explained in commonly assigned U.S. Pat. No. 8,335,345, which is incorporated herein by reference, such an error can be determined for each time point at which an image is captured by the different cameras, and a solution for the coefficients of the equations of motion can minimize a sum of the square of these errors, in one possible approach. Thus, solving the equations of motion can include satisfying a least square error criteria for errors between lines of position of the moving object which are based on the determined positions of the object in the images and positions of the moving object which are based on the equations of motion. Essentially, the solution to the equations of motion can provide a best fit curve based on the lines of position.

Figure 15:
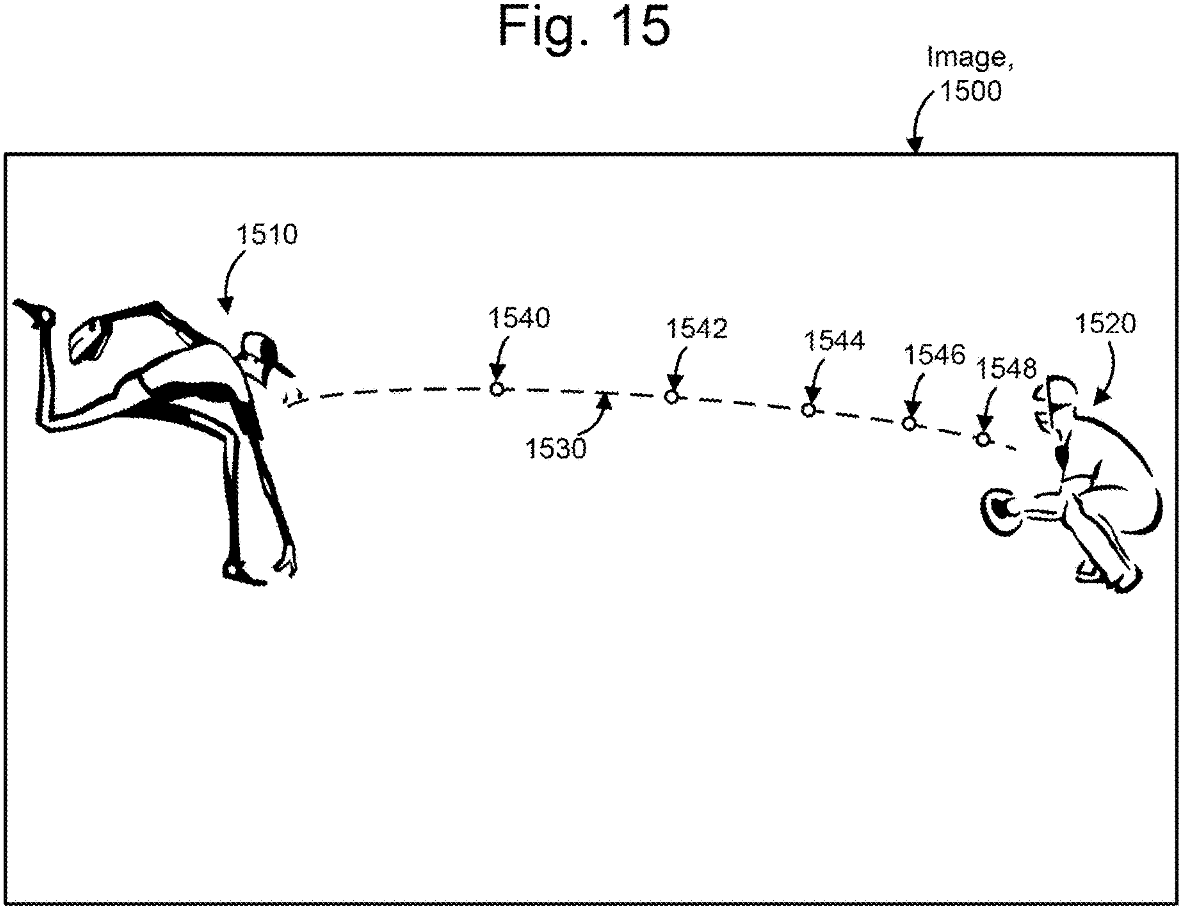
FIG. 15 depicts an enhanced image in which a path of a baseball is depicted.

In accordance, with certain embodiments, an image may be enhanced to depict the path of a baseball as it travels towards a batter. FIG. 15 depicts an example of an enhanced image in which a path of baseball is depicted. The captured images can be enhanced based on the solved equations of motion of the tracked object. For example, a video signal can be enhanced based on the determined path of the baseball, such as by displaying a graphic which depicts the path. Further, a series of images can be combined to depict different locations of the baseball along the path. The image 1500 depicts a path 1530 of the ball which is thrown from a pitcher 1510 to a catcher 1520. The dashed line 1530 can appear in the image in addition to images of the ball 1540, 1542, 1546, 1548 at different points in time. In another option, a graphic is provided in place of the ball or in addition to the ball. Further, a sequence of images which precedes the image 1500 can be provided in which a portion of the dashed line which trails the current position of the ball is provided. In this manner, the incremental progress of the ball along the path 1530 can be visualized.

Figure 16A:
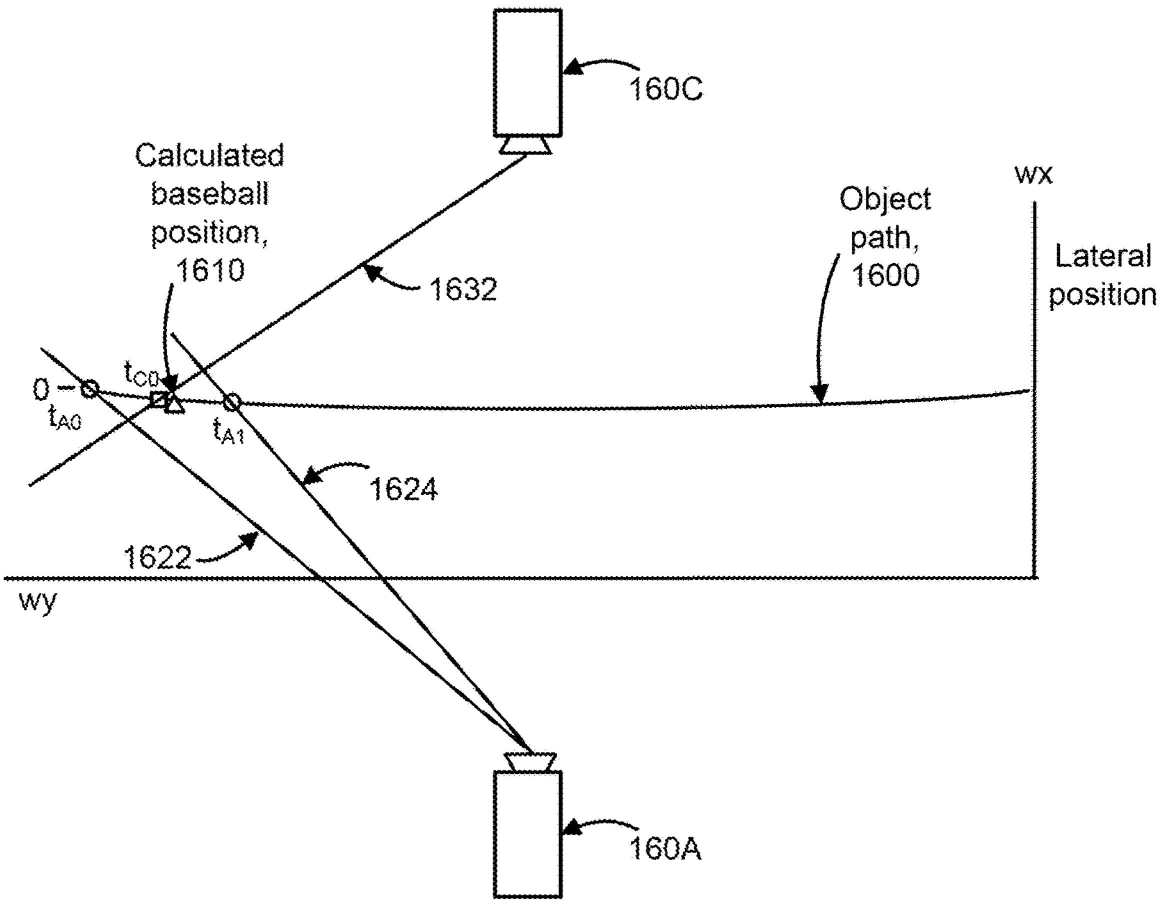
FIG. 16A depicts a technique for determining the position of a baseball based on lines of position from three or more images.

FIG. 16A depicts a technique for determining the position of a baseball based on lines of position from three or more images. In addition to determining the path of a moving baseball, it is possible to determine an instantaneous position of the baseball, e.g., in three-dimensions, at a given time point. This approach does not require solving equations of motion. A simplified example is provided in which a position in two-dimensions is determined. However, the technique can be extended to three or more dimensions as well. In this approach, lines of position from two or more cameras are used to identify a position of a baseball. A position can also be determined from only two lines of position by determining the point of closest approach to the lines of position. However, for improved accuracy, three or more lines of position may be used that are from images which are sufficiently close together to yield a desired accuracy. This approach provides an interpolation between two lines of position using the third line of position. More than three lines of position can be used as well to further improve the accuracy of the position estimation.

Here, a baseball path 1600 is indicated in the wx-wy plane. Lines of position 1622 and 1624 extend from camera 160A at time points $t_{A0}$ and $t_{A1}$, respectively, while a line of position 1632 extends from camera 160C at $t_{C0}$. Baseball positions, which are not known, are indicated by the circles at $t_{A0}$ and $t_{A1}$ and by the square at $t_{C0}$. The images which are used for the position estimation can be successive images which are captured at successive time points, in one possible approach. For higher accuracy, the time points should be close together relative to the motion of the moving baseball. Further, the successive images can include a first image from a first camera, a second image from a second camera and a third image from the first camera, for instance. Or, the first and second images can be from the first camera and the third image can be from the second camera. Many other variations are possible.

A calculated baseball position 1610, indicated by a triangle, can be determined as a position which meets a distance criteria with respect to the lines of position 1622, 1624 and 1632. For example, the metric can include minimizing a sum of the shortest distances from the object to each of the lines of position, or the sum of the squares of such distances, as explained further below. The object position can then be determined as a point at which the three or more lines of position come closest together.

Figure 16B:
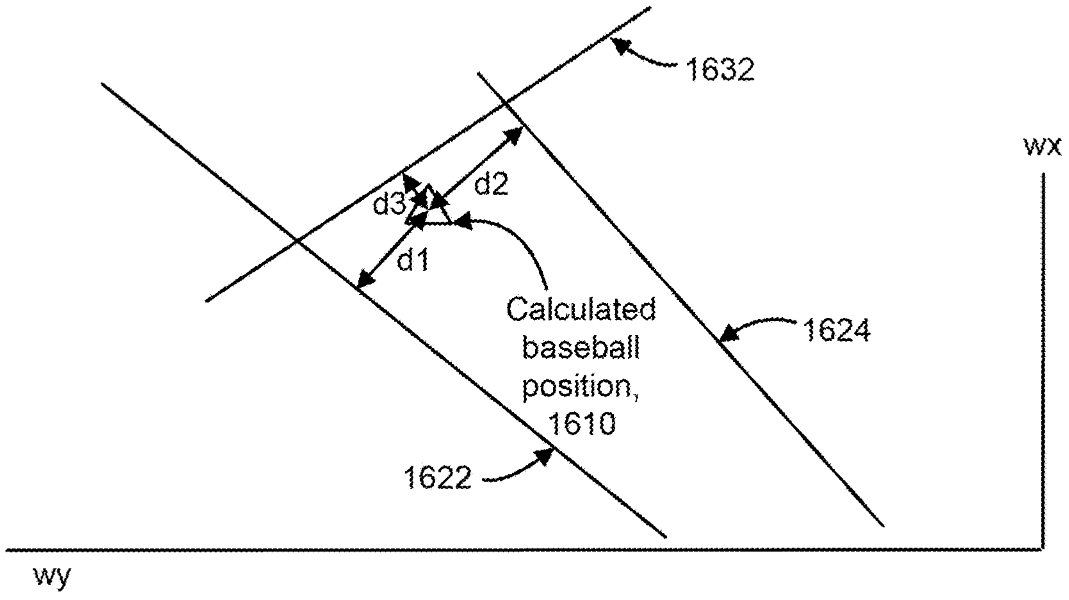
FIG. 16B depicts a close up view of FIG. 16A, showing distances between a baseball position and lines of position.

FIG. 16B depicts a close up view of FIG. 16A, showing distances between a baseball position and lines of position. The calculated baseball position 1610 is at distances d1, d2 and d3 from the lines of position 1622, 1624, and 1632, respectively. A distance metric which can be expressed as, e.g., (d1+d2+d3) or ($d1^2+d2^2+d3^2$), can be minimized to find the desired baseball position. In some cases, the desired baseball position will be on one of the three lines of position. Geometric principles can be used to obtain equations which express the distance (or square of the distance) form each of the lines of position to an unknown position. A minima for the equations can then be determined to obtain the desired baseball position which meets the distance metric.

Figure 17:
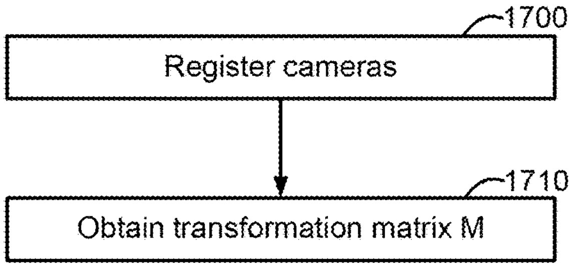
FIG. 17 is a flow diagram that depicts a process for obtaining information for determining the position of a baseball.

FIG. 17 depicts a process for obtaining information for determining the position of a baseball. The steps indicated can be performed prior to determining an object's location or at least prior to processing image data to determine an object's location. Step 1700 refers to registering the camera and step 1710 refers to obtaining a transformation matrix M, as discussed above, e.g., in connection with FIG. 13.

Figure 18:
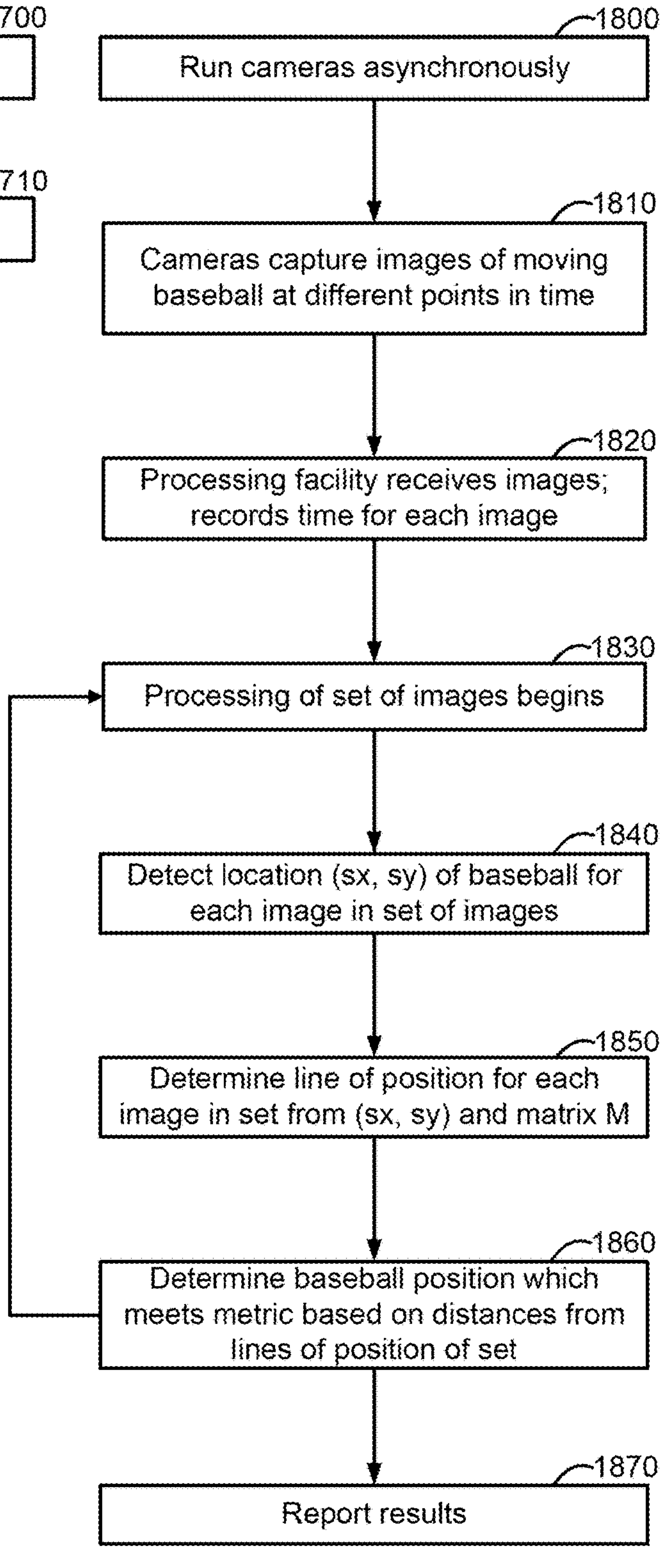
FIG. 18 is a flow diagram that depicts a process for determining the position of a baseball.

FIG. 18 depicts a process for determining the positions of an object, such as a baseball. Analogous steps correspond to those discussed previously in connection with FIG. 14. Step 1800 includes running the cameras asynchronously, step 1810 includes the cameras capturing images of the moving baseball at different points in time and step 1820 includes the processing facility receiving the images and recording a time at which each image is received. At step 1830, processing of a set of captured images, such as three or more images, begins. The images can be successive images, for instance. At step 1840, a location of the baseball is detected at a location identified by the pixel coordinates (sx, sy) for each image in the set of images. At step 1850, a line of position is determined for each image in the set from the pixel coordinates (sx, sy) and the matrix M. A line of position can be determined as indicated in connection with FIG. 1C. For instance, the line of position can be expressed by a vector with unity magnitude. At step 1860, a baseball position is determined which meets a metric based on distances from the lines of position of the set. For example, the metric can include minimizing a sum of the shortest distances from the baseball position to each of the lines of position, or the sum of the squares of such distances. Step 1870 includes reporting results from determining the position of the object. Further, steps 1830-1860 can be repeated for other sets of images to determine baseball positions at other time points. Also, an image used, e.g., as the last image in one set can be used, e.g., as the first image in the next set.

The features of the present technology described above (e.g., with reference to FIGS. 6-18) can be used to perform step 410 introduced above with reference to FIG. 4, which step involves autonomously tracking locations of a ball traveling towards a batter, using computer vision, based on video images of the ball traveling towards the batter. The features of the present technology described above (e.g., with reference to FIGS. 5-18) can also be used to perform step 414 introduced above with reference to FIG. 4, which step involves autonomously determining whether at least one location of a ball traveling towards a batter intersects with the strike zone, based on the determined location of the strike zone and the tracked locations of the ball traveling towards the batter. Referring again to FIG. 4, the video images of the ball traveling towards the batter, which are received at step 406, are in two-dimensional (2D) space. As can be appreciated from the above discussion, the autonomous tracking of locations of the ball traveling towards the batter includes using transformation matrices (associated with the at least two of the different cameras 160 used to capture the video images of the ball traveling towards the batter) to determine locations of the ball traveling towards the batter in three-dimensional (3D) space. Examples of such transformation matrices were described above.

In accordance with specific embodiments, the Strike Zone computer 322 described with reference to FIG. 3, some other computer, or more generally, one or more processors, is/are used to perform step 414 introduced above with reference to FIG. 4, which involves autonomously determining whether at least one location of the ball traveling towards the batter intersects with the strike zone, based on the determined location of the strike zone and the tracked locations of the ball traveling towards the batter.

Autonomously Tracking Locations of Bat as Ball Travels Towards Batter

Step 408, as mentioned above in the discussion of FIG. 4, involves receiving video images, captured using at least two different cameras having different positions, of a bat being held by a batter as a ball travels towards the batter. The video images received at step 408 can be captured, e.g., using at least two of the cameras 160A, 160B and 160C. For example, referring back to FIG. 1A, step 408 can include receiving a first set of video images of a batter swinging a bat captured using the camera 160A, receiving a second set of video images of the batter swinging the bat captured using the camera 160B, and receiving a third sets of video images of the batter swinging the bat captured using the camera 160C. In this example, the location of the camera 160A is in foul territory between home plate and first base, the location of the camera 160B is in foul territory behind home plate, and the location of the camera 160C is foul territory between home plate and third base. For the purpose of this description, it can be assumed that step 408 involves receiving three sets of video images of a batter swinging a bat, from the cameras 160A, 160B and 160C, wherein each set of images includes thirty video images. As noted above, the cameras 160A, 160B and 160C can collectively be referred to as the cameras 160, or individually as a camera 160. Step 420 involves autonomously tracking locations of the bat being held by the batter as the ball travels towards the batter, using computer vision, based on the video images of the bat as the ball travels towards the batter. Additional details of steps 408 and 412, according to certain embodiments of the present technology are described below with reference to the flow diagram of FIG. 19. The steps described with reference to FIG. 19 can be performed, for example, by the processing facility 164, exemplary details of which were described above with reference to FIG. 1B, or more generally, by one or more processors.

Figure 19:
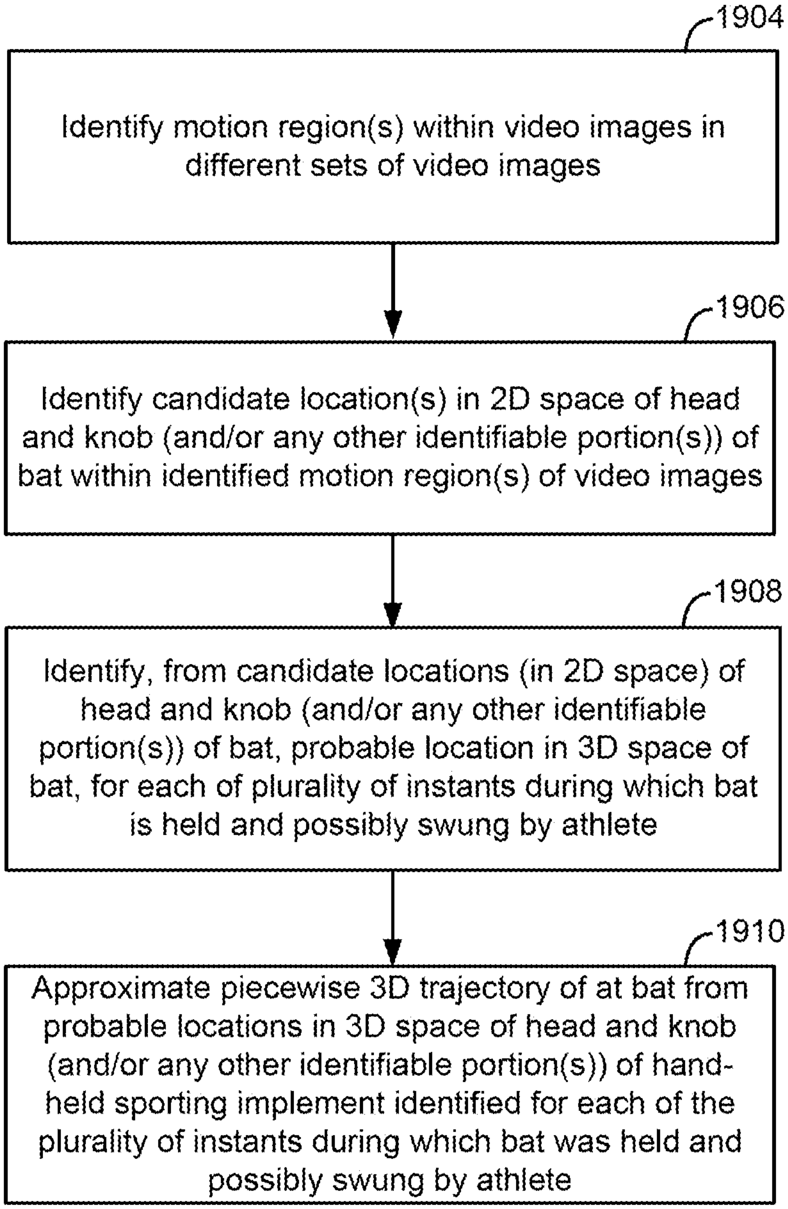
FIG. 19 is a flow diagram that is used to describe certain methods for tracking a path and/or orientation of a bat that is held and potentially swung by a batter.
Figure 20A:
FIG. 20A illustrates an exemplary video image (also known as a video frame) obtained by one of the cameras shown in FIG. 1A.
Figure 20B:
FIG. 20B illustrates motion regions identified by comparing the video image in FIG. 20A to a preceding video image and/or a following video image in a sequence of the video images captured by the same one of the cameras in FIG. 1A.
Figure 20C:
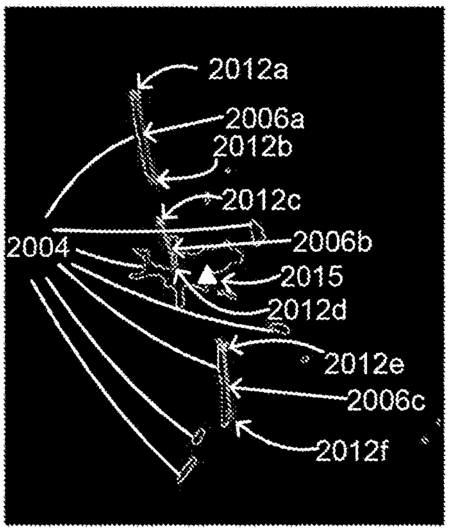
FIG. 20C illustrates outlines of the motion regions shown in FIG. 20B, as well as candidate shafts of the bat identified within the motion regions, and candidate heads and knobs of the bat.

Referring to FIG. 19, step 1904 involves identifying one or more motion regions within each of a plurality of the video images in each of the different sets of video images. For the purpose of this description, it will be assumed that step 1904 involves identifying one or more motion regions within each of the thirty video images in each of the three sets of video images, and thus, involves identifying motion region(s) within each of the ninety video images. FIG. 20A illustrates an exemplary video image (also known as a video frame) obtained by the camera 160A in FIG. 1A. FIG. 20B illustrates motion regions identified by comparing the video image in FIG. 20A to a preceding video image and/or a following video image in a sequence of the video images captured by the camera 160A. As can be appreciated from FIGS. 20A and 20B, the motion regions include the bat that is held and possibly swung, and the batter's arms that are holding and possibly swinging the bat, and portions of the batter's legs that move when the batter swings the bat. FIG. 20C, shown to the right of FIG. 20B, will be discussed below when describing step 1906 in FIGS. 19 and 22. Additional details of step 1904, according to a specific embodiment of the present technology, are described below with reference to FIG. 21.

Referring again to FIG. 19, step 1906 involves, for at least a subset (i.e., all or some) of the video images included in each of the different sets of video images, identifying one or more candidate locations in 2D space of the head and the knob (and/or other identifiable portions) of the bat within the identified motion region(s) of the video image. Referring to FIG. 20C, the points labeled 2012*a*, 2012*b*, 2012*c*, 2012*d*, 2012*e* and 2012*f* are exemplary candidate locations in 2D space of the head and the knob of the bat within the identified motion region(s) shown in FIG. 20B of the video image shown in FIG. 20A. Additional details of step 1906, according to a specific embodiment of the present technology, are described below with reference to FIG. 22. Each of the candidate locations in 2D space of the head and the knob of the bat can be specified by the pixel coordinates (e.g., sx, sy) for each image in a set of images.

Referring again to FIG. 19, step 1908 involves identifying (from the candidate locations in 2D space of the head and the knob of the bat) a probable location in three-dimensional (3D) space of identifiable portions (e.g., the head and the knob) of the bat, for each of a plurality of instants during which the bat was held and potentially swung by the batter. The plurality of instants can be all of the times that video images were captured using two or more of the cameras 160A, 160B and 160C, or just some of those times. Further, it is noted that for some of the instants, the bat head and knob (and/or other identifiable portions of the bat) may be captured by fewer than all of the cameras 160A, 160B and 160C, e.g., due to the player or something else obstructing the view of the bat head and/or knob from certain cameras during certain instants, or for other reasons. Additional details of step 1908, according to a specific embodiment of the present technology, are described below with reference to FIG. 27. For much of the following description, it is assumed that the identifiable portions of the bat is its head and knob, however that need not be the case. For another example, a ring that is painted around a portion (e.g., the center) of a bat can be an identifiable portion.

Still referring to FIG. 19, step 1910 involves approximating a piecewise 3D trajectory of at least the bat based on the probable locations in 3D space of the head and the knob (and/or any other identifiable portions) of the bat (identified at step 1908 for each of the plurality of instants during which the bat was held and potentially swung by the batter). Additional details of step 1910, according to a specific embodiment of the present technology, are described below with reference to FIG. 29.

Figure 21:
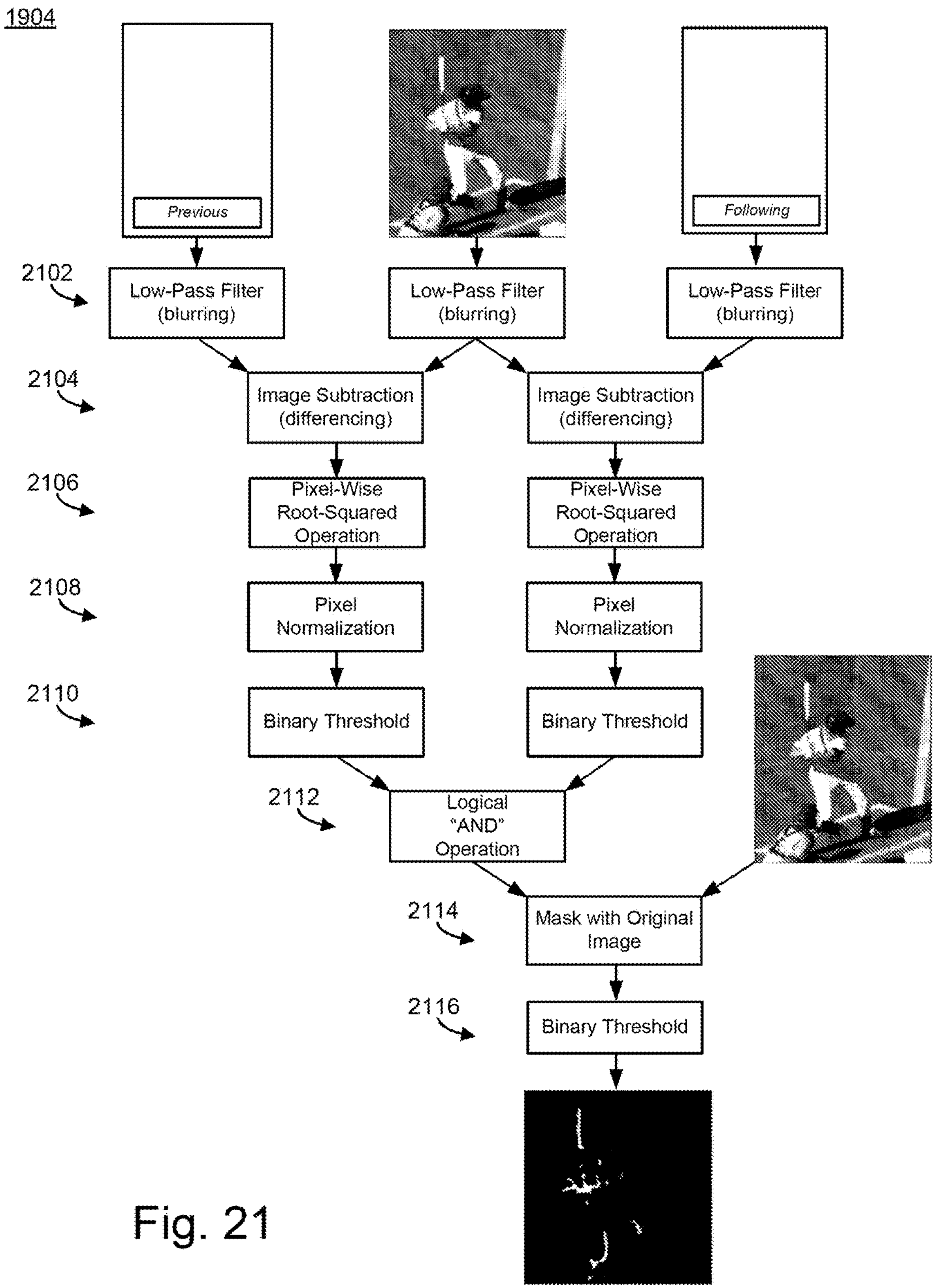
FIG. 21 is a flow diagram that is used to describe additional details of how motion regions within a video image can be identified at step 1904 initially discussed with reference to FIG. 19.

Additional details of step 1904, according to a specific embodiment of the present technology, are now described with reference to FIG. 21. More specifically, FIG. 21 is used to describe additional details of how to identify one or more motion regions within a video image. Referring to FIG. 21, in the center at the top of the FIG. is shown an exemplary video image for which one or more motion regions are to be identified. This video image shown in the center at the top of FIG. 21, which can be referred to as the present or current image, is the same as the video image shown in FIG. 20A. To the left and right of the present video image are blocks representative of, respectively, previous and following video images within a sequence of video images captured using the same camera 160.

Still referring to FIG. 21, at step 2102 the previous, present and following video images are each low-pass filtered, which results in a blurring of each of the images. The purpose of step 2102 is to reduce image noise. Step 2102 can be performed, e.g., by applying a Gaussian blur to each of the previous, present and following video images, but is not limited thereto. At step 2104, image subtractions are performed to determine the difference between the present video image and the previous video image, and to determine the difference between the present video image and the following video image. At step 2106, a pixel-wise root-squared operation is performed on the results of the image subtractions performed at steps 2104 to thereby diminish smaller values, amplifier larger values and invert negative values. Step 2106 could be replaced with a pixel-wise absolute-difference operation, which would likely be faster and produce very similar results. At step 2108, the results from step 2106 are normalized by stretching pixel values to a full grayscale range. At step 2110 a binary threshold is applied to the results of step 408 to convert pixels to either white or black. Such a binary threshold can be the middle of the full grayscale range, but other binary thresholds are also possible. In an embodiment of step 2110, pixels having a grayscale above the binary threshold are converted to white, with all other pixels being converted to black. At step 2112, a logical "AND" operation is applied to the results of step 2110 to thereby maintain only pixels that are white in the results of both instances of both instances of step 2110. At step 2114, the result of the logical "AND"

operation performed at step 2112 is masked with the original (i.e., present) image (shown in the center at the top of FIG. 21, and to the right of the step labeled 2112) in order to maintain original pixels at locations of white mask pixels. At step 2116, a further binary threshold is applied to the results of the masking at step 2114, to thereby cause pixels in which both motion was detected and which were brightly colored in the original scene (such as those of the brightly-colored baseball bat) to be represented in white, with all other pixels represented in black. The threshold used at step 2116 can be inverted to detect darkly-colored bats, where all pixels at locations of the motion mask in the original scene that have pixel intensities below the threshold level are converted to white, and all others are converted to black. The result of step 2116 is shown at the bottom of FIG. 21, which result is the same as that which is shown in FIG. 20B. The steps described with reference to FIG. 21 can be performed for each (or some) of the video images included in each (or some) of the different sets of video images captured by the different cameras 160A, 160B and 160C, to thereby identify one or more motion regions in each of the video images, and more generally, to perform step 1904 in FIG. 19.

Figure 22:
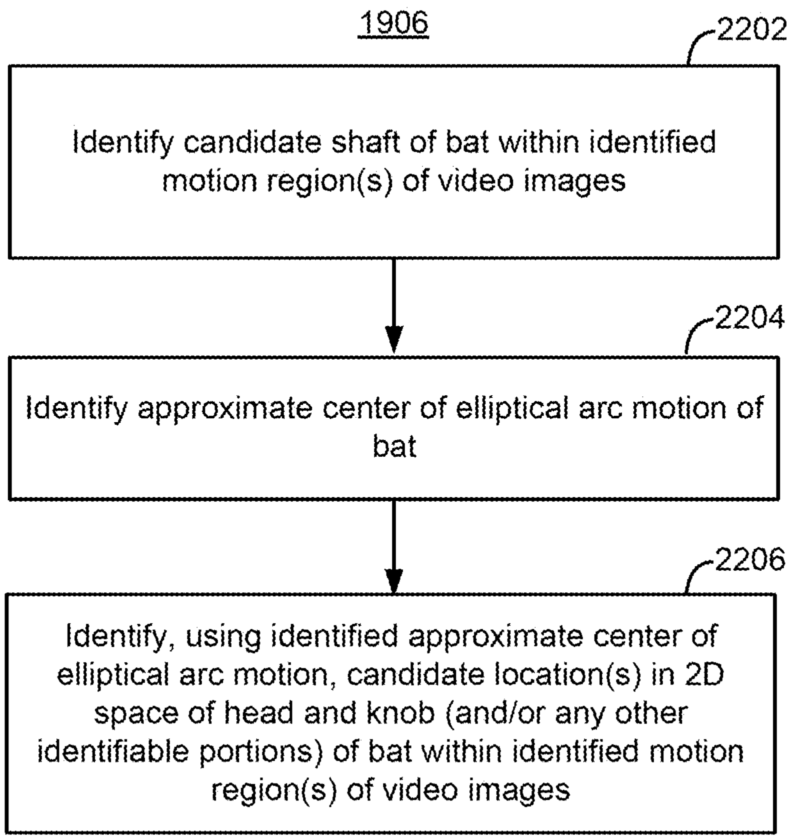
FIG. 22 is a flow diagram that is used to describe additional details of how candidate locations in 2D space of a head and a knob of a bat can be identified at step 1906 initially discussed with reference to FIG. 19.

Additional details of step 1906, according to a specific embodiment of the present technology, are now described with reference to FIG. 22. More specifically, FIG. 22 is used to describe additional details of how to identify one or more candidate locations (in 2D space) of the head and the knob (and/or any other identifiable portions) of a bat within identified motion region(s) of a video image. Referring to FIG. 22, step 2202 involves identifying one or more candidate shafts of the bat within the identified motion region(s) of the video images. Step 2202 can be performed by outlining the regions of motion within each of a plurality of the video images in each of the sets of video images, and then identifying nominally straight lines within the outlined regions of motion. Exemplary outlined regions of motion within a video image are labeled 2004 in FIG. 20C. Exemplary nominally straight lines (that are identified within the outlined regions of motion 2004) are labeled 2006*a*, 2006*b* and 2006*c* in FIG. 20C. In accordance with an embodiment, a Canny edge detector algorithm is used to perform the outlining of the regions of motion. In accordance with an embodiment, a Hough transform is used to identify the nominally straight line segments within the outlined regions of motion. The use of alternative and/or additional algorithms are also possible. In order to avoid duplicate lines, nominally parallel lines within close proximity can be merged, e.g., by averaging the lines, such as the two long, nominally parallel lines labeled 2006*a*.

Referring again to FIG. 22, step 2204 involves identifying an approximate center of elliptical arc motion of the bat that is held and potentially swung by a batter. Additional details of step 2204, according to a specific embodiment of the present technology, are described below with reference to FIGS. 23 and 24. Still referring to FIG. 22, step 2206 involves using the approximate center of elliptical arc motion (identified at step 2204) and one or more candidate shafts (identified at step 2202) to identify the one or more candidate locations (in 2D space) of the head and the knob (and/or other identifiable portions of the bat) within the identified motion region(s) of the video images. Additional details of step 2206, according to a specific embodiment of the present technology, are described below with reference to FIG. 25.

Additional details of step 2204, according to a specific embodiment of the present technology, are now described with reference to FIGS. 23 and 24. In FIG. 23, the dots shown therein represent candidate heads (or another identifiable portion) of the bat determined from a plurality of video images captured using a single one of the cameras 160A, 160B and 160C while a batter swung the bat. Referring to the flow diagram of FIG. 24, at step 2402 a specified number (e.g., 5) of the smallest x-positions are identified and averaged. The dots within the dashed oval 2302 in FIG. 23 correspond to the 5 smallest x-positions, and the dashed line 2303 is representative of the average of these smallest x-positions. At step 2404, a specified number (e.g., 5) of the largest x-positions are identified and averaged. The dots within the dashed oval 2304 in FIG. 23 correspond to the 5 largest x-positions, and the dashed line 2305 is representative of the average of these largest x-positions. At step 2406, the average values determined at steps 2402 and 2404 are averaged to determine an average of the largest and smallest x-positions, which is represented by the dashed line 2407. At step 2408, a specified number (e.g., 5) of the smallest y-positions are identified and averaged. The dots within the dashed region 2308 in FIG. 23 correspond to the 5 smallest y-positions, and the dashed line 2309 is representative of the average of these smallest y-positions. At step 2410, a specified number (e.g., 5) of the largest y-positions are identified and averaged. The dots within the dashed region 2310 in FIG. 23 correspond to the 5 largest y-positions and the dashed line 2311 is representative of the average of these largest y-positions. At step 2412, the average values determined at steps 2408 and 2410 are averaged to determine an average of the smallest and largest y-positions, which is represented by the dashed line 2313. At step 2414, an approximate center of elliptical arc motion of the bat, which center is represented by the triangle 2315, is determined to be the position corresponding to the average of the largest and smallest x-positions (as determined at step 2406) and the average of the largest and smallest y-positions (as determined at step 2412). The specific number of x- and y-positions that are averaged in the steps in FIG. 24 can be more than or fewer than 5. Alternative techniques for determining a center of elliptical arc motion of a bat that is held and possibly swung by a batter are possible and can be used with embodiments described herein.

Figure 25:
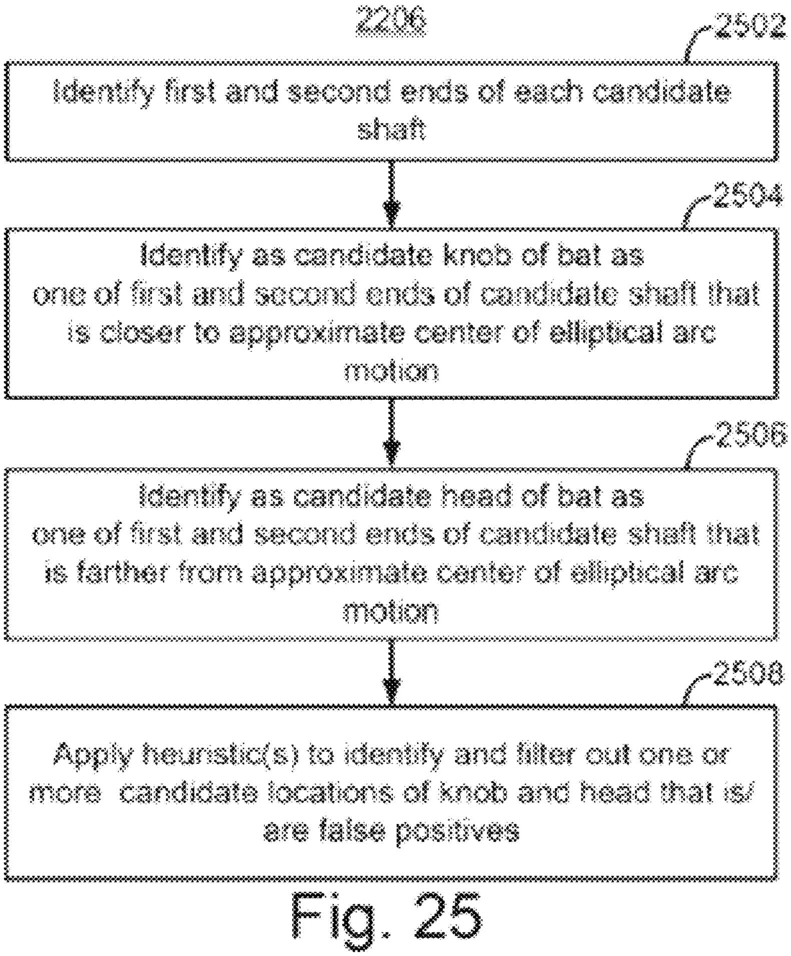
FIG. 25 is a flow diagram that is used to describe additional details of how to identify candidate location(s) in 2D space of a head (or knob, or other identifiable portion) of a bat within identified motion region(s) of a video image at step 2206 initially discussed with reference to FIG. 22.

Additional details of step 2206, according to a specific embodiment of the present technology, are now described with reference to FIG. 25. More specifically, the flow diagram of FIG. 25 is used to explain how an approximate center of elliptical arc motion, which was identified at step 2204, can be used to identify one or more candidate locations (in 2D space) of a head and a knob of a bat within identified motion region(s) of a video image. Referring to FIG. 25, step 2502 involves identifying first and second ends of each of the one or more candidate shafts. Referring briefly back to FIG. 20C, lines 2006*a*, 2006*b* and 2006*c* are illustrative of exemplary candidate shafts. In FIG. 20C, the labels 2012*a* and 2012*b* point to the first and second ends of the candidate shaft represented by the line 2006*a*, the labels 2012*c* and 2012*d* point to the first and second ends of the candidate shaft represented by the line 2006*b*, and the labels 2012*e* and 2012*f* point to the first and second ends of the candidate shaft represented by the line 2006*c*. Referring again to FIG. 25, step 2504 involves, for each of the candidate shafts, identifying the one of the first and second ends of the candidate shaft that is closer to the approximate center of elliptical arc motion of the shaft as candidate locations in 2D space of the knob of the bat. Step 2506 involves, for each of the candidate shafts, identifying the one of the first and second ends of the candidate shaft that is farther to the approximate center of elliptical arc motion of the shaft as candidate locations in 2D space of the head of the bat. In FIG. 20C, the triangle labeled 2015 is representative of the approximate center of elliptical arc motion of the shaft as determined at step 2204. Still referring to FIG. 20C, for the candidate shaft 2006*a*, the end 2012*b* is identified as a candidate knob since it is closer than the other end 2012*a* to the triangle 2015. For the candidate shaft 2006*b*, the end 2012*d* is identified as a candidate knob since it is closer than the end 2012*c* to the triangle 2015. For the candidate shaft 2006*c*, the end 2012*e* is identified as a candidate knob since it is closer than the end 2012*f* to the triangle 2015. Accordingly, the candidate locations (in 2D space) of the head of the bat are the ends 2012*a*, 2012*c* and 2012*f*.

Referring again to FIG. 25, step 2508 involves applying one or more heuristics to identify and filter out one or more of the candidate locations of the head and the knob (and/or another identifiable portion of the bat) that is/are determined to be false positives. Such heuristics can use the approximate center of elliptical arc motion that was identified at step 2204. One heuristic can involve enforcing a unidirectional, elliptical path of motion in the time domain, as it is expected that a head of a bat will move in a single direction and in an approximately elliptical path when being swung. Another heuristic can involve enforcing minimum and/or maximum object length thresholds. For example, wherein the identifiable portions of the bat are the head and the knob, for each of the candidate bat head and bat knob pairs, the Euclidean distance from the candidate bat knob to the candidate bat head can be calculated. The calculated distances can then be compared to a bat length range which specifies a range of expected lengths of a bat. The calculated distances can also be compared to a maximum distance threshold which specifies a maximum expected distance that the bat head will be from the center of elliptical arc motion when the bat is swung. Candidate knob and head pairs that have a length that are outside the expected range are filtered out. The use of additional and/or alternative heuristics are also possible and within the scope of embodiments of the present technology. The heuristics may depend upon what identifiable portions of the bat are being identified and tracked.

Figure 26:
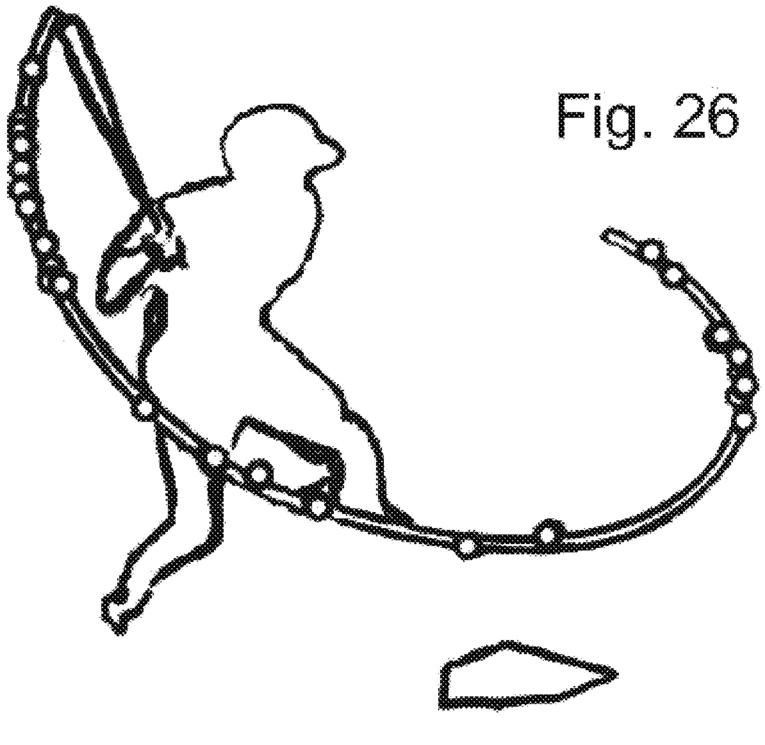
FIG. 26 includes dots and an elliptical arc that are superimposed on a video image of a batter holding a bat during the start of a swinging motion, wherein the superimposed dots are illustrative of candidate locations in 2D space of the head of the bat that were identified for a plurality of video images that followed the video image shown in FIG. 26, after false positives were filtered out, and wherein the superimposed elliptical arc is illustrative of an estimated trajectory of the head of the bat during the swing.

Referring now to FIG. 26, illustrated therein is a video image of a batter holding a bat during the start of a swinging motion. The white circles that are superimposed on the video image shown in FIG. 26 are illustrative of candidate locations in 2D space of the head of the bat that were identified at step 1906 (and/or step 2506) for a plurality of video images that followed the video image shown in FIG. 26, after false positives were filtered out. The elliptical arc superimposed on the video image shown in FIG. 26 is illustrative of the trajectory of the head of the bat during the swing.

Figure 27:
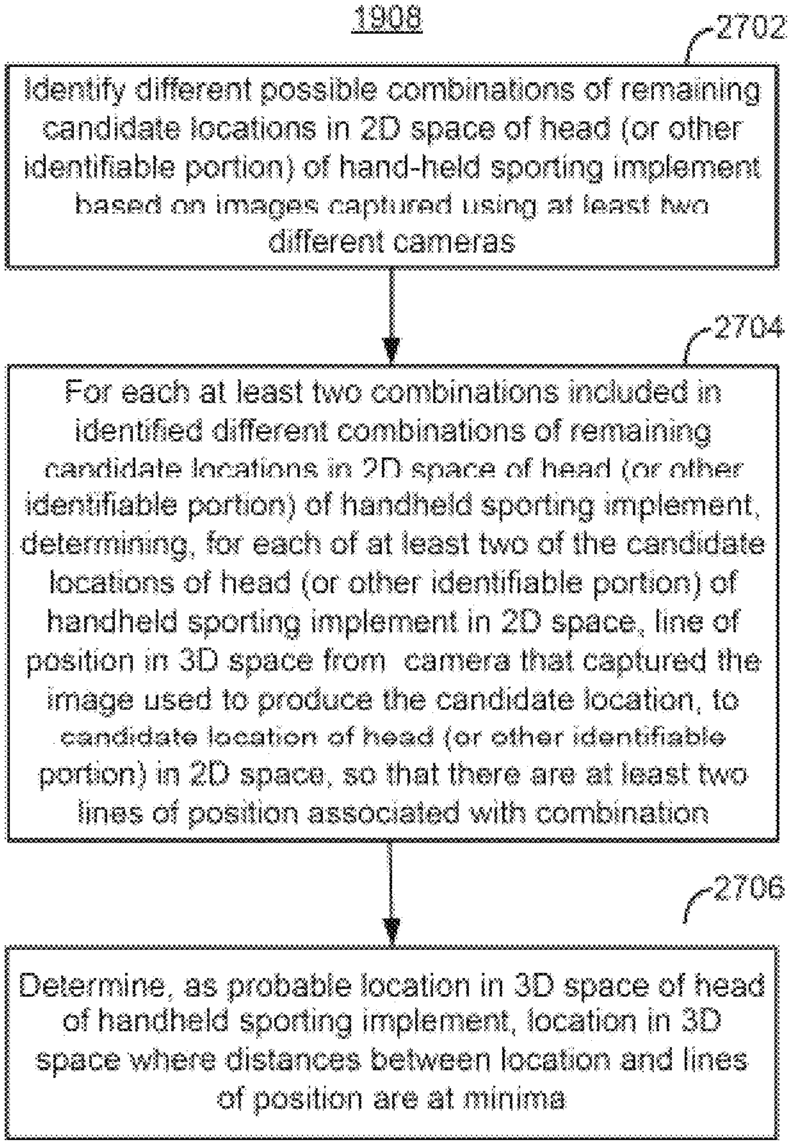
FIG. 27 is a flow diagram that is used to describe additional details of how to identify a probably location in 3D space of a head (and a knob, and/or other identifiable portions) of a bat at step 1908 initially introduced with reference to FIG. 19.

Additional details of step 1908, according to a specific embodiment of the present technology, will now be described with reference to FIG. 27. More specifically, FIG. 27 is a flow diagram that is used to describe how to identify from the candidate locations (in 2D space) of the head and the knob of the bat, a probable location in 3D space of the head and the knob of the bat for each of a plurality of instants during which the bat was held and potentially swung by a batter. The steps described with reference to FIG. 27 are performed for each of a plurality of instants during which the bat was held and potentially swung by the batter, so that the path of the swung bat can be approximated at step 1910. As mentioned above, the plurality of instants can be all of the times that video images of a bat were captured (while a ball was approaching that batter) using two or more of the cameras 160A, 160B and 160C, or just some of those times.

Referring to FIG. 27, step 2702 involves identifying different possible combinations of the remaining candidate locations (CL) in 2D space of the head (or other identifiable portion) of the bat that are based on images captured using at least two different ones of the cameras, wherein no single combination should include two or more candidate locations captured using the same camera. For example, assume that each of the cameras 160A, 160B and 160C captured a separate video image of a batter holding and potentially swinging a bat at a same point in time (i.e., at a same instant), due to the cameras being synchronized, wherein the captured video images can be respectively referred to as video images A, B and C. Also assume that after filtering out candidates that were false positives (e.g., at step 2706), the video image A included two candidate locations for the head (referred to as CL-A-1 and CL-A-2), the video image B included one candidate location for the head (referred to as CL-B), and the video image C included two candidate locations for the head (referred to as CL-C-1 and CL-C-2). The different possible combinations of these candidate heads from the video images A, B and C, captured using at least two different ones of the three cameras (with no single combination including two or more candidates captured using the same camera), include the following combinations:

CL-A-1 and CL-B;
CL-A-2 and CL-B;
CL-A-1 and CL-C-1;
CL-A-2 and CL-C-1;
CL-A-1, CL-B and CL-C-1;
CL-A-1, CL-B and CL-C-2;
CL-A-2, CL-B and CL-C-1;
CL-A-2, CL-B and CL-C-2;
CL-B and CL-C-1; and
CL-B and CL-C-2

If for a same point in time (i.e., instant) there is only one candidate location of the head per image captured by N separate synchronized cameras (e.g., 160), then the following equation can be used to calculate the amount of all possible combinations of candidate locations for the head, where each combination includes either zero or one candidate location for the head per separate camera, and where each combination includes candidate locations for the head associated with at least two separate cameras:

$$\#\text{ of combinations} = \sum_{n=2}^{N} \frac{N!}{n!(N-n)!}.$$

Step 2704 involves, for each of the different possible combinations (of remaining candidate locations in 2D space of the head of the bat) identified at step 2702, determining a corresponding line of position (LOP) in 3D space for each candidate location in 2D spec of the head of the bat (that is included in the possible combination). In accordance with an embodiment, a transformation matrix is used to perform step 1004, wherein the transformation matrix is determined based on knowledge of parameters of the cameras 160A, 160B and 160C, which parameters can include position, orientation, angular width, and lens distortion characteristics of each of the cameras, but are not limited thereto. Exemplary orientation type parameters can include tilt and/or pan of each of the cameras. In other words, at step 2704, corresponding candidate head locations in 2D space, as determined from 2D images captured using different cameras, can each be transformed into an LOP in 3D space using a transformation matrix. An exemplary transformation matrix M is shown below, wherein the transformation matrix M relates a 2D image coordinate system to a 3D world coordinate system:

$$M = \begin{pmatrix} m00 & m01 & m02 & m03 \\ m10 & m11 & m12 & m13 \\ m20 & m21 & m22 & 1 \end{pmatrix}$$

The values in the transformation matrix M, for use with one of the cameras 160, can be determined during a calibration procedure for that camera 160, which can also be referred to as registration. The calibration procedure can involve aiming a camera 160 at different reference fiducials in an event facility (e.g., baseball park), wherein actual locations of the reference marks are known, e.g., using surveying equipment. Values within the matrix can then be solved for using the capturing images of the fiducials, parameters of the camera used to capture the images of the fiducials, and the actual locations of the fiducial (e.g., as determined using surveying equipment). For one example, the tip of home plate may be a fiducial. In an embodiment where unsynchronized cameras are implemented, the conversion from 2D space to 3D space may involve fitting screen points visible in each camera to a model of swung bat. This may be done in ways similar to those described in commonly assigned U.S. Pat. No. 8,335,345, entitled "Tracking an Object with Multiple Asynchronous Cameras," which is incorporated herein by reference, but other techniques can be used as well.

Step 2704 is performed such that there are at least two lines of position associated with each combination. This can be better understood with reference to FIG. 28, which shows lines of position 2802A, 2802B and 2802C from cameras 160A, 160B and 160C, respectively, wherein each line of position 2802 represents an imaginary straight line that extends from a camera 160 to a tracked object (the head of a bat, in this example) at a given point in time, and identifies a locus of points at which the object could be located based on the camera's observation. Thus, for camera 160A, lines of position extend from the camera 160A to the different positions of the tracked object (the head of a bat, in this example) at the different times the images of the object are captured by camera 160A. The example line of position (LOP) 2802A represents a line which extends from the camera 160A through the tracked object (the head of a bat, in this example) at a single point in time. The example LOP 2802B represents a line which extends from the camera 160B through the head of the bat at the same point in time, and the example LOP 2802C represents a line which extends from the camera 160C through the head of the bat at the same point in time.

Figure 28:
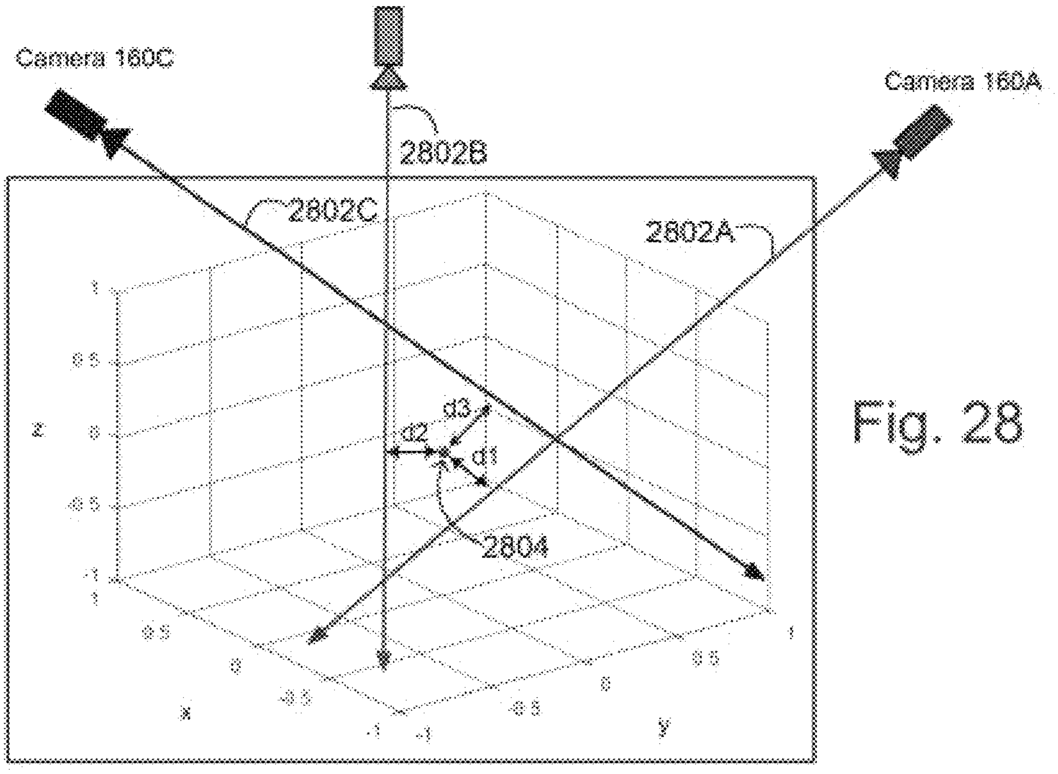
FIG. 28 shows lines of position from three cameras, wherein each line of position represents an imaginary straight line that extends from a camera to a tracked object (the head of a bat, in this example) at a given point in time, and identifies a locus of points at which the object could be located based on the camera's observation.

Referring again to FIG. 27, step 2706 involves determining, as the probable location in 3D space of the head of the bat for an instant, a location in 3D space where distances between the location and the lines of position are at a minima. In FIG. 28, the calculated probable location 2804 in 3D space of the head of the bat is at distances d1, d2 and d3 from the lines of position 2802A, 2802B and 2802C, respectively. Geometric principles can be used to obtain equations which express the distance (or square of the distance) from each of the lines of position to an unknown position. A minima for the equations can then be determined to obtain the probable location in 3D space of the head of the bat which meets the distance metric. For example, a distance metric can expressed as (d1+d2+d3) or ($d1^2+d2^2+d3^2$), and can be minimized to find the probable location in 3D space of the head of the bat. There are multiple different ways in which distance metrics can be defined. Also, there are multiple different ways in which a minima can be defined. The probable location in 3D space can also be determined by a metric that takes into account the number of LOPs and quality of candidate heads identified in 2D space. In certain embodiments, this may enable outlier candidate heads and/or LOPs to be removed from a pool of LOPs, and subsequent iteration of prior steps to be performed, if necessary or desired. The algorithm described with reference to FIG. 27 is an example of a clustering algorithm. Other types of clustering algorithms can alternatively be used. As noted above, the portion of the camera from which the LOP extends may be the center of projection of the lens of the camera.

Figure 29:
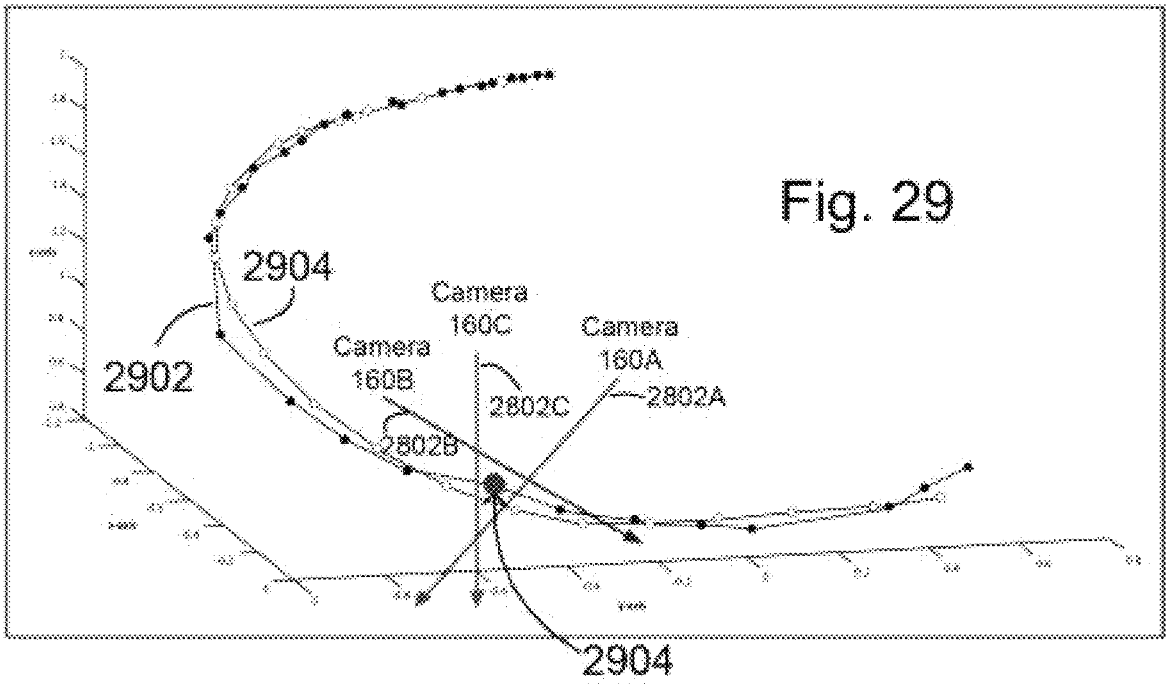
FIG. 29 illustrates an approximated piecewise 3D trajectory of the head of a bat that is based on identified probably locations in 3D space of the head of the bat.

The steps just described above with reference to the flow diagram of FIG. 27 can also be performed for the knob (or other identifiable portion) of the bat, so that the probable location in 3D space for at least two different points along the bat are determined, from which, the entire length of the bat in 3D space can be determined, as will be explained in more detail below following the discussion of FIG. 29.

Additional details of step 1910, according to a specific embodiment of the present technology, are now described below with reference to FIG. 29. As explained above in the discussion of FIG. 19, step 1910 involves approximating a piecewise 3D trajectory of the bat based on the probably locations in 3D space of the head and the know of the bat (identified at step 19081908 for each of the plurality of instants during which the bat was held and potentially swung by the batter while the ball traveled toward the batter). In FIG. 29, the dots along the jagged line 2902 are probable locations in 3D space of the head of the bat, which were identified at step 1908 for each of the plurality of instants during which the bat was held and potentially swung by the batter. In FIG. 29, the smooth line 2904 is illustrative of an approximated piecewise 3D trajectory of the head of the bat that is based on the probable locations in 3D space of the head of the bat. In accordance with an embodiment, a B-spline algorithm is used to approximate the piecewise 3D trajectory of the head of the bat. Instead of using a B-spline algorithm, another type of curve fitting algorithm can be used. In another embodiment, a physics model of a batter swinging a bat (or some other bat) can be determined and used to approximate the piecewise 3D trajectory of the head of the bat. Other variations are also possible, and within the scope of embodiments of the present technology. It is noted that in certain embodiments a piecewise 3D trajectory can include multiple pieces that collectively cover the entire trajectory, while in other embodiments a piecewise 3D trajectory can include a single piece that covers the entire trajectory. In other words, a sequence of functions can be used to approximate the piecewise 3D trajectory in successive pieces, or a single function can cover the entire piecewise 3D trajectory.

Figure 30A:
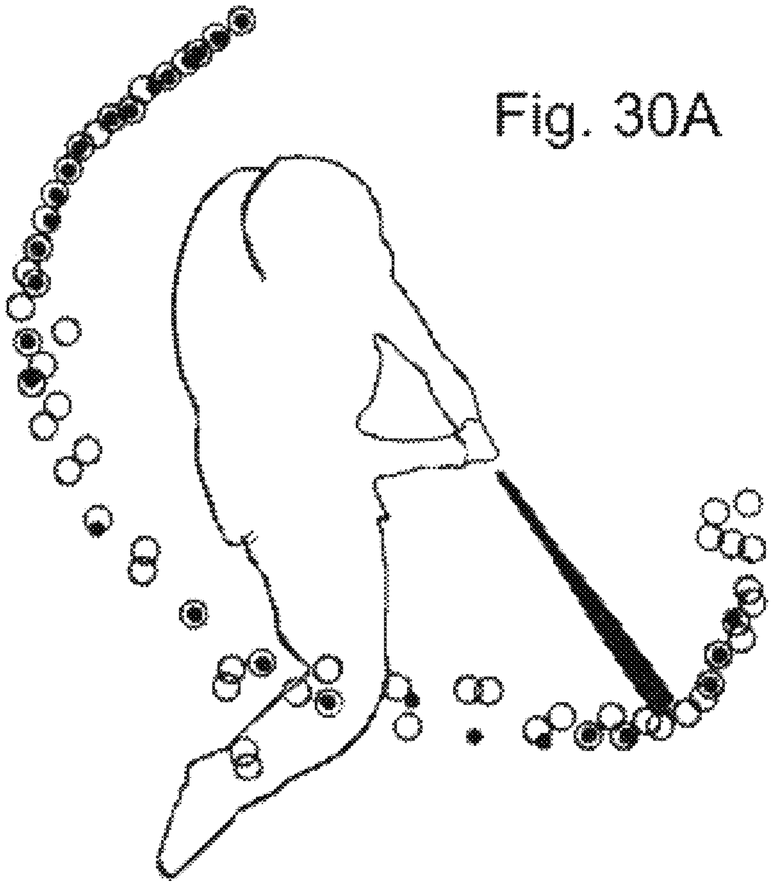
FIGS. 30A and 30B illustrates candidate locations of a bat head and probable locations of the bat head, as determined form the candidate locations, after they had been projected from 3D space back into 2D space and superimposed on video images of the bat being swung.
Figure 30B:
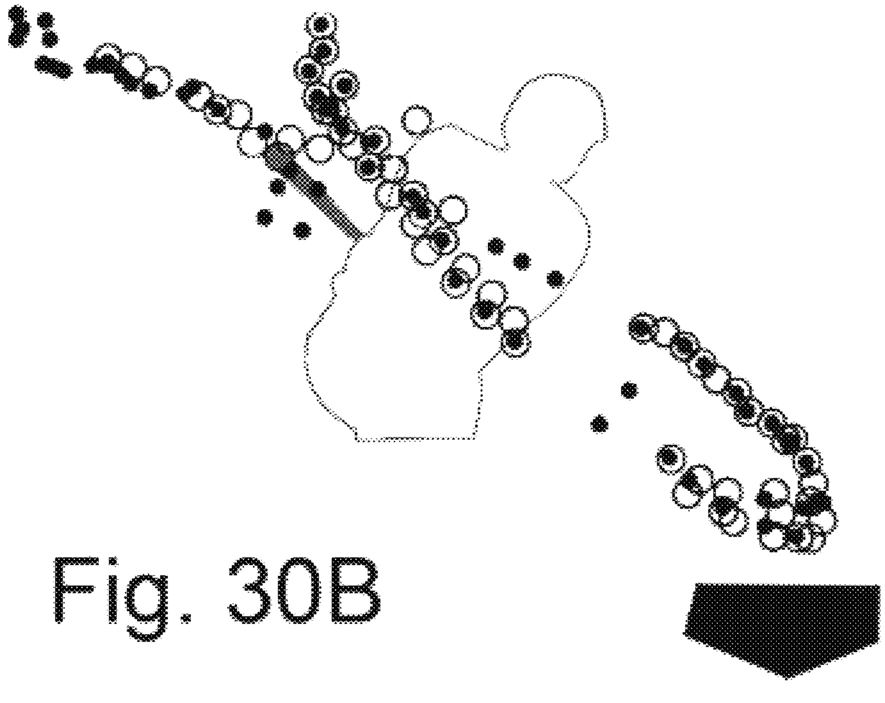

The probable location in 3D space of the head of the bat that is selected (at step 1906) for each of a plurality of instants in time during which the bat is held and potentially swung can, if desired, be converted back into 2D space (e.g., using an inverse of the transformation matrix M), and superimposed on one or more video images of the bat being swung. Examples of this are shown in FIGS. 30A and 30B, in which the open or non-filled in circles represent candidate locations in 2D space of the baseball bat head (as determined at step 1908), and the solid or filled in circles represent the probable locations in 3D space of the bat head (as determined at step 1908). The 2D screen or image space shown in FIG. 30A is captured by the camera 160A. The 2D screen or image space shown in FIG. 30B is captured by the camera 160B. More generally, a 2D video of a batter swinging a bat can be enhanced to visually show the path of the entire shaft, or just the head, of the bat. In certain embodiments, an error score can be computed after back-projection into 2D space, which can involve computing a difference between an interpolated line passing through the solid circles and the solid circles themselves. If a probable location has an error exceeding a specified threshold, then it can be discarded. Subsequent iteration of prior steps may be performed if necessary or desired. Other embodiments could discard a probable location by evaluating it in 3D space. One example would be a measure of how tightly the candidate LOPs are clustered; if that measurement exceeds a specified threshold, then that particular combination of LOPs can be discarded.

Certain portion of the above discussion described how to track the path of the head of a bat (e.g., a baseball bat) that is swung by a batter. Such embodiments can be extended to enable tracking of the path of the entire bat (e.g., an entire baseball bat) that is swung. Such additional steps can be performed at the same time as some of the steps described above, e.g., with reference to FIG. 19, or they can be performed at a later time than some of the steps described above, depending upon implementation. More generally, a bat head search can be extended to a full bat search by means of locating screen-space correspondences of a pair of points (corresponding to the head and the knob), and the line between them. For example, in FIG. 20C, lines detected in a motion image are illustrated. Those lines are defined by two endpoints, which include the aforementioned bat head as well as the end nearest the hands, which is referred to herein as the knob, as noted above.

Referring to FIG. 19, as part of step 1910, a probable location in 3D space of the knob of the bat can be identified from the candidate locations in 2D space of the knob of the bat, for each of the instants that a probable location in 3D space of the head of the bat is/was identified. Still referring to FIG. 19, as part of step 1910, a piecewise 3D trajectory of the knob of the bat can be approximated from the probable locations in 3D space of the knob of the bat identified for each of the plurality of instants during which the bat was held and potentially swung by the batter. Additionally, for each of the plurality of instants (for which a probable location of the knob is identified) a line is extended between the head and the knob to represent a probable location in 3D space of the shaft of the bat for the instant. The length of the shaft can be assumed to be the length between an identified head and an identified knob. Alternatively, a line representing the bat (e.g., a baseball bat) can be extrapolated, in 3D space, from the probable location of the head through the probable location of the knob, terminating at a specified length (e.g., 33 inches) from the probable location of the head. It is practical to assume the bat length is 33 inches, which is the length of a typical baseball bat, which typically only varies +/− one inch. The one inch length variation at the knob end of the bat (or other bat) will be inconsequential, since this part of the bat only contacts a ball in rare cases.

Figure 31:
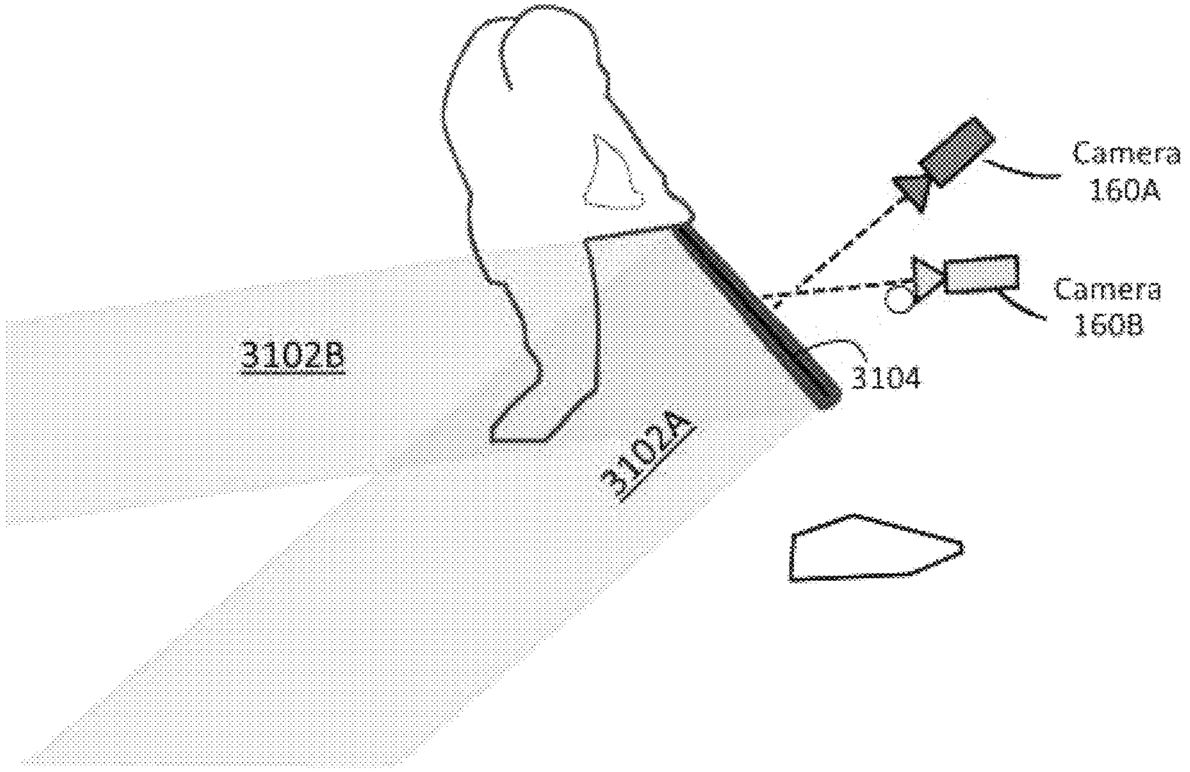
FIG. 31 is used to illustrate how the path of an entire shaft of a bat that is swung by a batter can be tracked, in accordance with certain embodiments.

By connecting interpolated, time-synchronized probable bat head locations with probable bat knob locations, in the manner described above, 3D bat "lines" that pass axially through the center of the bat are derived. From the perspective of each individual camera 160, lack of depth perception means an actual 3D bat line could lie anywhere in a plane extruded from the bat, both toward and away from the camera, as depicted in FIG. 31 with a two-camera configuration. A line 3104 formed by the intersection of camera 160A's plane 3102A and camera 160B's plane 3102B, is determined to be the 3D location of the bat.

Once the path and/or orientation of the head, knob, shaft and/or other portion(s) of a bat that is swung is/are determined, a graphical representation of the path and/or orientation of the head and/or shaft (and/or other portion(s)) can be superimposed over video images to enhance the video images. This can enable a determination of whether the bat made contact with the ball, by also utilizing the tracked path of the ball as it travels towards the batter.

The features of the present technology described above (e.g., with reference to FIGS. 19-31) can be used to perform step 412 introduced above with reference to FIG. 4, which step involves autonomously tracking locations of the bat being held by the batter as the ball travels towards the batter, using computer vision, based on the video images of the bat being held by the batter as the ball travels towards the batter. Referring again to FIG. 4, the video images of the bat being held by the batter as the ball travels towards the batter, which are received at step 408, are in 2D space. As can be appreciated from the above discussion, the autonomous tracking of locations of the bat being held by the batter as the ball travels towards the batter includes using transformation matrices (associated with the at least two different cameras 160 used to capture the video images of the bat being held by the batter) to determine locations of the bat in 3D space. Examples of such transformation matrices were described above.

Autonomously Determining Whether Batter Swung at Ball

Step 416, introduced above, with reference to FIG. 4, involves autonomously determining whether the batter made a genuine attempt to swing the bat at the ball, based on the tracked locations of the bat being held by the batter as the ball travels towards the batter. In accordance with an embodiment of the present technology, in order to perform step 416, a vertical plane in 3D space that is aligned with a front of the home plate can be determined, e.g., by the Strike Zone computer 322 described with reference to FIG. 3, or by some other computer, or more generally, using one or more processors 173. In other words, a front of home plate 104 can represented by a vertical plane in 3D space, which can be, e.g., the world coordinate space 197 described above with reference to FIG. 1C, but is not limited thereto. Further, step 416 can include autonomously determining whether a location of the bat in 3D space intersects with the vertical plane in 3D space that is aligned with the front of home plate as the ball travels towards the batter. Step 416 can further include autonomously determining whether the batter made a genuine attempt to swing the bat at the ball based on the autonomous determination of whether a location of the bat in 3D space intersected with the vertical plane in 3D space that is aligned with the front of home plate as the ball traveled towards the batter. More specifically, there can be a determination that the batter made a genuine attempt to swing the bat at the ball if a location of the bat in 3D space intersected with the plane in 3D space that corresponds to the front of home plate. Conversely, there can be a determination that the batter did not make a genuine attempt to swing the bat at the ball if a location of the bat in 3D space did not intersect with the plane in 3D space that corresponds to the front of home plate.

Alternatively, or additionally, step 416 can involve autonomously determining a rotation angle of the bat as the ball travels towards the batter. Step 416 can also involve comparing the rotation angle of the bat to a threshold angle, and autonomously determining whether the batter made a genuine attempt to swing the bat at the ball based on whether the rotation angle of the bat exceeded the threshold angle. More specifically, there can be a determination that the batter made a genuine attempt to swing the bat at the ball, if the determined rotation angle of the bat exceeded the threshold angle. Conversely, there can be a determination that the batter did not make a genuine attempt to swing the bat at the ball, if the determined rotation angle of the bat exceeded the threshold angle. Depending upon implementation, where multiple different techniques are used to make a separate determination, e.g., of whether the batter made a genuine attempt to swing the bat, a final determination can be positive if both of the separate determinations were positive, or if at least one of the separate determinations were positive. Other variations are also possible, as would be appreciated by one of ordinary skill in the art reading this disclosure.

Autonomously Determining Whether a "Strike" or a "Ball" Occurred

Step 418, introduced above, with reference to FIG. 4, involves autonomously determining whether a "strike" or a "ball" occurred, based on the determination of whether at least one location of the ball intersected with the strike zone, and/or the determination of whether the batter made a genuine attempt to swing at the ball. In accordance with an embodiment, step 418 includes autonomously determining whether a location of the bat in 3D space is the same as a location of the ball in 3D space at a same point in time. Details of how to determine the location of the ball in 3D space were described above with reference to FIGS. 5-18, and details of how to determine the location of the bat in 3D space were described above with reference to FIGS. 19-31. Step 418 can also include autonomously determining that the bat made contact with the ball if there was an autonomous determination that a location of the bat in 3D space was the same as a location of the ball in 3D space at a same point in time. On the other hand, step 418 can also include autonomously determining that the bat did not make contact with the ball if there was an autonomous determination that a location of the bat in 3D space was not the same as a location of the ball in 3D space at a same point in time. Further, step 418 can include determining that a "strike" occurred if there was an autonomous determination that the bat did not make contact with the ball, and there was also an autonomous determination that the batter made a genuine attempt to swing the bat at the ball; and determining that a "ball" occurred if there was an autonomous determination that at least one location of the ball traveling towards the batter did not intersect with the strike zone, and there was an autonomous determination that the batter did not make a genuine attempt to swing the bat at the ball.

Foul Tips

Under certain circumstances, it is important to distinguish between situations where the batter swung at a ball and missed, and situations where there was a foul tip. Such a call is often difficult for a human umpire to make. Certain embodiments of the present technology provide for an autonomous determination of whether a bat made contact with a ball, which determination can be used to determine whether a foul tip occurred. More specifically, in accordance with an embodiment, there is an autonomous determination of a trajectory of a ball in 3D space as the ball travels towards the batter. Further, there is an autonomous determination of whether a location of the bat in 3D space is within a specified vicinity (e.g., within a specified distance or number of pixels) of a location of the ball in 3D space at a same point in time. Additionally, there is an autonomous determination of whether the trajectory of the ball in 3D space changed beyond a specified threshold while a location of the bat in 3D space was within the specified vicinity of a location of the ball in 3D space at a same point in time. Such embodiments can further include determining whether the bat made contact with the ball, based on the determination of whether the trajectory of the ball in 3D space changed beyond the specified threshold while a location of the bat in 3D space was within the specified vicinity of a location of the ball in 3D space at a same point in time. More specifically, if the trajectory changed beyond the specified threshold, there is a determination that the bat made contact with the ball, and otherwise, there is a determination that the bat did not make contact with the ball. Details of how to determine the location and trajectory of the ball in 3D space were described above with reference to FIGS. 5-18, and details of how to determine the location of the bat in 3D space were described above with reference to FIGS. 19-31.

Additionally, or alternatively, audio obtained by a microphone (e.g., 162 in FIG. 1A) can be used to determine whether the bat made contact with the ball. More specifically, this can involve receiving audio associated with the batter holding the bat as the ball travels towards the batter, and autonomously determining whether the bat made contact with the ball based on the audio associated with the batter holding the bat as the ball travels towards the batter. This can be accomplished, e.g., by prerecording one or more audio signatures associated with tipped balls, and comparing the prerecorded audio signature(s) to the received audio, and autonomously determining whether the bat made contact with the ball based results of such comparison(s).

A "foul tip" is a batted ball that goes sharp and direct from the bat to the catcher's hands and is legally caught. It is not a foul tip unless caught and any foul tip that is caught is a strike, and the ball is in play. It is not a catch if it is a rebound, unless the ball has first touched the catcher's glove or hand. The rules treat a foul tip as equivalent in every respect to a pitch at which the batter swings and misses. Accordingly, a foul tip is always a strike, regardless of the existing ball-and-strike count. This means that if a foul tip occurs when a player has two strikes against him, then the player is automatically struck out and cannot attempt to reach first base. This also means that if a foul tip occurs when a player has fewer than two strikes against him then the player is not out. In contrast, a foul ball is not considered a strike where the batter already has two strikes against him.

A "foul tip" as noted above, is a batted ball that goes sharp and direct from the bat to the catcher's hands and is legally caught. The rules treat a foul tip as equivalent in every respect to a pitch at which the batter swings and misses. Nevertheless, there are certain times it is important to determine whether a foul tip occurred. For example, if a bat tips (i.e., make slight contact with) a pitched ball before the catcher catches the ball, in a situation where there was a checked swing (e.g., if there was a determination that the batter did not make a genuine attempt to swing the bat at the ball), and where there was a determination that the ball did not intersect with the strike zone, then that pitch would be determined to be a "strike." However, if the batter did not tip the ball in that same situation, then that pitch would be determined to be a "ball."

Most of the functionality described herein may be implemented using one or more processor readable storage devices having processor readable code embodied thereon for programming one or more processors to perform the processes described herein. The processor readable storage devices can include computer readable media such as volatile and nonvolatile media, removable and non-removable media. By way of example, and not limitation, computer readable media may comprise computer storage media and communication media. Computer storage media includes volatile and nonvolatile removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by a computer. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above are also included within the scope of computer readable media.

Embodiments of the present technology have been described above with the aid of functional building blocks illustrating the performance of specified functions and relationships thereof. The boundaries of these functional building blocks have often been defined herein for the convenience of the description. Alternate boundaries can be defined so long as the specified functions and relationships thereof are appropriately performed. Any such alternate boundaries are thus within the scope and spirit of the claimed embodiments. For example, it would be possible to combine or separate some of the steps shown in FIG. 4, and/or in other flow diagrams. Further, it may be possible to change the order of some of the steps described above, without substantially changing the overall events and results, e.g., in instances where a step doesn't rely on the results of a previous step. The foregoing detailed description of the technology has been presented for purposes of illustration and description. It is not intended to be exhaustive or to limit the technology to the precise form disclosed. Many modifications and variations are possible in light of the above teaching. The described embodiments were chosen in order to best explain the principles of the technology and its practical application, to thereby enable others skilled in the art to utilize the technology in various embodiments and with various modifications as are suited to the particular use contemplated. It is intended that the scope of the technology be defined by the claims appended hereto.

The invention claimed is:

1. A method for automating or assisting umpiring of a baseball game or a softball game comprising:

receiving images of a batter, images of a bat held by the batter, and images of a ball from at least two cameras;

determining a location of a strike zone based on the images of the batter;

adding a strike zone graphic to the location of the strike zone on the images of the batter;

tracking locations of the ball in three-dimensional (3D) space;

adding an animated trail representing the locations of the ball on the images of the batter;

tracking locations of the bat held by the batter, using computer vision, based on the images of the bat held by the batter to determine locations of the bat in 3D space;

determining whether a location of the bat in 3D space at a point in time is the same as a location of the ball in 3D space at the point in time;

determining whether at least one location of the ball intersected with the strike zone based on the determined location of the strike zone and the tracked locations of the ball;

determining whether a "strike" or a "ball" occurred;

displaying the strike zone graphic and the animated trail on an output display device; and indicating whether a "strike" or a "ball" occurred on the output display device.

2. The method of claim 1, further comprising:

receiving audio;

determining whether the bat contacted the ball based on the audio;

indicating whether the ball contacted the bat; and using the indication to determine whether to call a strike, a ball, a check swing, or a foul tip.

3. The method of claim 1, wherein the determining whether a "strike" or a "ball" occurred includes determining that a "strike" occurred if there was a determination that the bat did not contact the ball, and there was a determination that the batter made a genuine attempt to swing the bat at the ball and determining that a "ball" occurred if there was a determination that at least one location of the ball did not intersect with the strike zone and there was a determination that the batter did not make a genuine attempt to swing the bat at the ball.

4. The method of claim 1, wherein the strike zone graphic comprises a 3D box representing a 3D strike zone, and wherein the 3D strike zone is displayed from different perspectives.

5. The method of claim 1, further comprising:

determining a vertical plane in 3D space that is aligned with a front of a home plate;

determining whether the location of the bat in 3D space intersected with the vertical plane in 3D space that is aligned with the front of the home plate; and determining whether the batter made a genuine attempt to swing the bat at the ball based on the determination of whether the location of the bat in 3D space intersected with the vertical plane in 3D space that is aligned with the front of the home plate.

6. The method of claim 1, further comprising:

determining a rotation angle of the bat;

comparing the rotation angle of the bat to a threshold angle; and determining whether the batter made a genuine attempt to swing the bat at the ball based on whether the rotation angle of the bat exceeds the threshold angle.

7. The method of claim 1, further comprising:

determining a trajectory of the ball in 3D space;

determining whether at least one location of the bat in 3D space during a time frame is within a specified vicinity of at least one location of the ball in 3D space during the time frame;

determining whether the trajectory of the ball in 3D space changed beyond a specified threshold during the time frame;

determining whether the bat contacted the ball; and indicating whether the bat contacted the ball.

8. The method of claim 1, wherein tracking the location of the ball is performed using radar.

9. The method of claim 1, further comprising:

receiving images from the at least two cameras of the ball traveling away from the batter if there was a determination that the bat contacted the ball traveling towards the batter;

determining whether the ball traveling away from the batter was hit fair or foul if there was a determination that the bat contacted the ball traveling towards the batter; and indicating whether the ball traveling away from the batter was hit fair or foul.

10. A system for automating or assisting umpiring of a baseball game or a softball game comprising:

at least two cameras configured to capture images of a batter, images of a ball, and images of a bat being held by the batter;

at least one processor in communication with at least two cameras and an output device, wherein the at least one processor is configured to:

determine a location of a strike zone based on the images of the batter;

add a strike zone graphic at the location of the strike zone on the images of the batter, track locations of the ball;

add an animated trail representing the locations of the ball on the images of the batter;

track locations of the bat being held by the batter, using computer vision, based on the images of the bat being held by the batter;

determine a location of the ball and locations of the bat in three-dimensional (3D) space;

determine whether at least one location of the ball intersected with the strike zone based on the determined location of the strike zone and the tracked locations of the ball;

determine whether a location of the bat in 3D space at a point in time is the same as a location of the ball in 3D space at the point in time, determine that the bat contacted the ball if there was a determination that the location of the bat in 3D space at the point in time was the same as the location of the ball in 3D space at the point in time, determine that the bat did not contact the ball if there was a determination that the location of the bat in 3D space at the point in time was not the same as the location of the ball in 3D space at the point in time, determine whether a "strike" or a "ball" occurred based on the determination of whether at least one location of the ball intersected with the strike zone or the determination of whether the batter made a genuine attempt to swing the bat at the ball; and wherein the output device includes at least one visual display configured to:

display the strike zone graphic and the animated trail; and indicate whether a "strike" or a "ball" occurred.

11. The system of claim 10, wherein at least one Vertical Interval Time Code (VITC) inserter is associated with at least one of the at least two cameras, wherein the at least one VITC inserter is operable to add time codes, time stamps, camera IDs, and/or combinations thereof to images captured by the at least two cameras.

12. The system of claim 10, wherein the at least one processor is further configured to:

receive audio;

compare the received audio with at least one prerecorded audio signature; and determine whether the bat contacted the ball based on the comparison between the received audio and the at least one prerecorded audio signature.

13. The system of claim 10, wherein the strike zone graphic comprises a 2D box representing the front plane of the strike zone toward a mound of a pitcher.

14. The system of claim 10, wherein the strike zone graphic comprises a 3D box representing a 3D strike zone.

15. The system of claim 10, wherein the at least one processor is also configured to:

determine a vertical plane in 3D space that is aligned with a front of a home plate;

determine whether at least one location of the bat in 3D space intersected with the vertical plane in 3D space that is aligned with the front of the home plate; and determine that the batter made a genuine attempt to swing the bat at the ball if the at least one location of the bat in 3D space intersected with the vertical plane in 3D space that is aligned with the front of the home plate; and determine that the batter did not make a genuine attempt to swing the bat at the ball if the at least one location of the bat in 3D space did not intersect with the plane in 3D space that corresponds to the front of the home plate.

16. The system of claim 10, wherein the at least one processor determines the location of the ball in three-dimensional (3D) space using radar.

17. The system of claim 10, wherein the at least one processor is also configured to:

determine a rotation angle of the bat;

compare the rotation angle of the bat to a threshold angle; and determine whether the batter made a genuine attempt to swing the bat at the ball based on whether the rotation angle of the bat exceeded the threshold angle.

18. The system of claim 10, wherein the at least one processor is also configured to:

determine a trajectory of the ball in 3D space;

determine whether a location of the bat in 3D space is within a specified vicinity of a location of the ball in 3D space at a same point in time;

determine whether the trajectory of the ball in 3D space changed beyond a specified threshold while a location of the bat in 3D space was within the specified vicinity of a location of the ball in 3D space at a same point in time;

determine whether the bat contacted the ball, based on the determination of whether the trajectory of the ball in 3D space changed beyond the specified threshold while a location of the bat in 3D space was within the specified vicinity of a location of the ball in 3D space at a same point in time; and cause the output device to output an indication of whether the ball contacted the bat.

19. The system of claim 10, wherein the at least one processor is also configured to:

determine whether the ball was hit fair or foul, if there was a determination that the bat contacted the ball; and cause the output device to output an indication of whether the ball was hit fair or foul.

20. At least one processor for use in automating or assisting umpiring of a baseball or softball game comprising:

at least one processor in communication with at least two cameras and at least one processor non-transitory readable storage device having processor readable code, wherein the at least one processor is operable to:

determine a location of a strike zone of a batter based on images from the at least two cameras;

add a strike zone graphic at the location of the strike zone on the images;

track locations of a ball, using computer vision, based on images of the ball captured using the at least two cameras, wherein the tracking locations of the ball includes using transformations associated with the at least two cameras to determine locations of the ball in three-dimensional (3D) space;

add an animated trail representing the locations of the ball on the images;

track locations of a bat being held by the batter, using computer vision, based on images of the bat being held by the batter captured using the at least two cameras, wherein the tracking locations of the bat includes using transformations associated with the at least two cameras to determine locations of the bat in 3D space;

determine whether a location of the bat in 3D space is the same as a location of the ball in 3D space at a same point in time;

determine whether at least one location of the ball intersected with the strike zone, based on the determined location of the strike zone and the tracked locations of the ball;

determine whether the batter made a genuine attempt to swing the bat at the ball, based on the tracked locations of the bat being held the batter;

determine that the bat contacted the ball if there was a determination that the location of the bat in 3D space was the same as the location of the ball in 3D space at the same point in time;

determine that the bat did not contact the ball if there was a determination that the location of the bat in 3D space was not the same as the location of the ball in 3D space at a same point in time;

determine whether a "strike" or a "ball" occurred based on at least one of the determination of whether at least one location of the ball intersected with the strike zone, or the determination of whether the batter made a genuine attempt to swing the bat at the ball; and cause an indication of whether a "strike" or a "ball" occurred to be output.

* * * * *